US008430740B2

(12) United States Patent
Yamauchi

(10) Patent No.: US 8,430,740 B2
(45) Date of Patent: Apr. 30, 2013

(54) GAMING MACHINE AND METHOD FOR CONTROLLING THE SAME

(75) Inventor: Hiromoto Yamauchi, Koto-ku (JP)

(73) Assignees: Universal Entertainment Corporation, Tokyo (JP); Aruze Gaming America Inc., Las Vegas, NV (US)

( * ) Notice: Subject to any disclaimer, the term of this patent is extended or adjusted under 35 U.S.C. 154(b) by 328 days.

(21) Appl. No.: 12/790,418

(22) Filed: May 28, 2010

(65) Prior Publication Data

US 2010/0304829 A1 Dec. 2, 2010

(30) Foreign Application Priority Data

Jun. 1, 2009 (JP) ................................ 2009-132490

(51) Int. Cl.
*G06F 17/00* (2006.01)

(52) U.S. Cl.
USPC ................................................ 463/20; 463/16

(58) Field of Classification Search ............... 463/16–20
See application file for complete search history.

(56) References Cited

U.S. PATENT DOCUMENTS

| | | | | |
|---|---|---|---|---|
| 5,547,192 | A | 8/1996 | Ishibashi | |
| 6,491,584 | B2 | 12/2002 | Graham et al. | |
| 6,913,532 | B2 | 7/2005 | Baerlocher et al. | |
| 7,070,501 | B2 * | 7/2006 | Cormack et al. | 463/16 |
| 7,147,559 | B2 * | 12/2006 | Englman | 463/25 |
| 7,976,383 | B2 * | 7/2011 | Fujimoto et al. | 463/25 |
| 2004/0266520 | A1 * | 12/2004 | Aida | 463/20 |
| 2006/0160607 | A1 | 7/2006 | Okada | |
| 2010/0056249 | A1 | 3/2010 | Yamauchi | |
| 2011/0287826 | A1 * | 11/2011 | Kato et al. | 463/20 |

FOREIGN PATENT DOCUMENTS

| | | | |
|---|---|---|---|
| CN | 1099999 | A | 3/1995 |
| CN | 1799667 | A | 7/2006 |

OTHER PUBLICATIONS

U.S. Appl. No. 61/114,833, Nov. 14, 2008.*
U.S. Appl. No. 61/114,772, Nov. 14, 2008.*
U.S. Appl. No. 61/114,839, Nov. 14, 2008.*
Macanese Office Action issued Jun. 30, 2011, in Patent Application No. I/001043(168) (with English-language translation).
U.S. Appl. No. 12/790,155, filed May 28, 2010, Yoshizawa, et al.

* cited by examiner

*Primary Examiner* — Michael Cuff
(74) *Attorney, Agent, or Firm* — Lexyoume IP Meister, PLLC

(57) ABSTRACT

In a gaming machine and a method for controlling the same, whether to start insurance is determined on a basis of a count value cumulatively incremented along with execution of unit games and counted by a counter, and an insurance start condition table defining a correspondence relationship between the count value and start of the insurance; and a first feature game and a second feature game are executed when it is determined to start the insurance. When it is determined to start the insurance, a first feature game may be executed; a condition of a second feature game may be determined on a basis of an outcome of the executed first feature game and a second feature game condition determination table defining a correspondence relationship between an outcome of the first feature game and a condition of the second feature game; and the second feature game may be executed under the determined condition.

9 Claims, 45 Drawing Sheets

FIG. 5

| | First video reel | Second video reel | Third video reel | Fourth video reel | Fifth video reel |
|---|---|---|---|---|---|
| Code number | Symbol | Symbol | Symbol | Symbol | Symbol |
| 00 | JACKPOT 7 | JACKPOT 7 | JACKPOT 7 | JACKPOT 7 | JACKPOT 7 |
| 01 | PLUM | 「Q」 | CHERRY | 「J」 | APPLE |
| 02 | ORANGE | 「K」 | 「K」 | PLUM | 「Q」 |
| 03 | 「J」 | BELL | APPLE | STRAWBERRY | BELL |
| 04 | 「K」 | CHERRY | ORANGE | 「Q」 | 「J」 |
| 05 | PLUM | ORANGE | 「J」 | PLUM | BLUE 7 |
| 06 | ORANGE | PLUM | 「K」 | APPLE | ORANGE |
| 07 | 「Q」 | CHERRY | PLUM | BLUE 7 | 「K」 |
| 08 | BLUE 7 | 「J」 | ORANGE | 「K」 | PLUM |
| 09 | CHERRY | APPLE | PLUM | ORANGE | BELL |
| 10 | 「K」 | BELL | ORANGE | BELL | CHERRY |
| 11 | BELL | STRAWBERRY | 「Q」 | 「Q」 | PLUM |
| 12 | ORANGE | PLUM | BELL | PLUM | 「J」 |
| 13 | STRAWBERRY | BLUE 7 | STRAWBERRY | CHERRY | 「Q」 |
| 14 | 「J」 | BELL | BLUE 7 | APPLE | APPLE |
| 15 | ORANGE | 「Q」 | BELL | STRAWBERRY | 「K」 |
| 16 | APPLE | 「K」 | CHERRY | CHERRY | CHERRY |
| 17 | PLUM | STRAWBERRY | PLUM | BELL | ORANGE |
| 18 | 「Q」 | PLUM | 「Q」 | 「K」 | BELL |
| 19 | PLUM | 「J」 | 「J」 | ORANGE | ORANGE |
| 20 | BLUE 7 | BELL | ORANGE | 「J」 | PLUM |
| 21 | CHERRY | APPLE | PLUM | PLUM | STRAWBERRY |

FIG. 6

| | First video reel | Second video reel | Third video reel | Fourth video reel | Fifth video reel |
|---|---|---|---|---|---|
| Code number | Symbol | Symbol | Symbol | Symbol | Symbol |
| 00 | JACKPOT 7 | JACKPOT 7 | JACKPOT 7 | JACKPOT 7 | JACKPOT 7 |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | ORANGE | CHERRY | ORANGE | BELL | PLUM |
| 05 | PLUM | ORANGE | PLUM | PLUM | BLUE 7 |
| 06 | ORANGE | PLUM | ORANGE | APPLE | ORANGE |
| 07 | PLUM | CHERRY | PLUM | BLUE 7 | APPLE |
| 08 | BLUE 7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | ORANGE | PLUM |
| 12 | ORANGE | PLUM | BELL | PLUM | BELL |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CHERRY | CHERRY |
| 17 | PLUM | STRAWBERRY | PLUM | BELL | ORANGE |
| 18 | ORANGE | PLUM | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

FIG. 7

| | First video reel | Second video reel | Third video reel | Fourth video reel | Fifth video reel |
|---|---|---|---|---|---|
| Code number | Symbol | Symbol | Symbol | Symbol | Symbol |
| 00 | JACKPOT 7 | JACKPOT 7 | JACKPOT 7 | JACKPOT 7 | JACKPOT 7 |
| 01 | PLUM | BELL | CHERRY | WILD | APPLE |
| 02 | ORANGE | APPLE | ORANGE | PLUM | ORANGE |
| 03 | WILD | BELL | APPLE | STRAWBERRY | BELL |
| 04 | ORANGE | CHERRY | ORANGE | BELL | PLUM |
| 05 | PLUM | ORANGE | PLUM | PLUM | BLUE 7 |
| 06 | ORANGE | PLUM | ORANGE | APPLE | ORANGE |
| 07 | PLUM | CHERRY | PLUM | BLUE 7 | APPLE |
| 08 | BLUE 7 | WILD | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | ORANGE | PLUM |
| 12 | ORANGE | PLUM | BELL | PLUM | WILD |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CHERRY | CHERRY |
| 17 | PLUM | STRAWBERRY | PLUM | BELL | ORANGE |
| 18 | ORANGE | PLUM | WILD | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

FIG. 8

| | First video reel | Second video reel | Third video reel | Fourth video reel | Fifth video reel |
|---|---|---|---|---|---|
| Code number | Symbol | Symbol | Symbol | Symbol | Symbol |
| 00 | JACKPOT 7 | JACKPOT 7 | JACKPOT 7 | JACKPOT 7 | JACKPOT 7 |
| 01 | PLUM | BELL | CHERRY | WILD | APPLE |
| 02 | ORANGE | APPLE | ORANGE | PLUM | WILD |
| 03 | WILD | BELL | APPLE | STRAWBERRY | BELL |
| 04 | ORANGE | CHERRY | WILD | BELL | PLUM |
| 05 | PLUM | ORANGE | PLUM | PLUM | BLUE 7 |
| 06 | ORANGE | PLUM | ORANGE | APPLE | ORANGE |
| 07 | PLUM | CHERRY | PLUM | BLUE 7 | APPLE |
| 08 | BLUE 7 | WILD | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | ORANGE | PLUM |
| 12 | ORANGE | PLUM | BELL | PLUM | WILD |
| 13 | STRAWBERRY | BLUE 7 | STRAWBERRY | CHERRY | ORANGE |
| 14 | BLUE 7 | BELL | BLUE 7 | APPLE | APPLE |
| 15 | WILD | APPLE | BELL | STRAWBERRY | PLUM |
| 16 | APPLE | WILD | CHERRY | CHERRY | CHERRY |
| 17 | PLUM | STRAWBERRY | PLUM | WILD | ORANGE |
| 18 | ORANGE | PLUM | WILD | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

FIG. 10

Payout table

| Combination of symbols | | | | | Amount of payout | Winning combination |
|---|---|---|---|---|---|---|
| First video reel | Second video reel | Third video reel | Fourth video reel | Fifth video reel | | |
| JACKPOT 7 | JACKPOT 7 | JACKPOT 7 | JACKPOT 7 | JACKPOT 7 | Amount of jackpot | Jackpot |
| APPLE | APPLE | APPLE | APPLE | APPLE | Free game ※ | Free game trigger |
| BLUE 7 | BLUE 7 | BLUE 7 | BLUE 7 | BLUE 7 | 10 | BLUE |
| BELL | BELL | BELL | BELL | BELL | 8 | BELL |
| CHERRY | CHERRY | CHERRY | CHERRY | CHERRY | 5 | CHERRY 3 |
| STRAWBERRY | STRAWBERRY | STRAWBERRY | STRAWBERRY | STRAWBERRY | 5 | STRAWBERRY |
| PLUM | PLUM | PLUM | PLUM | PLUM | 4 | PLUM |
| ORANGE | ORANGE | ORANGE | ORANGE | ORANGE | 3 | ORANGE 3 |
| CHERRY | CHERRY | CHERRY | (ANY) | (ANY) | 2 | CHERRY 2 |
| ORANGE | ORANGE | ORANGE | (ANY) | (ANY) | 2 | ORANGE 2 |
| CHERRY | (ANY) | (ANY) | (ANY) | (ANY) | 1 | CHERRY 1 |
| ORANGE | (ANY) | (ANY) | (ANY) | (ANY) | 1 | ORANGE 1 |

※Free games of the number of times determined by lottery are conducted.
Amount of payout for free game is 20.

FIG. 11

Payout table

| Combination of symbols | | | | | Amount of payout | Winning combination |
|---|---|---|---|---|---|---|
| First video reel | Second video reel | Third video reel | Fourth video reel | Fifth video reel | | |
| JACKPOT 7 | JACKPOT 7 | JACKPOT 7 | JACKPOT 7 | JACKPOT 7 | Amount of Jackpot | Jackpot |
| APPLE | APPLE | APPLE | APPLE | APPLE | 25 | APPLE |
| BLUE 7 | BLUE 7 | BLUE 7 | BLUE 7 | BLUE 7 | 15 | BLUE |
| BELL | BELL | BELL | BELL | BELL | 12 | BELL |
| CHERRY | CHERRY | CHERRY | CHERRY | CHERRY | 8 | CHERRY 3 |
| STRAWBERRY | STRAWBERRY | STRAWBERRY | STRAWBERRY | STRAWBERRY | 8 | STRAWBERRY |
| PLUM | PLUM | PLUM | PLUM | PLUM | 7 | PLUM |
| ORANGE | ORANGE | ORANGE | ORANGE | ORANGE | 6 | ORANGE 3 |
| CHERRY | CHERRY | CHERRY | (ANY) | (ANY) | 5 | CHERRY 2 |
| ORANGE | ORANGE | ORANGE | (ANY) | (ANY) | 5 | ORANGE 2 |
| CHERRY | (ANY) | (ANY) | (ANY) | (ANY) | 3 | CHERRY 1 |
| ORANGE | (ANY) | (ANY) | (ANY) | (ANY) | 3 | ORANGE 1 |

FIG. 50

| Selected number of games \ Number of games be added | One game | Two games | Three games | Five games | Average number of games added |
|---|---|---|---|---|---|
| 20FG | 5% | 14% | 31% | 50% | 3.8 games |
| 15FG | 20% | 25% | 25% | 30% | 3.0 games |
| 10FG | 45% | 25% | 20% | 10% | 2.1 games |
| 8FG | 56% | 27% | 14% | 3% | 1.7 games |
| 5FG | 97% | 1% | 1% | 1% | 1.1 games |

GAMING MACHINE AND METHOD FOR CONTROLLING THE SAME

CROSS REFERENCE TO RELATED APPLICATIONS

This application is based upon and claims the benefit of priority from the prior Japanese Patent Application No. 2009-132490, filed on Jun. 1, 2009, the entire contents of which are incorporated herein by reference.

BACKGROUND OF THE INVENTION

1. Field of the Invention

The present invention relates to a gaming machine and a method for controlling the same.

2. Description of the Related Art

Gaming machines disclosed in the specifications of U.S. Pat. No. 6,913,532 and No. 6491584 have been known as related gaming machines. The specifications describe the gaming machines offering benefits such as increasing the execution times of a free game, and thereby allowing a player to win a large amount of payout, if a bonus trigger is established again during the execution of the free game after establishment of a bonus trigger.

SUMMARY OF THE INVENTION

However, the related gaming machines described above only change the execution times of the free game during the execution of the free game to change the payout to be won by the player. Thus, there has been desired the advent of a gaming machine having new entertainment properties.

An object of the present invention is to provide a gaming machine with new entertainment properties, and a method for controlling the same.

A first aspect of the present invention is a gaming machine comprising: an input device configured to receive abet for each of unit games; a display adapted to display an outcome of a unit game; a counter configured to cumulatively increment a count value along with execution of the unit games and count the count value; a memory configured to store (A) a count value counted by the counter, and (B) an insurance start condition table defining a correspondence relationship between the count value and start of insurance; and a controller configured to (a) determine whether to start the insurance on a basis of the count value and the insurance start condition table stored in the memory, and (b) execute a first feature game and a second feature game when determining to start the insurance.

According to the first aspect of the present invention, a unit game is executed based on an input to the input device and the outcome of the unit game is displayed on the display. Along with the execution of the unit game, the count value of the counter is cumulatively incremented. Based on the count value data and the insurance start condition table, whether or not to start insurance is determined. When the insurance is determined to be started, the first feature game and the second feature game are executed. Thus, a gaming machine with new entertainment properties can be provided.

The controller may be configured to execute a plurality of free games in each of the first feature game and the second feature game, cause a specific symbol to appear at a predetermined probability in each of the free games, hold the appeared specific symbol in subsequent free games, and reset the held specific symbol when each of the first feature game and the second feature game is completed.

The memory may be further configured to store a payout rate setting table defining a relationship between a payout rate and a number of free games executed in each of the first feature game and the second feature game, and the controller may be configured to receive an input of selection of numbers of free games in the first feature game and the second feature game when determining to start the insurance, execute the selected numbers of free games in the first feature game and the second feature game, and determine a payout on a basis of a payout rate corresponding to each of the selected numbers of free games when winning is established.

A second aspect of the present invention is a gaming machine comprising: an input device configured to receive a bet for each of unit games; a display adapted to display an outcome of a unit game; a counter configured to cumulatively increment a count value along with execution of the unit games and count the count value; a memory configured to store (A) a count value counted by the counter, (B) an insurance start condition table defining a correspondence relationship between the count value and start of insurance, and (C) a second feature game condition determination table defining a correspondence relationship between an outcome of a first feature game and a condition of a second feature game; and a controller configured to (a) determine whether to start the insurance on a basis of the count value and the insurance start condition table stored in the memory, (b) execute the first feature game when determining to start the insurance, (c) determine a condition of the second feature game on a basis of an outcome of the executed first feature game and the second feature game condition determination table, and (d) execute the second feature game under the condition determined in (c).

According to the second aspect of the present invention, a unit game is executed based on an input to the input device and the outcome of the unit game is displayed on the display. Along with the execution of the unit game, the count value of the counter is cumulatively incremented. Based on the count value data and the insurance start condition table, whether or not to start insurance is determined. When the insurance is determined to be started, the first feature game is executed. Further, based on a result of the executed first feature game and the second feature game condition determination table, the conditions of the second feature game are determined. Thereafter, the second feature game is executed. Thus, a gaming machine with new entertainment properties can be provided.

A mission may be set in the first feature game, and in the second feature game condition determination table, the condition may be set so that a payout rate in the second feature game is higher when the mission is accomplished in the first feature game than when the mission is not accomplished in the first feature game.

A mission may be set in the first feature game, and in the second feature game condition determination table, the condition may be set so that a number of free games to be executed in the second feature game is larger when the mission is accomplished in the first feature game than when the mission is not accomplished in the first feature game.

A mission may be set in the first feature game, and in the second feature game condition determination table, the condition may be set so that a probability of a winning symbol appearing in the second feature game is higher when the mission is accomplished in the first feature game than when the mission is not accomplished in the first feature game.

In the second feature game condition determination table, the condition may be set so that a payout rate in the second feature game is higher when a payout won in the first feature game is less than a predetermined value than when the payout won is not less than the predetermined value.

In the second feature game condition determination table, the condition may be set so that a number of free games to be executed in the second feature game is larger when a payout won in the first feature game is less than a predetermined value than when the payout won is not less than the predetermined value.

In the second feature game condition determination table, the condition may be set so that a probability of a winning symbol appearing in the second feature game is higher when a payout won in the first feature game is less than a predetermined value than when the payout won is not less than the predetermined value.

A third aspect of the present invention is a method for controlling a gaming machine, the method comprising: by a controller, determining whether to start insurance on a basis of a count value cumulatively incremented along with execution of unit games and counted by a counter, and an insurance start condition table defining a correspondence relationship between the count value and start of the insurance; and executing a first feature game and a second feature game when determining to start the insurance.

The method may further comprise: by the controller, executing a plurality of free games in each of the first feature game and the second feature game; causing a specific symbol to appear at a predetermined probability in each of the free games, and holding the appeared specific symbol in subsequent free games; and resetting the held specific symbol when each of the first feature game and the second feature game is completed.

A fourth aspect of the present invention is a method for controlling a gaming machine, the method comprising: by a controller, determining whether to start insurance on a basis of a count value cumulatively incremented along with execution of unit games and counted by a counter, and an insurance start condition table defining a correspondence relationship between the count value and start of the insurance; executing a first feature game when determining to start the insurance, determining a condition of a second feature game on a basis of an outcome of the executed first feature game and a second feature game condition determination table defining a correspondence relationship between an outcome of the first feature game and a condition of the second feature game; and executing the second feature game under the determined condition.

BRIEF DESCRIPTION OF THE DRAWINGS

FIG. 5 is a view illustrating symbol arrays of a first reel pattern of the gaming machine according to the embodiment of the present invention.

FIG. 6 is a view illustrating symbol arrays of a second reel pattern of the gaming machine according to the embodiment of the present invention.

FIG. 7 is a view illustrating symbol arrays of a third reel pattern of the gaming machine according to the embodiment of the present invention.

FIG. 8 is a view illustrating symbol arrays of a fourth reel pattern of the gaming machine according to the embodiment of the present invention.

FIG. 10 is a view illustrating a first payout table of the gaming machine according to the embodiment of the present invention.

FIG. 11 is a view illustrating a second payout table of the gaming machine according to the embodiment of the present invention.

FIG. 50 is a view illustrating a lottery table for determining a number of free games to be added, used in the gaming machine according to the tenth embodiment of the present invention.

DETAILED DESCRIPTION OF THE EMBODIMENTS

With reference to the drawings, embodiments of the present invention will be described below.

A gaming machine according to embodiments of the present invention includes: (a) BET switches (a 1-BET switch 34S and a maximum BET switch 35S) configured to receive a bet for each unit game; (b) a lower image display panel 141 configured to display an outcome of the unit game; and (c) a RAM 73 having a counter function of cumulatively incrementing a count value along with the execution of the unit game and counting the count value. Based on the count value counted by the counter and an insurance start condition table defining a correspondence relationship between the count value and start of insurance, the gaming machine determines whether or not to start insurance. When the insurance is determined to be started, two feature games, namely a first feature game and a second feature game are executed.

Figure 1:
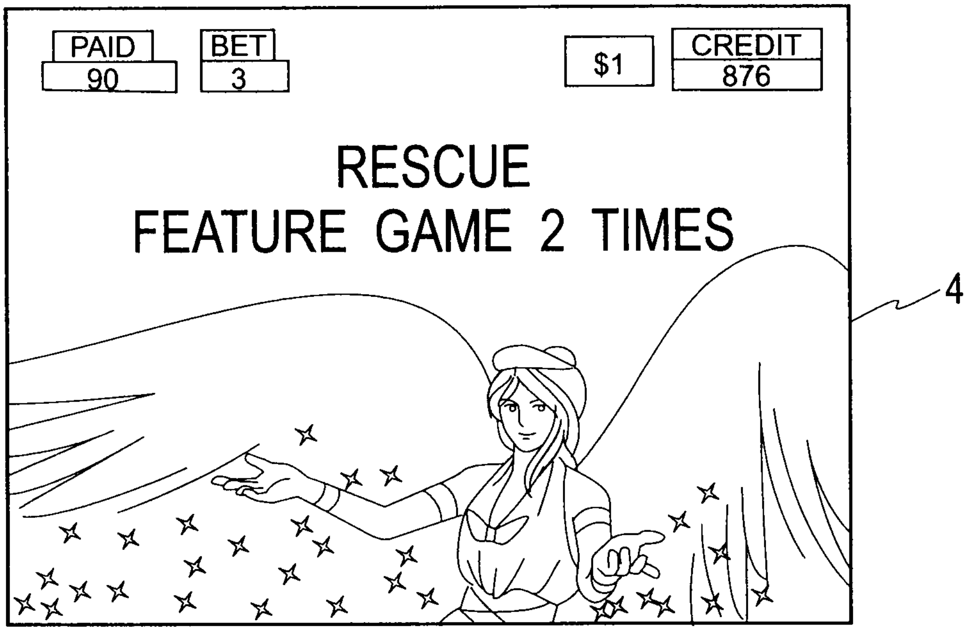
FIG. 1 is an explanatory view illustrating a display screen of a display when insurance is started and first and second feature games are started.

FIG. 1 is an explanatory view illustrating a display screen of a display when insurance is started in a gaming machine according to embodiments of the present invention. Although details are described later, when no bonus trigger is won in consecutive execution of a predetermined number of unit games, insurance including the first and second feature games is started.

Since only one feature game has been executed conventionally when the insurance is started, the player could not win many coins in the feature game. However, embodiments of the present invention allow the player to have expectations of winning many coins in the second feature game even when the player could not win many coins in the first feature game.

First Embodiment

[Explanation of Function Flow Diagram]

Figure 2:
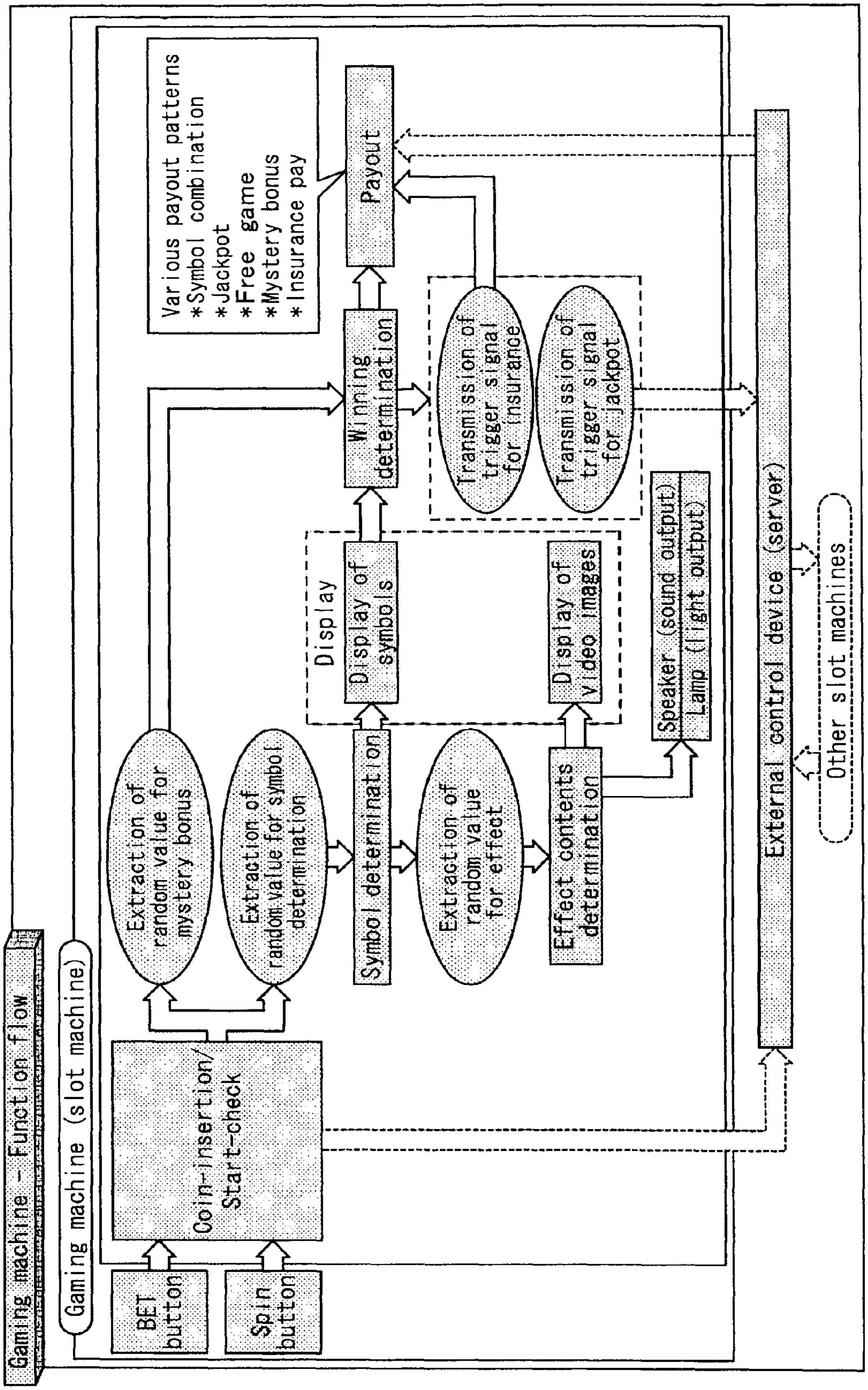
FIG. 2 is a view illustrating a function flow of a gaming machine according to an embodiment of the present invention.

With reference to FIG. 2, basic functions of a gaming machine according to the present embodiment are described. FIG. 2 is a view illustrating a function flow of the gaming machine according to an embodiment of the present invention.

<Coin-Insertion/Start-Check>

First, the gaming machine checks whether or not a BET button has been pressed by a player, and subsequently checks whether or not a spin button has been pressed by the player.

<Symbol Determination>

Next, when the spin button has been pressed by the player, the gaming machine extracts random values for symbol determination, and determines symbols to be displayed at the time of stopping scrolling of symbol arrays for the player, for a plurality of respective video reels displayed to a display.

<Symbol Display>

Next, the gaming machine starts scrolling of the symbol array of each of the video reels and then stops scrolling so that the determined symbols are displayed for the player.

<Winning Determination>

When scrolling of the symbol array of each video reel has been stopped, the gaming machine determines whether or not a combination of symbols displayed for the player is a combination related to winning.

<Payout>

When the combination of symbols displayed for the player is a combination related to winning, the gaming machine offers benefits according to the combination to the player.

For example, when a combination of symbols related to a payout of coins has been displayed, the gaming machine pays out coins of the number corresponding to the combination of symbols to the player.

Further, when a combination of symbols related to a bonus game trigger has been displayed, the gaming machine starts a bonus game. It is to be noted that, in the present embodiment, a game (free game) in which a lottery relating to the aforementioned determination of to-be stopped symbols is held a predetermined number of times without using coins is played as a bonus game.

When a combination of symbols related to a jackpot trigger is displayed, the gaming machine pays out coins in an amount of jackpot to the player. The jackpot refers to a function which accumulates parts of coins used by players at the respective gaming machines as the amount of jackpot and which, when the jackpot trigger has been established in any of the gaming machines, pays out coins of the accumulated amount of jackpot to that gaming machine.

In each game, the gaming machine calculates the amount (amount for accumulation) to be accumulated to the amount of jackpot and transmits to an external control device. The external control device accumulates to the amount of jackpot the amounts for accumulation transmitted from the respective gaming machines.

Further, in addition to the aforementioned benefits, the gaming machine is provided with benefits such as a mystery bonus and insurance.

The mystery bonus is a bonus in which a predetermined amount of coins are paid out for winning of a lottery that is intended for the mystery bonus. When the spin button has been pressed, the gaming machine extracts a random value for mystery bonus and determines whether or not to establish a mystery bonus trigger by lottery.

The insurance is a function provided for a purpose of relieving the player from a situation in which a bonus game has not been played for long periods of time. In the RAM 73 shown in FIG. 9, the insurance start condition table is set, which shows the relationship between the start of insurance and the number of unit games executed without a bonus trigger being established. In the present embodiment, the player can optionally select whether or not to make the insurance effective. Making insurance effective requires a predetermined insurance-purchase amount to be paid in exchange.

In the case where the insurance is made effective, the gaming machine starts counting the number of games (the number of unit games executed). When the number of counted games reaches a previously determined number without a large amount of a payout being provided in response to establishment of a bonus trigger or the like, the gaming machine starts the insurance and executes the two feature games (the first feature game and the second feature game) set for the insurance. Note that the gaming machine may also count, for example, the number of coins inserted by the player or a difference between the number of coins inserted and the number of coins paid out, other than the number of games, and may start the insurance when any of the count values has reached a predetermined number without a bonus trigger being established.

<Determination of Effects>

The gaming machine produces effects by displaying images to the display, outputting the light from lamps, and outputting sounds from speakers. The gaming machine extracts a random value for effect and determines contents of the effects based on the symbols and the like determined by lottery.

[Overall Game System]

The basic functions of the gaming machine have been described above. Next, with reference to FIG. 3, a game system including the gaming machine is described.

Figure 3:
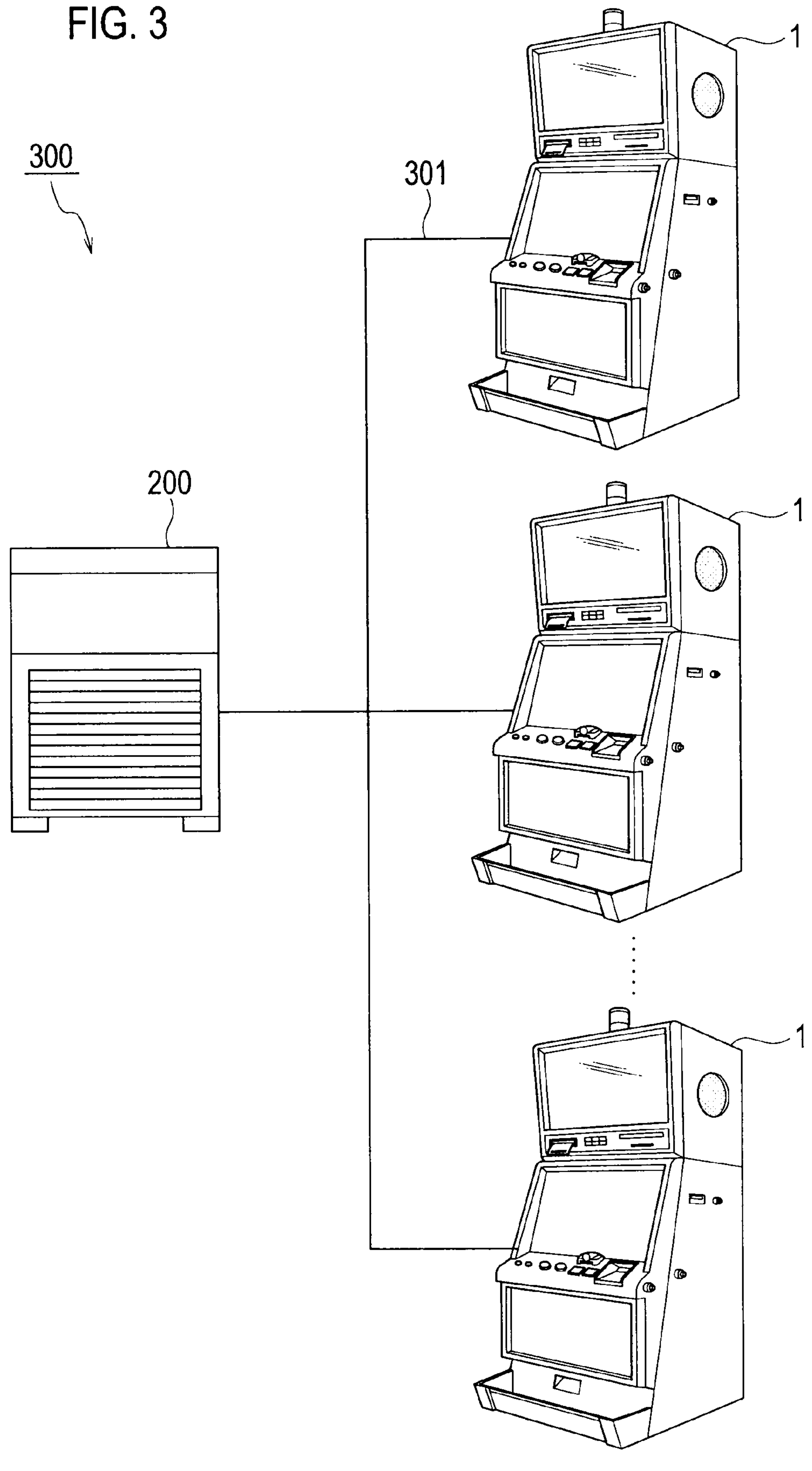
FIG. 3 is a view illustrating a game system including the gaming machine according to the embodiment of the present invention.

FIG. 3 is a view illustrating the game system including the gaming machine according to the embodiment of the present invention.

A game system 300 includes a plurality of gaming machines 1, and an external control device 200 that is connected to each of the gaming machines 1 through a communication line 301.

The external control device 200 is for controlling the plurality of gaming machines 1. In the present embodiment, the external control device 200 is a so-called hall server which is installed in a game facility having the plurality of gaming machines 1. Each of the gaming machines 1 is provided with a unique identification number, and the external control device 200 identifies transmission sources of data transmitted from the respective gaming machines 1 by using the identification numbers. Also in the case where the external control device 200 transmits data to a gaming machine 1, the identification numbers are used for specifying the transmission destination.

It is to be noted that the game system 300 may be constructed within a single game facility where various games can be conducted, such as a casino, or may be constructed among a plurality of game facilities. Further, when the game system 300 is constructed in a single game facility, the game system 300 may be constructed in each floor or section of the game facility. The communication line 301 may be a wired or wireless line, and can adopt a dedicated line, an exchange line or the like.

[Overall Configuration of Gaming Machine]

The game system according to the present embodiment has been described above. Next, with reference to FIG. 4, an overall configuration of the gaming machine 1 is described.

Figure 4:
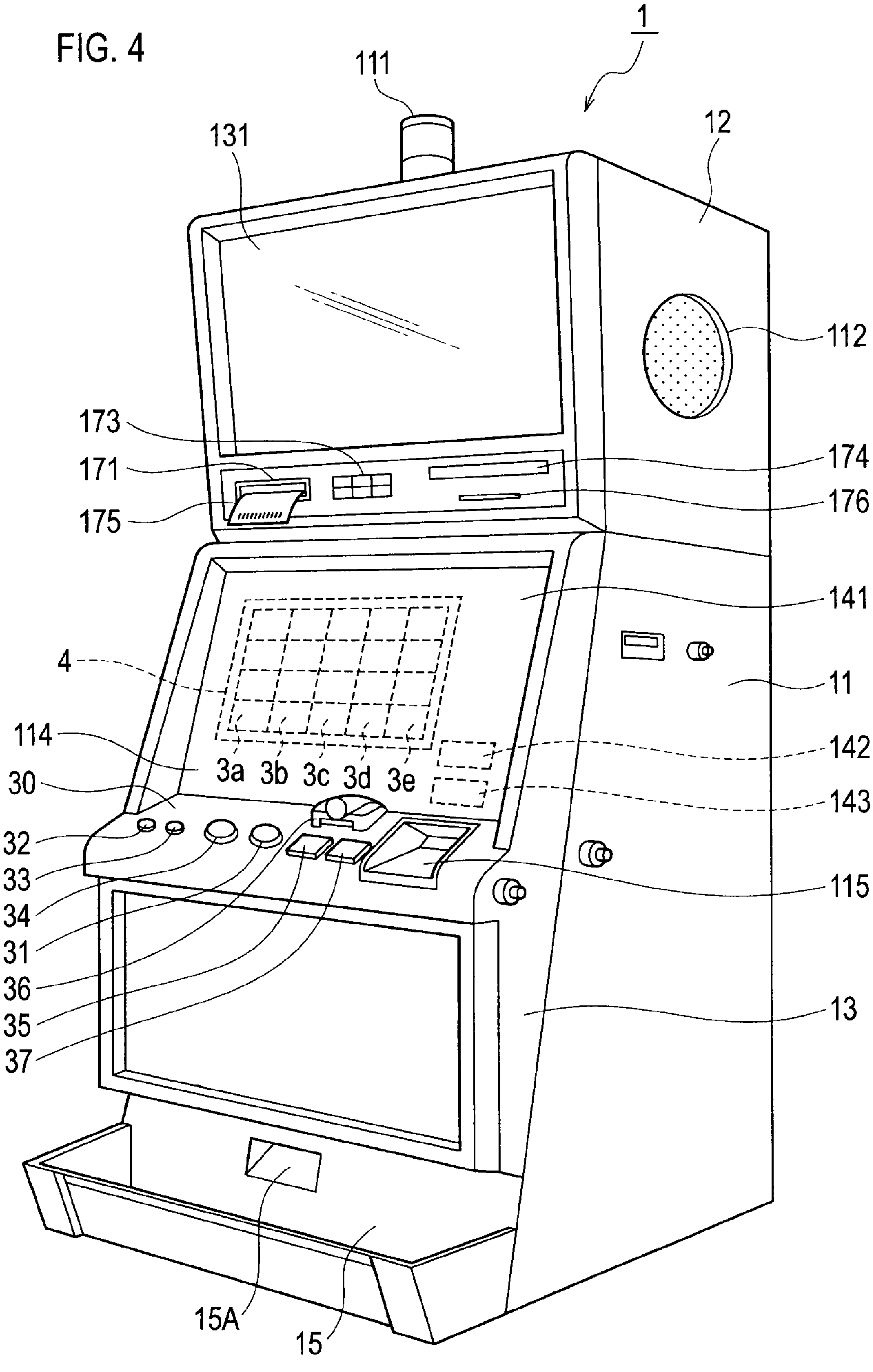
FIG. 4 is a view illustrating the overall configuration of the gaming machine according to the embodiment of the present invention.

FIG. 4 is a view illustrating the overall configuration of the gaming machine according to the embodiment of the present invention.

A coin, a bill, or electrically valuable information corresponding to these is used as a game medium in the gaming machine 1. Further, in the present embodiment, a later-described ticket with a barcode is also used. It is to be noted that the game medium is not limited to these, and for example a medal, a token, electric money or the like can be adopted.

The gaming machine 1 includes a cabinet 11, a top box 12 installed on the upper side of the cabinet 11, and a main door 13 provided at the front face of the cabinet 11.

A lower image display panel 141 is provided at the center of the main door 13. The lower image display panel 141 includes a liquid crystal panel. The lower image display panel 141 has a symbol display region 4. To the symbol display region 4, five video reels 3 (3*a*, 3*b*, 3*c*, 3*d*, 3*e*) are displayed.

In the present embodiment, a video reel depicts through videos the rotational and stop motions of a mechanical reel having a plurality of symbols drawn on the peripheral surface thereof. To each of the video reels 3, a symbol array comprised of a previously determined plurality (22 in the present embodiment) of symbols is assigned (see FIGS. 5 to 8 which are described later).

Moreover, as described later, the symbol arrays are changed when the feature games are executed. Further, when a specific symbol (e.g. a WILD symbol) is fixed in a certain region during the execution of the feature games, the specific symbol keeps being displayed in the region regardless of the symbol arrays.

In the symbol display region 4, the symbol arrays assigned to the respective video reels 3 are separately scrolled, and are stopped after predetermined time has elapsed. As a result, a part (four consecutive symbols in the present embodiment) of each of the symbol arrays is displayed for the player.

The symbol display region 4 has four regions, namely an upper region, an upper central region, a lower central region, and a lower region, for each video reel 3, and a single symbol is to be displayed to each region. That is, 20 (=5 columns×4 symbols) symbols are to be displayed in the symbol display region 4.

In the present embodiment, a line formed by selecting one of the aforementioned four regions for each of the video reels 3 and connecting the respective regions is referred to as a winning line.

It is to be noted that any desired shape of the winning line can be adopted, and examples of the shape of the winning line may include a straight line formed by connecting the upper central regions for the respective video reels 3, a V-shaped line, and a bent line. Also, any desired number of lines can be adopted, and the number can be for example 30 lines.

Further, the lower image display panel 141 has a number-of-credits display region 142 and an amount-of-payout display region 143. The number-of-credits display region 142 displays the number of coins (hereinafter also referred to as "the number of credits") owned by the player and retained inside the gaming machine 1. The amount-of-payout display region 143 displays the number of coins (hereinafter also referred to as "the amount of a payout") to be paid out to the player when winning is established.

The lower image display panel 141 has a built-in touch panel 114. The player can input various commands by touching the lower image display panel 141.

On the lower side of the lower image display panel 141, there are arranged various buttons set in a control panel 30, and various devices to be operated by the player.

A spin button 31 is used when starting scrolling of the symbol arrays of the respective video reels 3. A change button 32 is used when requesting a game facility staff member to exchange money. A CASHOUT button 33 is used when paying out the coins retained inside the gaming machine 1 to a coin tray 15.

A 1-BET button 34 and a maximum BET button 35 are used for determining the number of coins (hereinafter also referred to as "the amount of a BET") to be used in the game from the coins retained inside the gaming machine 1. The 1-BET button is used when determining one coin at a time for the aforementioned amount of a BET. The maximum BET button 35 is used when setting the aforementioned amount of a BET to a defined upper limit number. An insurance setting button 37 is used for setting insurance.

A coin accepting slot 36 is provided to accept coins. A bill validator 115 is provided to accept bills. The bill validator 115 validates a bill, and accepts a valid bill into the cabinet 11. It is to be noted that the bill validator 115 may be configured so as to be capable of reading a later-described ticket 175 with a barcode.

An upper image display panel 131 is provided at the front face of the top box 12. The upper image display panel 131 includes a liquid crystal panel, and forms the display. The upper image display panel 131 displays images related to effects and images showing introduction of the game contents and explanation of the game rules. Further, the top box 12 is provided with a speaker 112 and a lamp 111. The gaming machine 1 produces effects by displaying images, outputting sounds, and outputting the light.

A ticket printer 171, a card slot 176, a data display 174, and a keypad 173 are provided on the lower side of the upper image display panel 131.

The ticket printer 171 prints on a ticket a barcode representing encoded data of the number of credits, date, the identification number of the gaming machine 1, and the like, and outputs the ticket as the ticket 175 with a barcode. The player can make a gaming machine read the ticket 175 with a barcode so as to play a game thereon, and can also exchange the ticket 175 with a barcode with a bill or the like at a predetermined place (e.g. a cashier in a casino) in the game facility.

The card slot 176 is for inserting a card in which predetermined data is stored. For example, the card stores data for identifying the player, and data about the history of games played by the player.

When the card is inserted into the card slot 176, a later-described card reader 172 reads data from the card or writes data into the card. It is to be noted that the card may store data corresponding to a coin, a bill or a credit.

The data display 174 includes a fluorescent display, LEDs and the like, and displays the data read by the card reader 172 or the data inputted by the player via the keypad 173, for example. The keypad 173 is for inputting a command and data related to ticket issuance or the like.

[Symbol Arrays of Video Reels]

The overall configuration of the gaming machine 1 has been described above. Next, with reference to FIGS. 5 to 8, the symbol arrays included in the video reels 3 of the gaming machine 1 are described.

In the present invention, four kinds of reel patterns are set. FIG. 5 shows symbol arrays of a first reel pattern. FIG. 6 shows symbol arrays of a second reel pattern. FIG. 7 shows symbol arrays of a third reel pattern. FIG. 8 shows symbol arrays of a fourth reel pattern.

Each of the first to fourth reel patterns includes a first video reel 3*a*, a second video reel 3*b*, a third video reel 3*c*, a fourth video reel 3*d*, and a fifth video reel 3*e*. Each of the video reels 3*a* to 3*e* is assigned with a symbol array consisting of 22 symbols that correspond to respective code numbers from "00" to "21".

The first reel pattern shown in FIG. 5 includes the following symbols: "JACKPOT 7", "BLUE 7", "BELL", "CHERRY", "STRAWBERRY", "PLUM", "ORANGE", "APPLE", "K", "Q" and "J".

The second reel pattern shown in FIG. 6 includes the following symbols: "JACKPOT 7", "BLUE 7", "BELL", "CHERRY", "STRAWBERRY", "PLUM", "ORANGE" and "APPLE". Therefore, the second reel pattern includes more symbols related to winning (see FIGS. 10 and 11 which are described later) than the first reel pattern.

The third reel pattern shown in FIG. 7 includes the following symbols: "JACKPOT 7", "BLUE 7", "BELL", "CHERRY", "STRAWBERRY", "PLUM", "ORANGE", "APPLE" and "WILD" (specific symbol).

As with the third reel pattern, the fourth reel pattern shown in FIG. 8 includes the following symbols: "JACKPOT 7", "BLUE 7", "BELL", "CHERRY", "STRAWBERRY", "PLUM", "ORANGE", "APPLE" and "WILD" (specific symbol). The fourth reel pattern is different from the third reel pattern in that the four reel pattern includes more "WILD" symbols. Specifically, each of the video reels 3*a* to 3*e* in the third reel pattern has one "WILD" symbol, whereas each of the video reels 3*a* to 3*e* in the fourth reel pattern has two "WILD" symbols.

[Configuration of Circuit Included in Gaming Machine]

The configuration of the symbol arrays included in the video reels 3 of the gaming machine 1 has been described above. Next, with reference to FIG. 9, a configuration of a circuit included in the gaming machine 1 is described.

Figure 9:
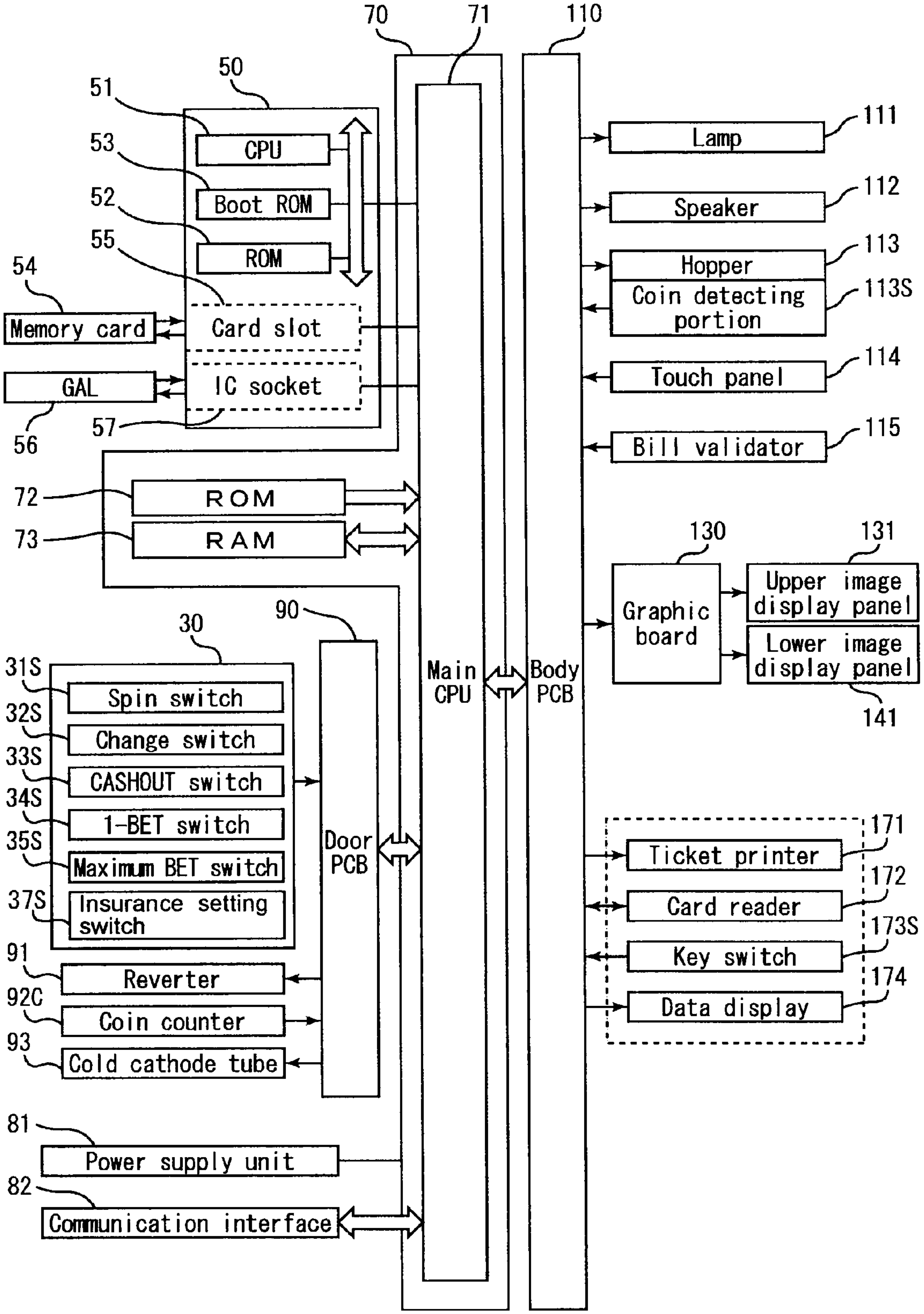
FIG. 9 is a block diagram illustrating an internal configuration of the gaming machine according to the embodiment of the present invention.

FIG. 9 is a block diagram illustrating an internal configuration of the gaming machine according to the embodiment of the present invention.

A gaming board 50 is provided with: a CPU 51, a ROM 52, and a boot ROM 53, which are mutually connected by an internal bus; a card slot 55 corresponding to a memory card 54; and an IC socket 57 corresponding to a GAL (Generic Array Logic) 56.

The memory card 54 includes a non-volatile memory, and stores a game program and a game system program. The game program includes a program related to game progression, a lottery program, and a program for producing effects by images and sounds. Further, the aforementioned game program includes data (see FIGS. 5 to 8) specifying the configuration of the symbol array assigned to each of the video reels 3*a* to 3*e*.

The lottery program is a program for determining to-be stopped symbol of each video reel 3 by lottery. The to-be stopped symbol is data for determining four symbols to be displayed to the symbol display region 4 out of the 22 symbols forming each symbol array. The gaming machine 1 of the present embodiment determines as the to-be stopped symbol the symbol to be displayed in a predetermined region (e.g. the upper region) out of the four regions provided for each of the video reels 3 of the symbol display region 4.

The aforementioned lottery program includes symbol determination data. The symbol determination data is data that specifies random values so that each of the 22 symbols (code numbers from "00" to "21") forming the symbol array is determined at an equal probability (i.e. 1/22), for each of the video reels 3*a* to 3*e*.

The probabilities of the respective 22 symbols being determined are basically equal. However, the numbers of the respective types of symbols included in the 22 symbols vary, and thus the probabilities of the respective types of symbols being determined vary (i.e. different weights on the probabilities are generated). For example, with reference to FIG. 6, the symbol array of the first video reel 3*a* includes one symbol of "JACKPOT 7", and includes seven symbols of "ORANGE". Hence, the former is determined at the probability of "1/22", whereas the latter is determined at the probability of "7/22".

It is to be noted that, although the data specifies that the equal numbers of symbols be provided to form the symbol arrays of the respective video reels 3 in the present embodiment, different numbers of symbols may form the respective video reels 3*a* to 3*e*. For example, the symbol array of the first video reel 3*a* may consist of 22 symbols whereas the symbol array of the second video reel 3*b* may consist of 30 symbols. Such a configuration increases the degree of freedom in setting the probabilities of the respective types of symbols being determined for each video reel 3.

Further, the card slot 55 is configured so that the memory card 54 can be inserted thereinto and removed therefrom, and is connected to a motherboard 70 (a controller) by an IDE bus.

The GAL 56 is a type of PLD (Programmable Logic Device) having a fixed OR array structure. The GAL 56 is provided with a plurality of input ports and output ports, and predetermined input into the input port causes output of the corresponding data from the output port.

Further, the IC socket 57 is configured so that the GAL 56 can be inserted thereinto and removed therefrom, and is connected to the motherboard 70 by a PCI bus. The contents of the game to be played on the gaming machine 1 can be changed by replacing the memory card 54 with another memory card 54 having another program written therein or by rewriting the program written into the memory card 54 as another program.

The CPU 51, the ROM 52 and the boot ROM 53 mutually connected by the internal bus are connected to the motherboard 70 by a PCI bus. The PCI bus enables a signal transmission between the motherboard 70 and the gaming board 50, and power supply from the motherboard 70 to the gaming board 50.

The ROM 52 stores an authentication program. The boot ROM 53 stores a pre-authentication program, a program (boot code) to be used by the CPU 51 for activating the pre-authentication program, and the like.

The authentication program is a program (tamper check program) for authenticating the game program and the game system program. The pre-authentication program is a program for authenticating the aforementioned authentication program. The authentication program and the pre-authentication program are written along a procedure (authentication procedure) for proving that the program to be the subject has not been tampered.

The motherboard 70 is provided with a main CPU 71, a ROM 72, a RAM 73, and a communication interface 82.

The ROM 72 includes a memory device such as a flash memory, and stores a program such as BIOS to be executed by the main CPU 71, and permanent data. When the BIOS is executed by the main CPU 71, processing for initializing predetermined peripheral devices is conducted; further, through the gaming board 50, processing of loading the game program and the game system program stored in the memory card 54 is started.

The RAM 73 stores data and programs which are used in operation of the main CPU 71. For example, when the processing of loading the aforementioned game program, game system program or authentication program is conducted, the RAM 73 can store the program. The RAM 73 is provided with working areas used for operations in execution of these programs. Examples of the areas include: an area that stores the number of games, the amount of a BET, the amount of a payout, the number of credits and the like; and an area that stores symbols (code numbers) determined by lottery.

The communication interface 82 is for communicating with the external control device 200 such as a server, through the communication line 301. Further, the motherboard 70 is connected with a later-described door PCB (Printed Circuit Board) 90 and a body PCB 110 by respective USBs. The motherboard 70 is also connected with a power supply unit 81.

When the power is supplied from the power supply unit 81 to the motherboard 70, the main CPU 71 of the motherboard 70 is activated, and then the power is supplied to the gaming board 50 through the PCI bus so as to activate the CPU 51.

The door PCB 90 and the body PCB 110 are connected with input devices such as a switch and a sensor, and peripheral devices the operations of which are controlled by the main CPU 71.

The door PCB 90 is connected with a control panel 30, a reverter 91, a coin counter 92C and a cold cathode tube 93.

The control panel 30 is provided with a spin switch 31S, a change switch 32S, a CASHOUT switch 33S, a 1-BET switch 34S a maximum BET switch 35S and an insurance setting switch 37S which correspond to the aforementioned respective buttons. Each of the switches outputs a signal to the main CPU 71 upon detection of press of the button corresponding thereto by the player.

The coin counter 92C validates a coin inserted into the coin accepting slot 36 based on its material, shape and the like, and outputs a signal to the main CPU 71 upon detection of a valid coin. Invalid coins are discharged from a coin payout exit 15A.

The reverter 91 operates based on a control signal outputted from the main CPU 71, and distributes valid coins validated by the coin counter 92C into a hopper 113 or a cash box (not illustrated). That is, coins are distributed into the hopper 113 when the hopper 113 is not filled with coins, while coins are distributed into the cash box when the hopper 113 is filled with coins.

The cold cathode tube 93 functions as a backlight installed on the rear face sides of the upper image display panel 131 and the lower image display panel 141, and lights up based on a control signal outputted from the main CPU 71.

The body PCB 110 is connected with the lamp 111, the speaker 112, the hopper 113, a coin detecting portion 113S, the touch panel 114, the bill validator 115, a graphic board 130, the ticket printer 171, the card reader 172, a key switch 173S and the data display 174.

The lamp 111 lights up based on a control signal outputted from the main CPU 71. The speaker 112 outputs sounds such as BGM, based on a control signal outputted from the main CPU 71.

The hopper 113 operates based on a control signal outputted from the main CPU 71, and pays out coins of the specified amount of a payout from the coin payout exit 15A to the coin tray 15. The coin detecting portion 113S outputs a signal to the main CPU 71 upon detection of coins paid out by the hopper 113.

The touch panel 114 detects a place on the lower image display panel touched by the player's finger or the like, and outputs to the main CPU 71 a signal corresponding to the detected place. Upon acceptance of a valid bill, the bill validator 115 outputs to the main CPU 71 a signal corresponding to the face amount of the bill.

The graphic board 130 controls display of images conducted by the respective upper image display panel 131 and lower image display panel 141, based on a control signal outputted from the main CPU 71. The symbol display region 4 of the lower image display panel 141 displays the five video reels 3*a* to 3*e* by which the scrolling and stop motions of the symbol arrays included in the respective video reels 3*a* to 3*e* are displayed. The graphic board 130 is provided with a VDP generating image data, a video RAM temporarily storing the image data generated by the VDP, and the like. The number-of-credits display region 142 of the lower image display panel 141 displays the number of credits stored in the RAM 73. The amount-of-payout display region 143 of the lower image display panel 141 displays the amount of a payout of coins.

The graphic board 130 is provided with the VDP (Video Display Processor) generating image data based on a control signal outputted from the main CPU 71, the video RAM temporarily storing the image data generated by the VDP, and the like. It is to be noted that the image data used in generation of image data by the VDP is included in the game program that has been read from the memory card 54 and stored into the RAM 73.

Based on a control signal outputted from the main CPU 71, the ticket printer 171 prints on a ticket a barcode representing encoded data of the number of credits stored in the RAM 73, date, the identification number of the gaming machine 1, and the like, and then outputs the ticket as the ticket 175 with a barcode.

The card reader 172 reads data stored in a card inserted into the card slot 176 and transmits the data to the main CPU 71, or writes data into the card based on a control signal outputted from the main CPU 71.

The key switch 173S is provided in the keypad 173, and outputs a predetermined signal to the main CPU 71 when the keypad 173 has been operated by the player.

The data display 174 displays data read by the card reader 172 and data inputted by the player through the keypad 173, based on a control signal outputted from the main CPU 71.

[Configuration of Payout Table]

The circuit configuration of the gaming machine 1 has been described above. Next, with reference to FIGS. 10 and 11, payout tables are described. In the gaming machine according to the embodiment of the present invention, two kinds of payout tables, namely a first payout table and a second payout table are set.

FIG. 10 is a view illustrating the first payout table, and FIG. 11 is a view illustrating the second payout table. Each of the payout tables specifies combinations of symbols related to winning, and the amount of a payout. In the gaming machine 1, winning is established when the scrolling of symbol arrays of the respective video reels 3 is stopped, and the combination of symbols displayed along the winning line matches one of the combinations of symbols specified by the payout table.

According to the winning combination, a benefit such as payout of coins or start of a bonus game is offered to the player. It is to be noted that winning is not established (i.e. the game is lost) when the combination of symbols displayed along the winning line does not match any of the combinations of symbols specified by the payout table.

Basically, winning is established when all symbols displayed along the winning line by the respective video reels 3 are of one type out of "JACKPOT 7", "APPLE", "BLUE 7", "BELL", "CHERRY", "STRAWBERRY", "PLUM" and "ORANGE". However, with respect to the respective types of symbols of "CHERRY" and "ORANGE", winning is also established when one or three symbols of either type are displayed along the winning line by the video reels 3.

For example, for the first payout table illustrated in FIG. 10, when all the symbols displayed along the winning line by all the video reels 3 are "BLUE 7", the winning combination is "BLUE", and "10" is determined as the amount of a payout. Based on the determined amount of a payout, payout of coins is conducted. The payout of coins is conducted by actually discharging coins from the coin payout exit 15A or adding the determined amount of a payout to the number of credits, or issuing a ticket with a barcode.

"JACKPOT 7" is a symbol related to the jackpot trigger. When all the symbols displayed along the winning line by all the video reels 3 are "JACKPOT 7", the winning combination is "jackpot", and the amount of jackpot is determined as the amount of a payout.

"APPLE" is a symbol related to a free game trigger. When all the symbols displayed along the winning line by all the video reels 3 are "APPLE", the winning combination is "free game trigger", and a free game starts from the next game. Note that when all the symbols displayed along the winning line during the free game are "APPLE", the winning combination is "APPLE", and "20" is determined as the amount of the payout.

Further, the second payout table shown in FIG. 11 is set so that more coins are paid out when winning is established, compared with the first payout table shown in FIG. 10.

[Contents of Program]

The payout table has been described above. Next, with reference to FIGS. 12 to 23, the program to be executed by the gaming machine 1 is described.

<Main Control Processing>

Figure 12:
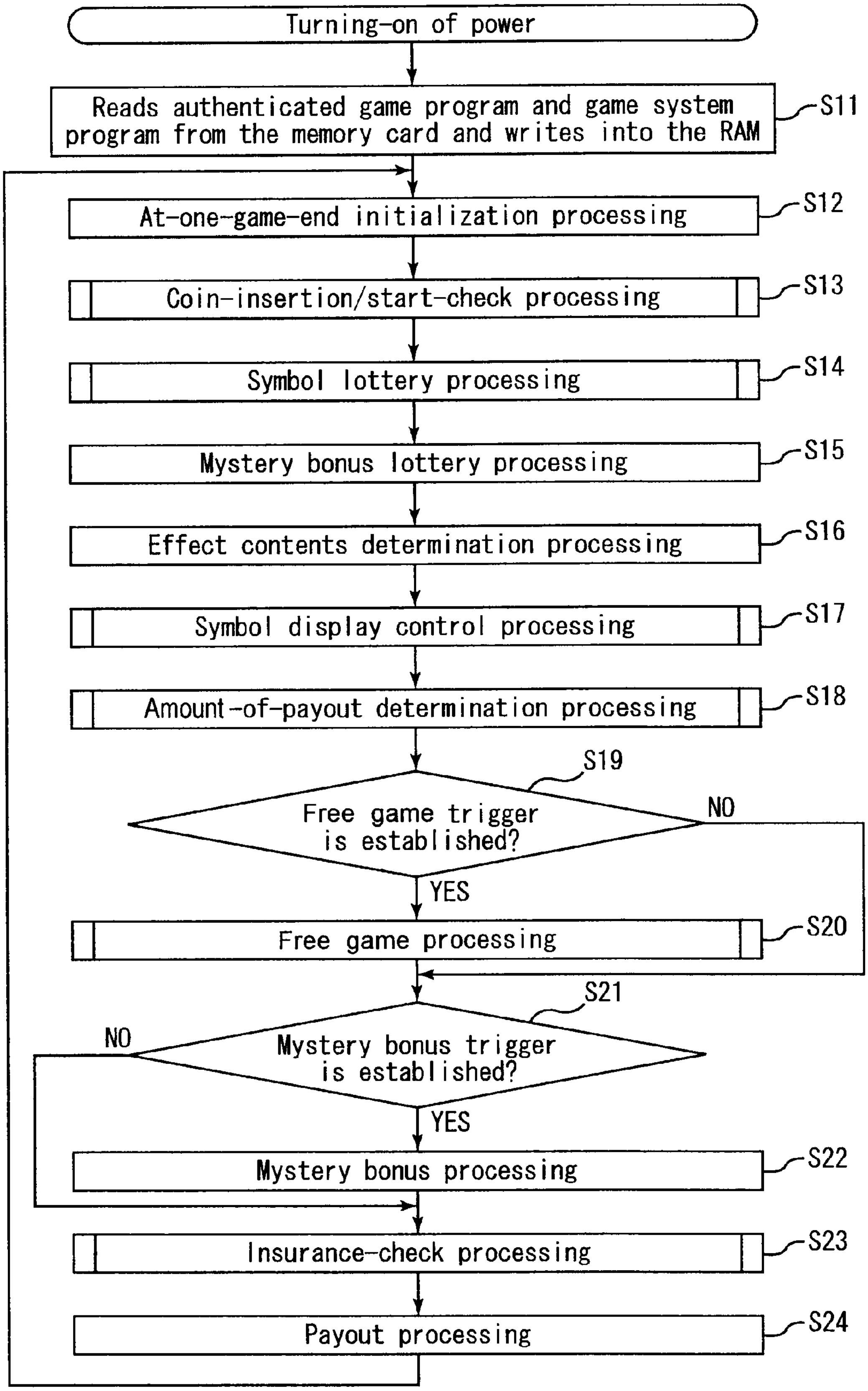
FIG. 12 is a view illustrating a flowchart of a main control processing of the gaming machine according to the embodiment of the present invention.

First, with reference to FIG. 12, main control processing is described.

FIG. 12 is a view illustrating a flowchart of the main control processing for the gaming machine according to the embodiment of the present invention.

First, when the power is supplied to the gaming machine 1, the main CPU 71 reads the authenticated game program and game system program from the memory card 54 through the gaming board 50, and writes the programs into the RAM 73 (step S11).

Next, the main CPU 71 conducts at-one-game-end initialization processing (step S12). For example, data that becomes unnecessary after each game in the working areas of the RAM 73, such as the amount of a BET and the symbols determined by lottery, is cleared.

The main CPU 71 conducts coin-insertion/start-check processing which is described later with reference to FIG. 13 (step S13). In the processing, input from the BET switch and the spin switch is checked.

The main CPU 71 then conducts symbol lottery processing which is described later with reference to FIG. 16 (step S14). In the processing, to-be stopped symbols are determined based on the random values for symbol determination.

Next, the main CPU 71 conducts mystery bonus lottery processing (step S15). In the processing, lottery determining whether or not to establish a mystery bonus trigger is held. For example, the main CPU 71 extracts a random value for mystery bonus from the numbers in a range of "0 to 99", and establishes the mystery bonus trigger when the extracted random value is "0".

The main CPU 71 conducts effect contents determination processing (step S16). The main CPU 71 extracts a random value for effect, and determines any of the effect contents from the preset plurality of effect contents by lottery.

The main CPU 71 then conducts symbol display control processing which is described later with reference to FIG. 17 (step S17). In the processing, scrolling of the symbol array of each video reel 3 is started, and the to-be stopped symbol determined in the symbol lottery processing of step S14 is stopped at a predetermined position (e.g. the upper region in the symbol display region 4). That is, four symbols including the to-be stopped symbol are displayed in the symbol display region 4. For example, when the to-be stopped symbol is the symbol associated with the code number of "10" and it is to be displayed to the upper region, the symbols associated with the respective code numbers of "11", "12" and "13" are to be displayed to the respective upper central region, lower central region and lower region in the symbol display region 4.

Next, the main CPU 71 conducts amount-of-payout determination processing which is described later with reference to FIG. 18 (step S18). In the processing, the amount of a payout is determined based on the combination of symbols displayed along the winning line, and is stored into an amount-of-payout storage area provided in the RAM 73.

The main CPU 71 then determines whether or not the free game trigger has been established (step S19). When the main CPU 71 determines that the free game trigger has been established, the main CPU 71 conducts free game processing which is described later with reference to FIG. 22 (step S20).

After the processing of step S20 or when determining in step S19 that the free game trigger has not been established, the main CPU 71 determines whether or not the mystery bonus trigger is established (step S21). When determining that the mystery bonus trigger has been established, the main CPU 71 conducts the mystery bonus processing (step S22). In the processing, the amount of a payout (e.g. 300) being set for the mystery bonus is stored into the amount-of-payout storage area provided in the RAM 73.

After the processing of step S22 or when determining in step S21 that the mystery bonus trigger has not been established, the main CPU 71 conducts insurance-check processing which is described later with reference to FIG. 19 (step S23). In the processing, whether or not to conduct payout by the insurance is checked.

The main CPU 71 conducts payout processing (step S24). The main CPU 71 adds the value stored in the amount-of-payout storage area to a value stored in a number-of-credits storage area provided in the RAM 73. It is to be noted that operations of the hopper 113 may be controlled based on input from the CASHOUT switch 33S, and coins of the number corresponding to the value stored in the amount-of-payout storage area may be discharged from the coin payout exit 15A. Further, operations of the ticket printer 171 may be controlled and a ticket with a barcode may be issued on which a value stored in the amount-of-payout storage area is recorded. After the processing has been conducted, the processing is shifted to step S12.

<Coin-Insertion/Start-Check Processing>

Figure 13:
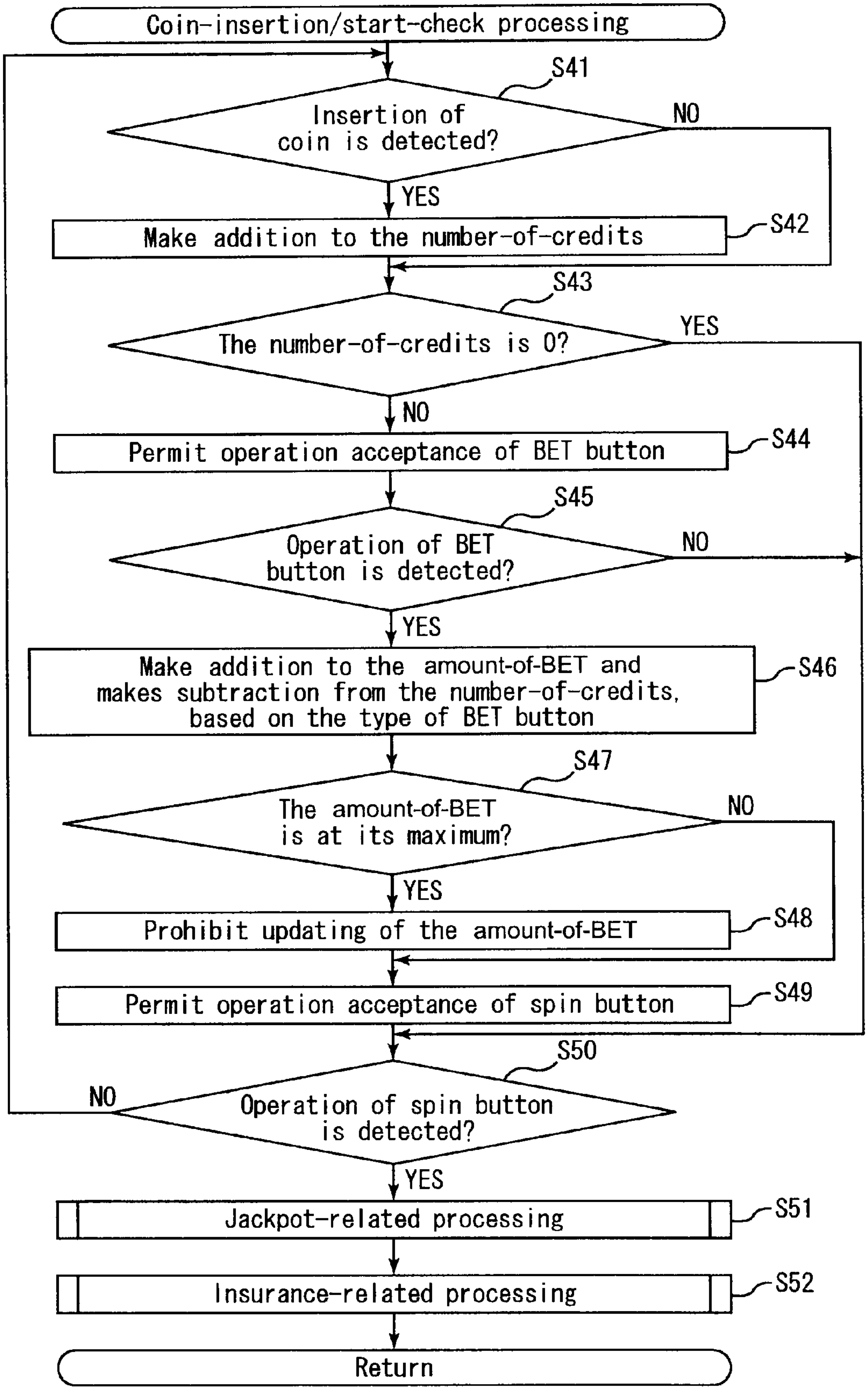
FIG. 13 is a view illustrating a flowchart of a coin-insertion/start-check processing of the gaming machine according to the embodiment of the present invention.

Next, with reference to FIG. 13, coin-insertion/start-check processing is described.

FIG. 13 is a view illustrating a flowchart of the coin-insertion/start-check processing for the gaming machine according to the first to eight embodiments of the present invention.

First, the main CPU 71 determines whether or not insertion of a coin has been detected by the coin counter 92C (step S41). When determining that the insertion of a coin has been detected by the coin counter 92C, the main CPU 71 makes an addition to the value stored in the number-of-credits storage area (step S42). It is to be noted that, in addition to the insertion of a coin, the main CPU 71 may determine whether or not insertion of a bill has been detected by the bill validator 115, and when determining that the insertion of a bill has been detected, the main CPU 71 may add a value according to the bill to the value stored in the number-of-credits storage area.

After step S42 or when determining in step S41 that the insertion of a coin has not been detected, the main CPU 71 determines whether or not the value stored in the number-of-credits storage area is zero (step S43). When the main CPU 71 determines that the value stored in the number-of-credits storage area is not zero, the main CPU 71 permits operation acceptance of the BET buttons (step S44).

Next, the main CPU 71 determines whether or not operation of any of the BET buttons has been detected (step S45). When the main CPU 71 determines that the BET switch has detected press of the BET button by the player, the main CPU 71 makes an addition to a value stored in an amount-of-BET storage area provided in the RAM 73 and makes a subtraction from the value stored in the number-of-credits storage area, based on the type of the BET button (step S46).

The main CPU 71 then determines whether or not the value stored in the amount-of-BET storage area is at its maximum (step S47). When the main CPU 71 determines that the value stored in the amount-of-BET storage area is at its maximum, the main CPU 71 prohibits updating of the value stored in the amount-of-BET storage area (step S48). After step S48 or when determining in step S47 that the value stored in the amount-of-BET storage area is not at its maximum, the main CPU 71 permits operation acceptance of the spin button (step S49).

After step S49 or when determining in step S45 that the operation of any of the BET buttons has not been detected, or when determining in step S43 that the value stored in the number-of-credits storage area is zero, the main CPU 71 determines whether or not operation of the spin button has been detected (step S50). When the main CPU 71 determines that the operation of the spin button has not been detected, the processing is shifted to step S41.

When the main CPU 71 determines that the operation of the spin button has been detected, the main CPU 71 conducts jackpot-related processing which is described later with reference to FIG. 14 (step S51). In the processing, the amount to be accumulated to the amount of jackpot is calculated, and the amount is transmitted to the external control device 200.

Next, the main CPU 71 conducts insurance-related processing which is described later with reference to FIG. 15 (step S52). In the processing, counting of the number of games is conducted which triggers a payout by the insurance. After the processing has been conducted, the coin-insertion/start-check processing is completed.

<Jackpot-Related Processing>

Figure 14:
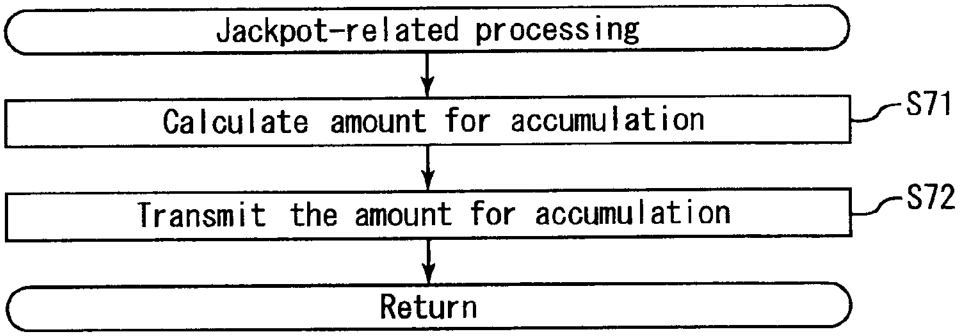
FIG. 14 is a view illustrating a flowchart of a jackpot-related processing of the gaming machine according to the embodiment of the present invention.

Now, with reference to FIG. 14, the jackpot-related processing is described.

FIG. 14 is a view illustrating a flowchart of the jackpot-related processing for the gaming machine according to the embodiment of the present invention.

First, the main CPU 71 calculates the amount for accumulation (step S71). The main CPU 71 obtains the product of the value stored in the amount-of-BET storage area and a preset accumulation ratio, so that the amount for accumulation to the amount of jackpot is calculated.

Next, the main CPU 71 transmits the calculated amount for accumulation to the external control device 200 (step S72). Upon reception of the amount for accumulation, the external control device 200 updates the amount of jackpot. After the processing has been conducted, the jackpot-related processing is completed.

<Insurance-Related Processing>

Figure 15:
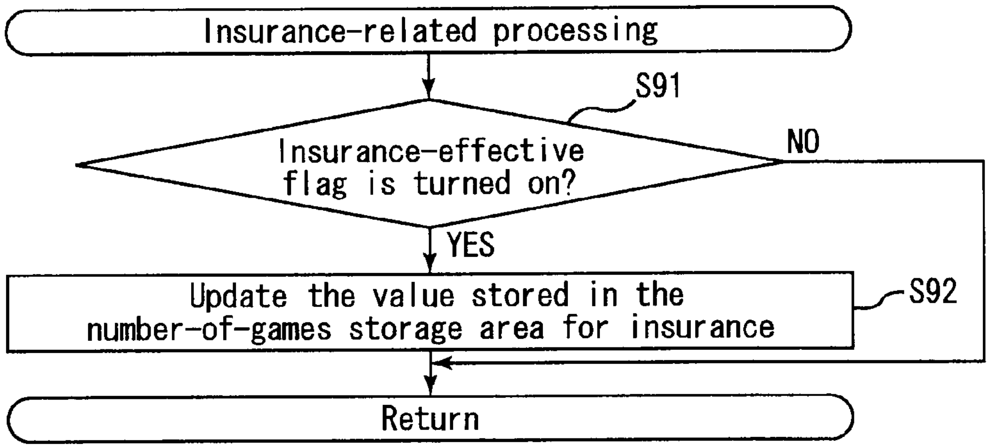
FIG. 15 is a view illustrating a flowchart of an insurance-related processing of the gaming machine according to the embodiment of the present invention.

Next, with reference to FIG. 15, the insurance-related processing is described.

FIG. 15 is a view illustrating a flowchart of the insurance-related processing for the gaming machine according to the embodiment of the present invention.

First, the main CPU 71 determines whether or not an insurance-effective flag is turned on (step S91). The insurance-effective flag is turned on when a command to make the insurance effective is inputted by the player in the insurance selection processing which is described later with reference to FIG. 23.

When the main CPU 71 determines that the insurance-effective flag is not turned on, the main CPU 71 completes the insurance-related processing. On the other hand, when the main CPU 71 determines that the insurance-effective flag is turned on, the main CPU 71 updates a value stored in a number-of-games storage area for insurance provided in the RAM 73 (a count value incremented along with execution of a unit game) (step S92). The number-of-games storage area for insurance is an area for storing the number of games up to the time of the payout by the insurance. In the processing of step S92, the main CPU 71 adds one to the value stored in the number-of-games storage area for insurance. After the processing has been conducted, the insurance-related processing is completed.

<Symbol Lottery Processing>

Figure 16:
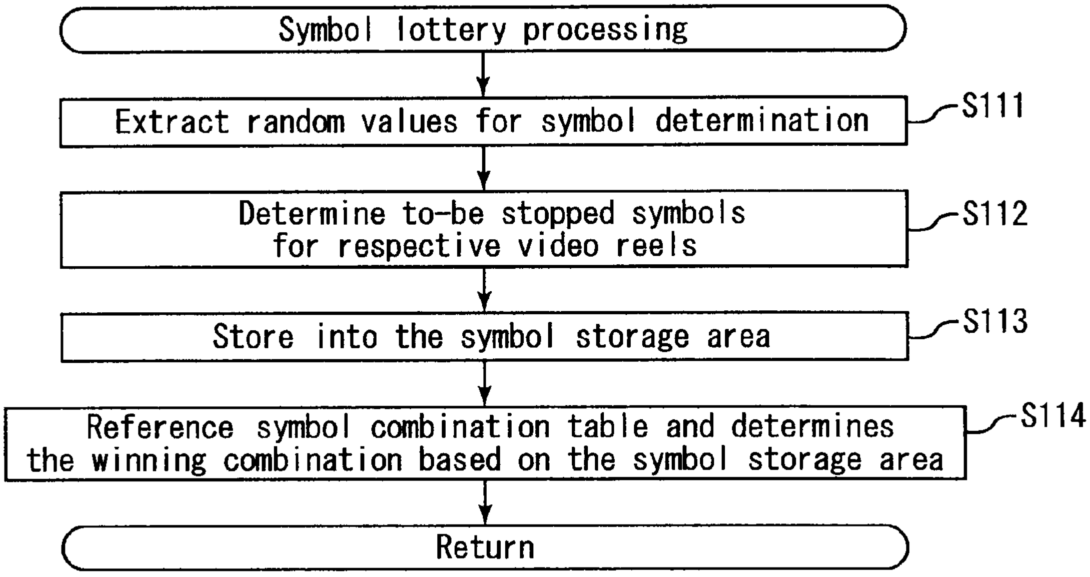
FIG. 16 is a view illustrating a flowchart of a symbol lottery processing of the gaming machine according to the embodiment of the present invention.

Next, with reference to FIG. 16, the symbol lottery processing is described.

FIG. 16 is a view illustrating a flowchart of the symbol lottery processing for the gaming machine according to the embodiment of the present invention.

First, the main CPU 71 extracts random values for symbol determination (step S111). The main CPU 71 then determines to-be stopped symbols for the respective video reels 3 by lottery (step S112). The main CPU 71 holds a lottery for each video reel 3, and determines any one of the 22 symbols (code numbers from "00" to "21") as a to-be stopped symbol. At this time, each of the 22 symbols (code numbers from "00" to "21") is determined at an equal probability (i.e. 1/22).

The main CPU 71 then stores the determined to-be stopped symbols for the respective video reels 3 into a symbol storage area provided in the RAM 73 (step S113). Next, the main CPU 71 references the first payout table (FIG. 10) and determines a winning combination based on the symbol storage area (step S114). The main CPU 71 determines whether or not the combination of symbols to be displayed along the winning line by the respective video reels 3 matches any of the combinations of symbols specified by the payout table, and determines the winning combination. After the processing has been conducted, the symbol lottery processing is completed.

<Symbol Display Control Processing>

Figure 17:
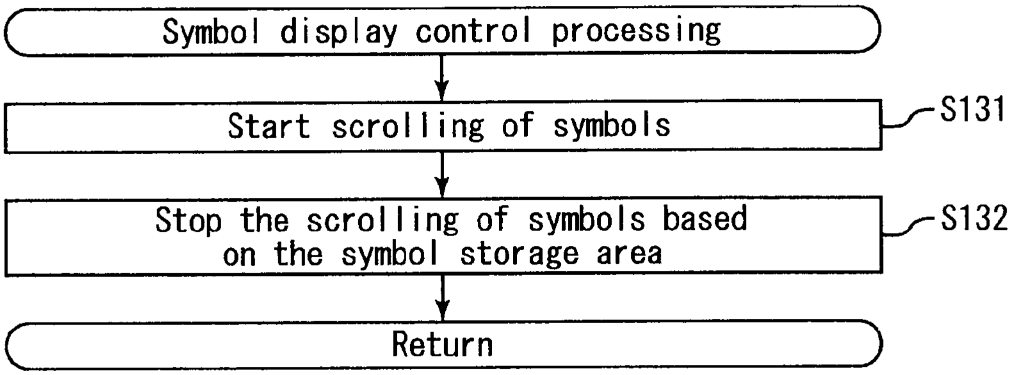
FIG. 17 is a view illustrating a flowchart of a symbol display control processing of the gaming machine according to the embodiment of the present invention.

Next, with reference to FIG. 17, the symbol display control processing is described.

FIG. 17 is a view illustrating a flowchart of the symbol display control processing for the gaming machine according to the embodiment of the present invention.

First, the main CPU 71 starts scrolling of the symbol arrays of the respective video reels 3 that are displayed to the symbol display region 4 of the lower image display panel 141 (step S131). The main CPU 71 then stops the scrolling of the symbol arrays of the respective video reels 3, based on the aforementioned symbol storage area (step S132). After the processing has been conducted, the symbol display control processing is completed.

<Amount-of-Payout Determination Processing>

Figure 18:
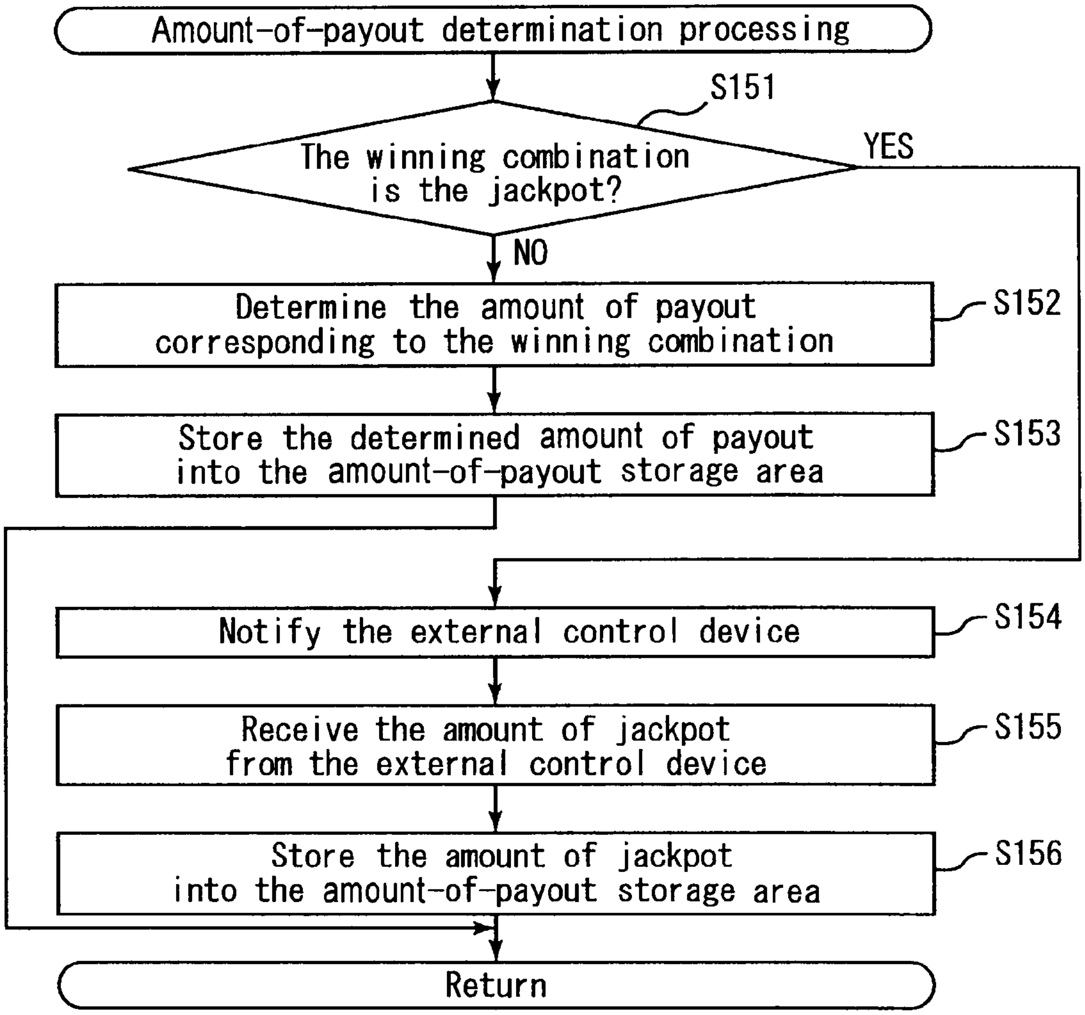
FIG. 18 is a view illustrating a flowchart of an amount-of-payout determination processing of the gaming machine according to the embodiment of the present invention.

Next, with reference to FIG. 18, the amount-of-payout determination processing is described.

FIG. 18 is a view illustrating a flowchart of the amount-of-payout determination processing for the gaming machine according to the embodiment of the present invention.

The main CPU 71 first determines whether or not the winning combination is the jackpot (step S151). When the main CPU 71 determines that the winning combination is not the jackpot, the main CPU 71 determines the amount of payout corresponding to the winning combination (step S152). For example, when the winning combination is "BELL", the main CPU 71 determines "8" as the amount of a payout (see FIG. 10). It is to be noted that the main CPU 71 determines "0" as the amount of a payout in the case where the game is lost. Next, the main CPU 71 stores the determined amount of a payout into the amount-of-payout storage area (step S153). After the processing has been conducted, the amount-of-payout determination processing is completed.

When the main CPU 71 determines that the winning combination is the jackpot, the main CPU 71 notifies the external control device 200 of the winning of the jackpot (step S154). It is to be noted that, upon reception of the notification, the external control device 200 transmits to the gaming machine 1 the amount of jackpot having updated up to that time. At this time, a part (e.g. 80%) of the amount of jackpot may be the payout subject and the rest (e.g. 20%) may be carried over for the upcoming establishment of the jackpot trigger.

Next, the main CPU 71 receives the amount of jackpot from the external control device 200 (step S155). The main CPU 71 then stores the received amount of jackpot into the amount-of-payout storage area (step S156). After the processing has been conducted, the amount-of-payout determination processing is completed.

<Insurance-Check Processing>

Figure 19:
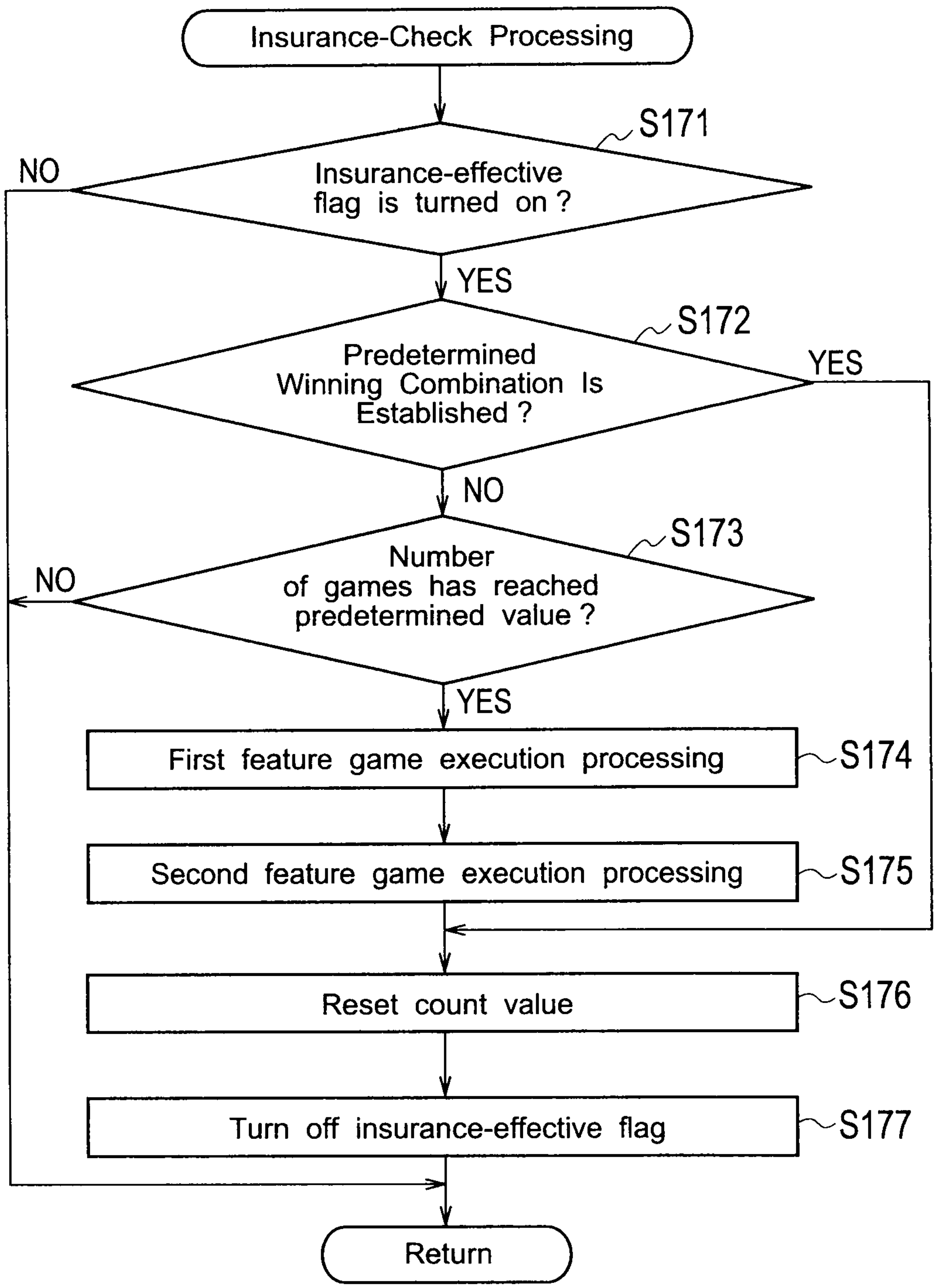
FIG. 19 is a view illustrating a flowchart of an insurance-check processing of the gaming machine according to the embodiment of the present invention.

Next, with reference to FIG. 19, the insurance-check processing is described.

FIG. 19 is a view illustrating a flowchart of the insurance-check processing for the gaming machine according to the embodiment of the present invention.

First, the main CPU 71 determines whether or not the insurance-effective flag is turned on (step S171). When the main CPU 71 determines that the insurance-effective flag is not turned on, the main CPU 71 completes the insurance-check processing.

When the main CPU 71 determines that the insurance-effective flag is turned on, the main CPU 71 determines whether or not a predetermined winning combination has been established (step S172). In the present embodiment, “free game trigger”, “jackpot” and “mystery bonus” are subjects of the predetermined winning combination.

When the main CPU 71 determines that the predetermined winning combination has not been established, the main CPU 71 determines whether or not the count value stored in the number-of-games storage area for insurance has reached a predetermined number of times (e.g. 800) (step S173). When the main CPU 71 determines that the count value stored in the number-of-games storage area for insurance has not reached the predetermined number of times, the main CPU 71 completes the insurance-check processing.

When the main CPU 71 determines that the count value stored in the number-of-games storage area for insurance has reached the predetermined number of times, the main CPU 71 performs a first feature game (step S174). Detailed processing procedures of the first feature game are described later.

The main CPU 71 then performs a second feature game (step S175). Details of the second feature game are described later.

After step S175 or when determining in step S172 that the predetermined winning combination has been established, the main CPU 71 resets the value stored in the number-of-games storage area for insurance (step S176). Next, the main CPU 71 turns the insurance-effective flag off (step S177). After the processing has been conducted, the insurance-check processing is completed.

<First Feature Game Execution Processing>

Figure 20:
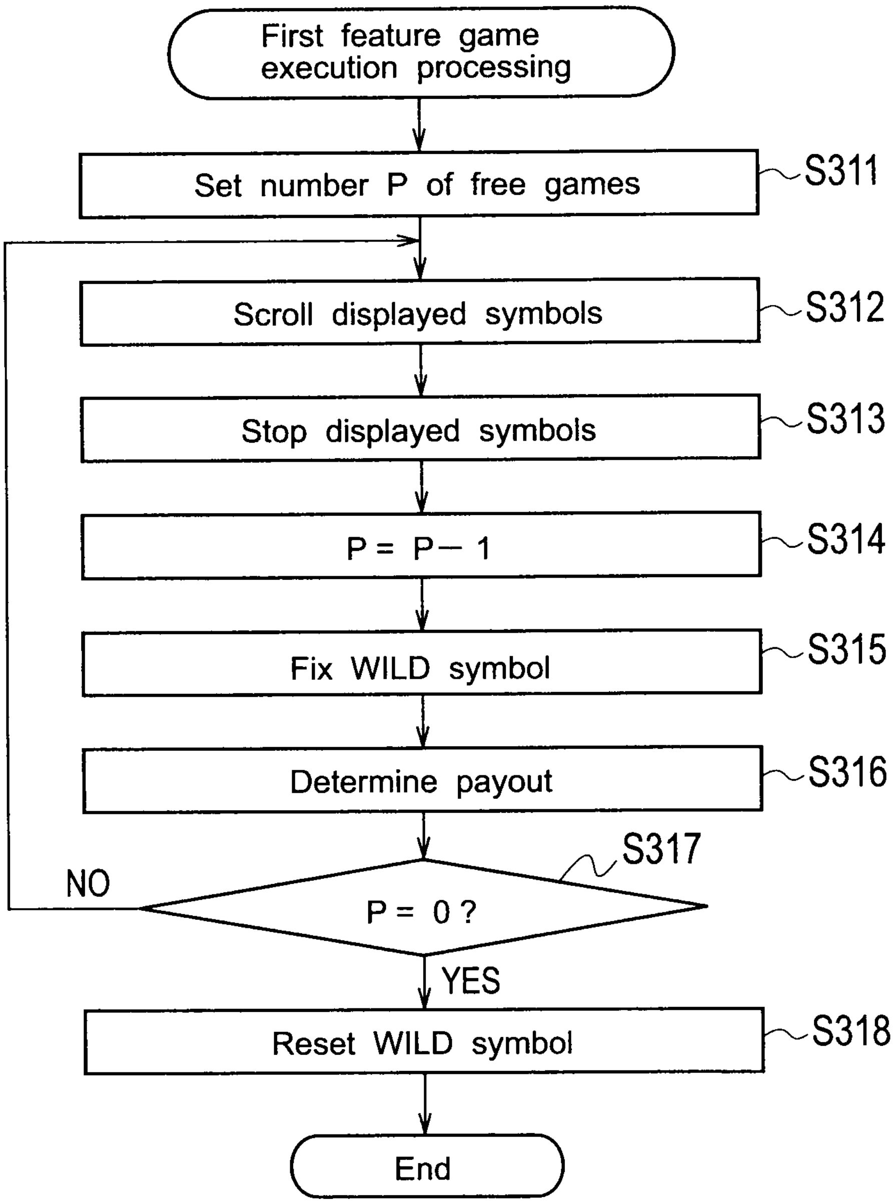
FIG. 20 is a view illustrating a flowchart of a first feature game execution processing of a gaming machine according to the first embodiment of the present invention.

Next, with reference to FIG. 20, the first feature game execution processing shown in step S174 of FIG. 19 is described. In the first feature game, the symbol arrays of the third reel pattern shown in FIG. 7 are used. Specifically, the symbol arrays including the WILD symbols are used.

First, the main CPU 71 sets the number P of free games to be executed (step S311).

The main CPU 71 scrolls the symbols displayed in the symbol display region 4 with five columns (step S312), and stops the displayed symbols after a lapse of predetermined time (step S313).

The main CPU 71 subtracts one from the number P of free games (step S314).

Figure 24:
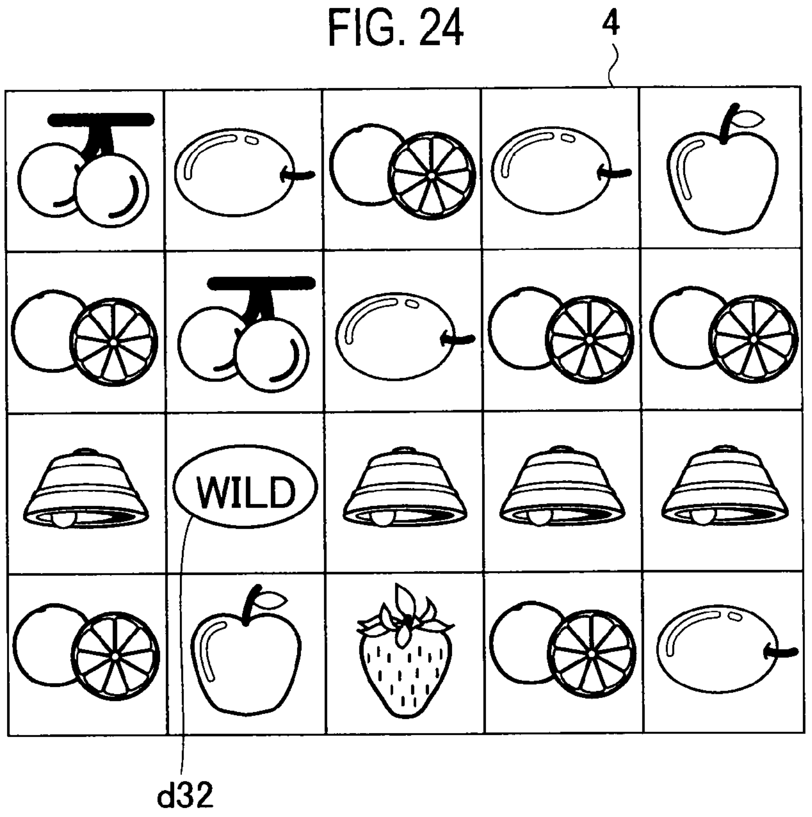
FIG. 24 is an explanatory view illustrating a symbol display region in which a WILD symbol is displayed, of the gaming machine according to the embodiment of the present invention.
Figure 25:
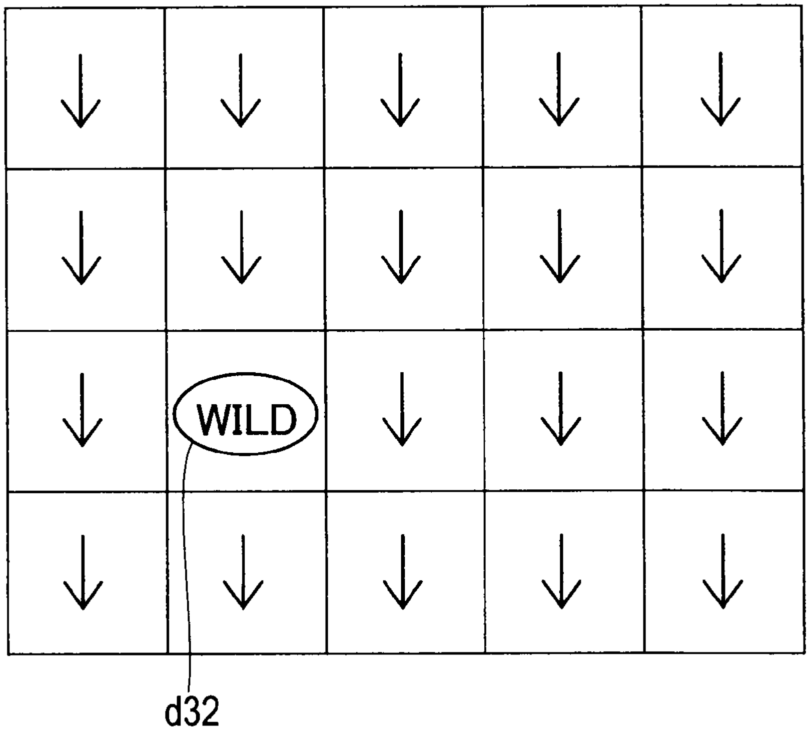
FIG. 25 is an explanatory view illustrating the symbol display region in which a WILD symbol is fixed, of the gaming machine according to the embodiment of the present invention.

The main CPU 71 then determines whether or not there is a WILD symbol in any of the twenty display regions, and if there is, fixes the WILD symbol (step S315). For example, as shown in FIG. 24, when a WILD symbol is displayed in the display region denoted by a reference numeral d32, the WILD symbol is fixed. In the next symbol scrolling and displaying processing (the processing of step S312), the symbol is not scrolled in the display region as shown in FIG. 25.

The main CPU 71 then determines the number of coins to be paid out on the basis of combinations of symbols displayed in the symbol display region 4 while referring to the first payout table shown in FIG. 10 (step S316). For example, when the symbols shown in FIG. 24 are displayed, payout of eight coins is determined since five BELL symbols are lined up.

The main CPU 71 then determines whether or not the number P of free games=0 has been established (step S317). When determining that P=0 has not been established, the main CPU 71 repeats the processing from step S312.

When determining that P=0 has been established, the main CPU 71 resets the WILD symbol fixed in the processing of step S315 (step S318), and completes the first feature game processing.

<Second Feature Game Execution Processing>

Figure 21:
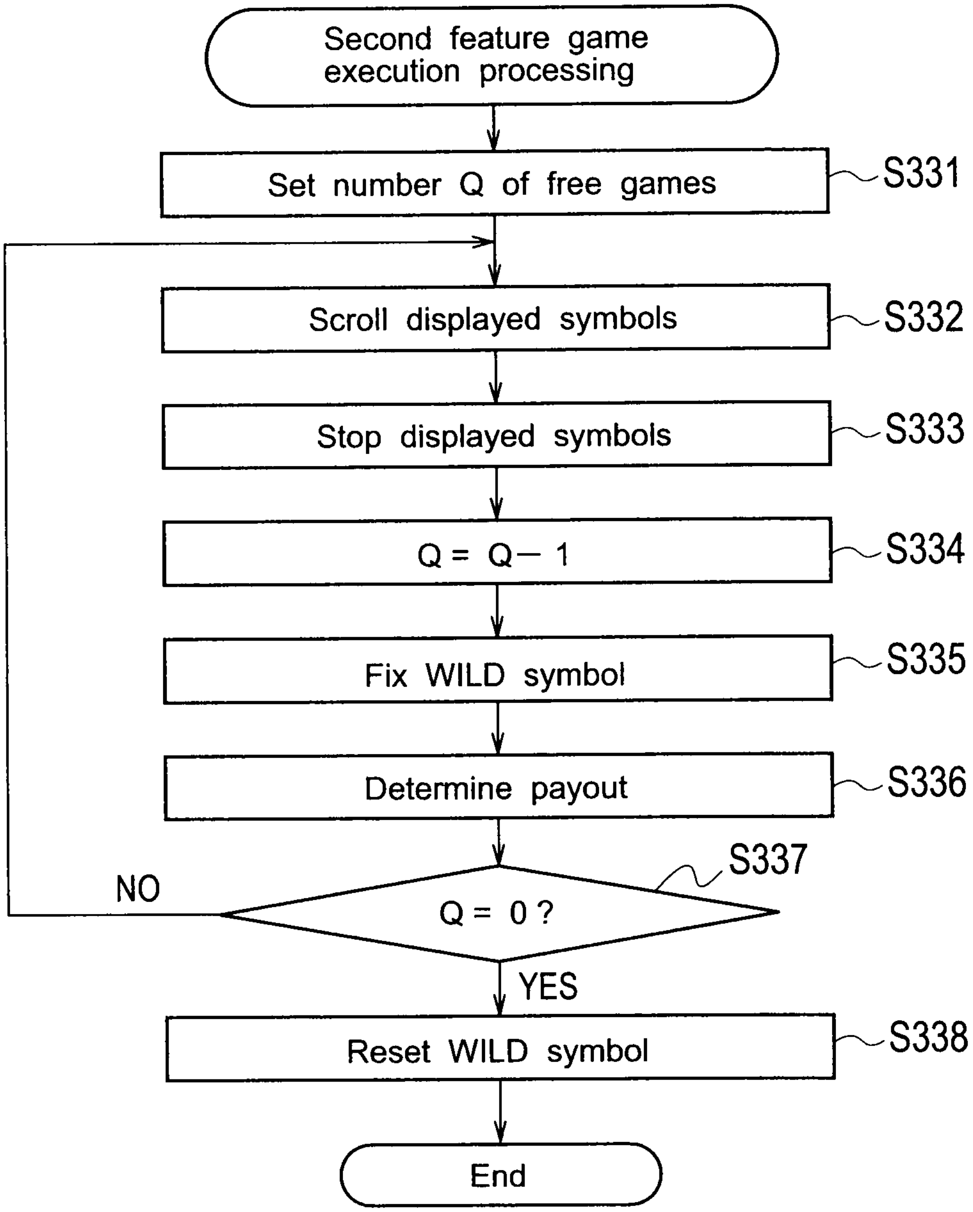
FIG. 21 is a view illustrating a flowchart of a second feature game execution processing of the gaming machine according to the first embodiment of the present invention.

Next, with reference to FIG. 21, the second feature game execution processing shown in step S175 of FIG. 19 is described. In the second feature game, the symbol arrays of the third reel pattern shown in FIG. 7 are used. Specifically, the symbol arrays including the WILD symbols are used.

First, the main CPU 71 sets the number Q of free games to be executed (step S331).

The main CPU 71 scrolls the symbols displayed in the symbol display region 4 with five columns (step S332), and stops the displayed symbols after a lapse of predetermined time (step S333).

The main CPU 71 subtracts one from the number Q of free games (step S334).

The main CPU 71 then determines whether or not there is a WILD symbol in any of the twenty display regions, and if there is, fixes the WILD symbol (step S335). As described above, when the WILD symbol is displayed in the display region denoted by the reference numeral d32, the WILD symbol is fixed as shown in FIG. 24. In the next symbol scrolling and displaying processing (the processing of step S332), the symbol is not scrolled in the display region as shown in FIG. 25.

The main CPU 71 then determines the number of coins to be paid out on the basis of combinations of symbols displayed in the twenty display regions while referring to the first payout table shown in FIG. 10 (step S336). For example, when the symbols shown in FIG. 24 are displayed, payout of eight coins is determined since five BELL symbols are lined up.

The main CPU 71 then determines whether or not the number Q of free games=0 has been established (step S337). When determining that Q=0 has not been established, the main CPU 71 repeats the processing from step S332.

When determining that Q=0 has been established, the main CPU 71 resets the WILD symbol fixed in the processing of step S335 (step S338), and completes the second feature game processing.

<Free Game Processing>

Figure 22:
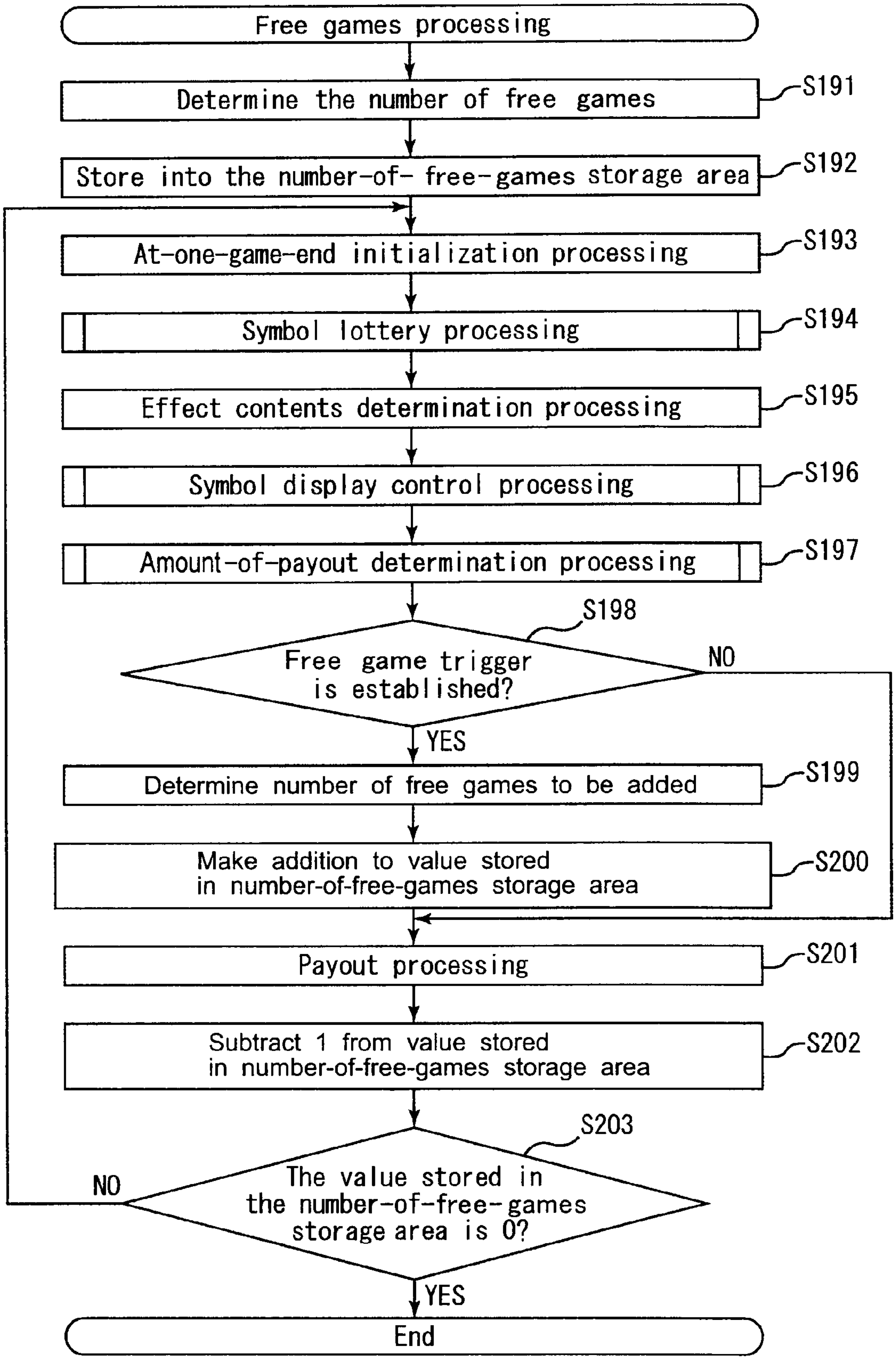
FIG. 22 is a view illustrating a flowchart of a free game processing of the gaming machine according to the embodiment of the present invention.

Next, with reference to FIG. 22, the free game processing is described. In the free game, the third reel pattern illustrated in FIG. 7 is used.

FIG. 22 is a view illustrating a flowchart of the free game processing for the gaming machine according to the embodiment of the present invention.

The main CPU 71 first determines the number of free games (step S191). The main CPU 71 extracts a random value for number-of-free-games determination, and determines any one of the various numbers of free games such as “50”, “70” and “100” by lottery.

Next, the main CPU 71 stores the determined number of free games into a number-of-free-games storage area provided in the RAM 73 (step S192).

The main CPU 71 then conducts at-one-game-end initialization processing in the same way as the processing of step S12 described with reference to FIG. 12 (step S193). The main CPU 71 then conducts the symbol lottery processing described with reference to FIG. 16 (step S194). Then, the main CPU 71 conducts the effect contents determination processing in the same way as the processing of step S16 described with reference to FIG. 12 (step S195). Next, the main CPU 71 conducts the symbol display control processing described with reference to FIG. 17 (step S196). The main CPU 71 then conducts the amount-of-payout determination processing described with reference to FIG. 18 (step S197).

Next, the main CPU 71 determines whether or not the free game trigger has been established (step S198). When the main CPU 71 determines that the free game trigger has been established, the main CPU 71 determines the number of free games to be added (step S199). In the same way as the aforementioned processing of step S191, the main CPU 71 determines the number of free games. The main CPU 71 then adds the determined number of free games to the value stored in the number-of-free-games storage area (step S200).

After the processing of step S200 or when determining in step S198 that the free game trigger has not been established, the main CPU 71 conducts the payout processing (step S201). In the payout processing, the main CPU 71 adds the value stored into the amount-of-payout storage area in the aforementioned amount-of-payout determination processing of step S197 to a value stored in an amount-of-payout storage area for free game. The amount-of-payout storage area for free game is an area for storing a total of the amounts of payouts determined during the free games.

When the bonus game processing has been completed, the main CPU 71 adds the value stored in the amount-of-payout storage area for free game to the value stored in the number-of-credits storage area provided in the RAM 73, in the payout processing of step S24 described with reference to FIG. 12. That is, the total of the amounts of payouts determined during the free games is collectively paid out. Here, it is to be noted that coins may be discharged from the coin payout exit 15A, or a ticket with a barcode may be issued.

Next, the main CPU 71 subtracts one from the value stored in the number-of-free-games storage area (step S202). Next, the main CPU 71 determines whether or not the value stored in the number-of-free-games storage area is zero (step S203). When the main CPU 71 determines that the value stored in the number-of-free-games storage area is not zero, the main CPU 71 shifts the processing to step S193. On the other hand, when the main CPU 71 determines that the value stored in the number-of-free-games storage area is zero, the main CPU 71 completes the free game processing. When the free game processing has been completed, the processing is shifted to the processing of step S21 described with reference to FIG. 12.

<Insurance Selection Processing>

Figure 23:
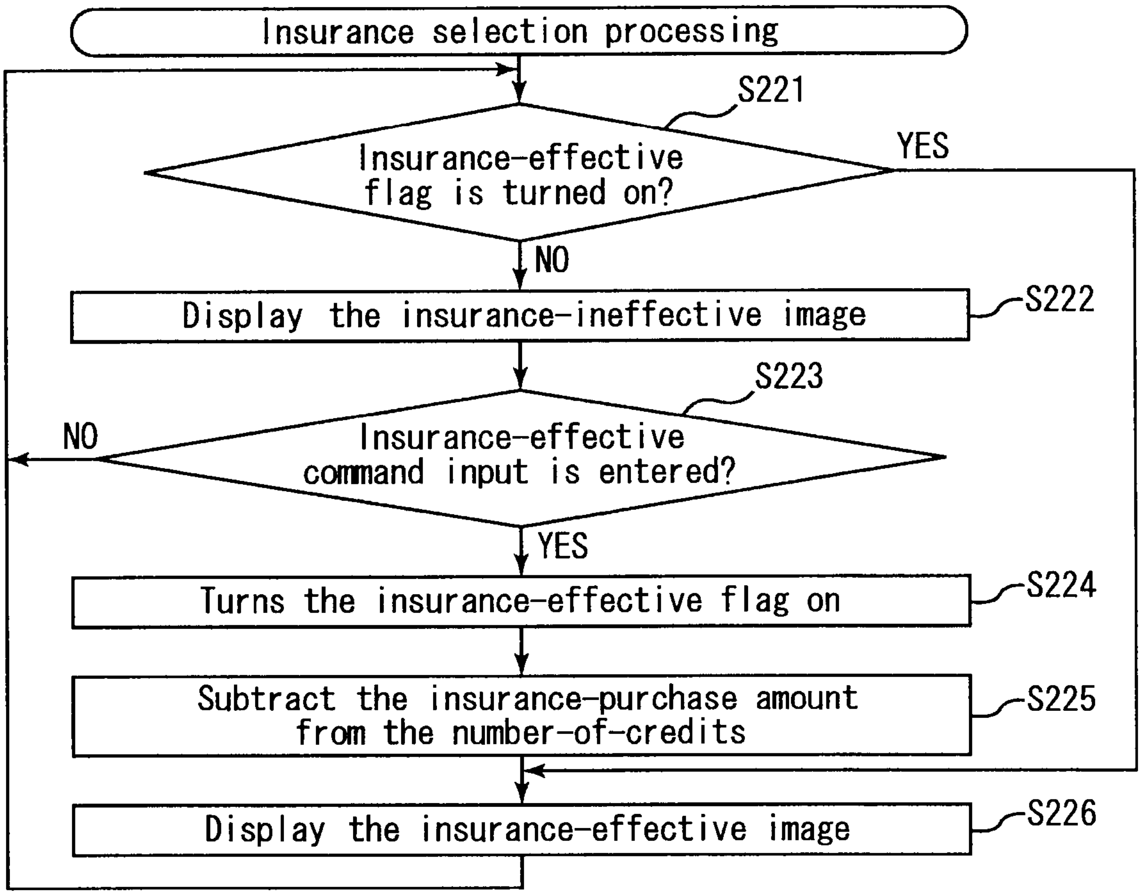
FIG. 23 is a view illustrating a flowchart of an insurance selection processing of the gaming machine according to the embodiment of the present invention.

Next, with reference to FIG. 23, the insurance selection processing is described.

FIG. 23 is a view illustrating a flowchart of the insurance selection processing for the gaming machine according to the embodiment of the present invention.

First, the main CPU 71 determines whether or not the insurance-effective flag is turned on (step S221). When the main CPU 71 determines that the insurance-effective flag is not turned on, the main CPU 71 displays an insurance-ineffective image (step S222). The main CPU 71 transmits a command to display the insurance-ineffective image to the graphic board 130. Based on the command, the graphic board 130 generates the insurance-ineffective image and displays the image to the lower image display panel 141.

As the insurance-ineffective image, for example, an image showing “INSURANCE BET $1.00 TOUCH TO BET” is displayed. This image is an image for prompting the player to select whether or not to make the insurance effective, and notifying the player of the amount required for making the insurance effective. The player can input a command to make the insurance effective by touching a predetermined place on the touch panel 114.

Subsequently, the main CPU 71 determines whether or not an insurance-effective command input has been entered (step S223). When the main CPU 71 determines that the insurance-effective command input has not been entered, the main CPU 71 shifts the processing to step S221 with the insurance-effective flag turned off. On the other hand, when the main CPU 71 determines that the insurance-effective command input has been entered, the main CPU 71 turns the insurance-effective flag on (step S224).

Next, the main CPU 71 subtracts the insurance-purchase amount from the value stored in the number-of-credits storage area (step S225). In the present embodiment, an amount corresponding to, for example, one dollar is subtracted from the value stored in the number-of-credits storage area. After step S225 or when determining in step S221 that the insurance-effective flag is turned on, the main CPU 71 displays the insurance-effective image (step S226).

As the insurance-effective image, for example, an image showing “INSURANCE CONTINUED WIN 2 FEATURE GAME” is displayed. This image is an image informing the player that the insurance is effective, and that the feature game is to be performed twice when the insurance condition is satisfied. After the processing has been conducted, the processing is shifted to step S221.

In this way, in the gaming machine according to the first embodiment, when the insurance is started, two feature games, namely the first and second feature games are executed. In each of the feature games, free games are executed for multiple times. When a WILD symbol is displayed in each of the free games, the WILD symbol is fixed and carried over to the subsequent free games. Therefore, the player is allowed to have expectations of winning a large amount of payout.

Second Embodiment

Next, a gaming machine according to a second embodiment of the present invention is described. The gaming machine according to the second embodiment is different from that of the aforementioned first embodiment in the first feature game execution processing shown in FIG. 20 and the second feature game execution processing shown in FIG. 21. Thus, first feature game execution processing and second feature game execution processing according to the second embodiment are described below.

<First Feature Game Execution Processing of the Second Embodiment>

Figure 26:
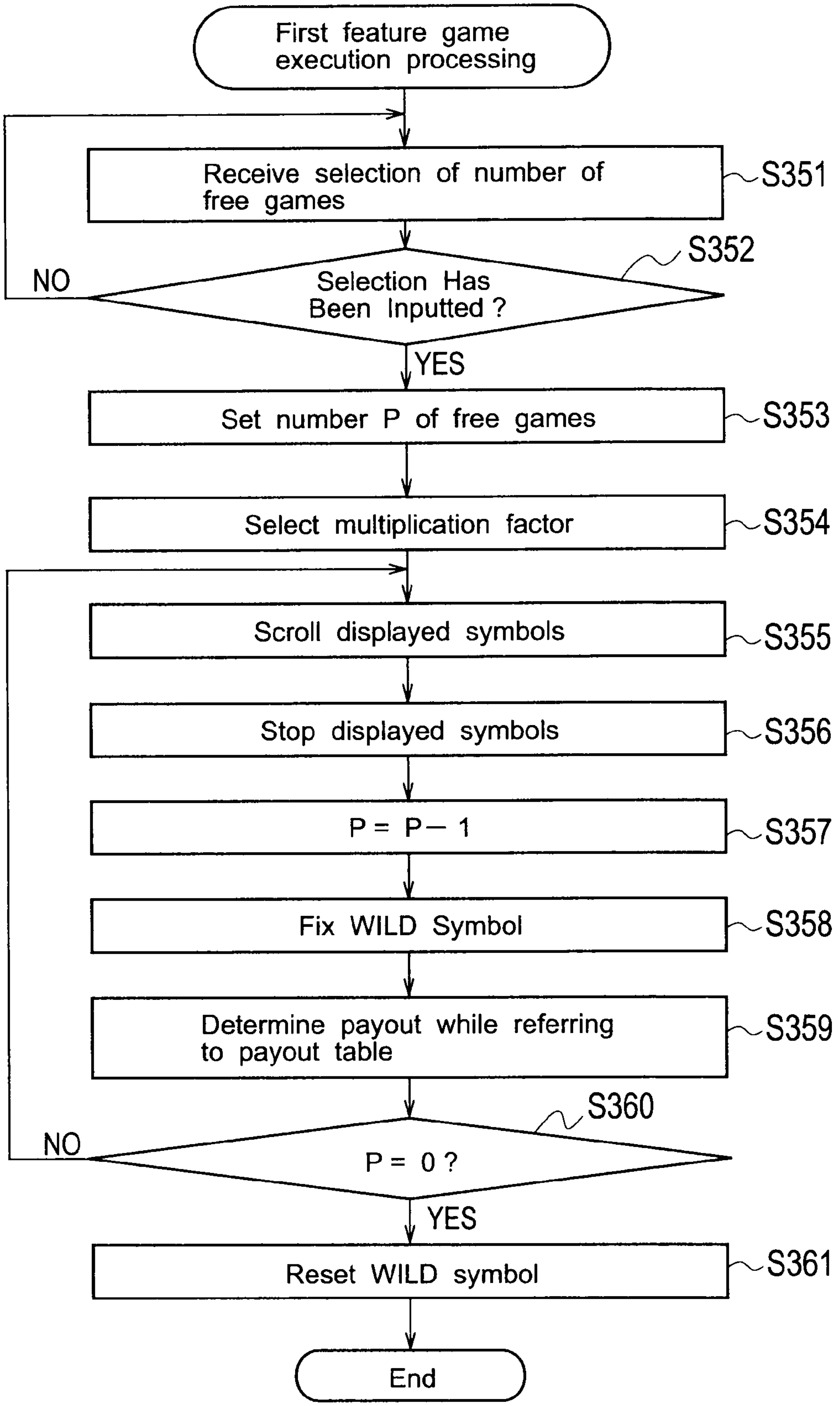
FIG. 26 is a view illustrating a flowchart of a first feature game execution processing of a gaming machine according to a second embodiment of the present invention.

With reference to FIG. 26, the first feature game execution processing according to the second embodiment is described.

Figure 28:
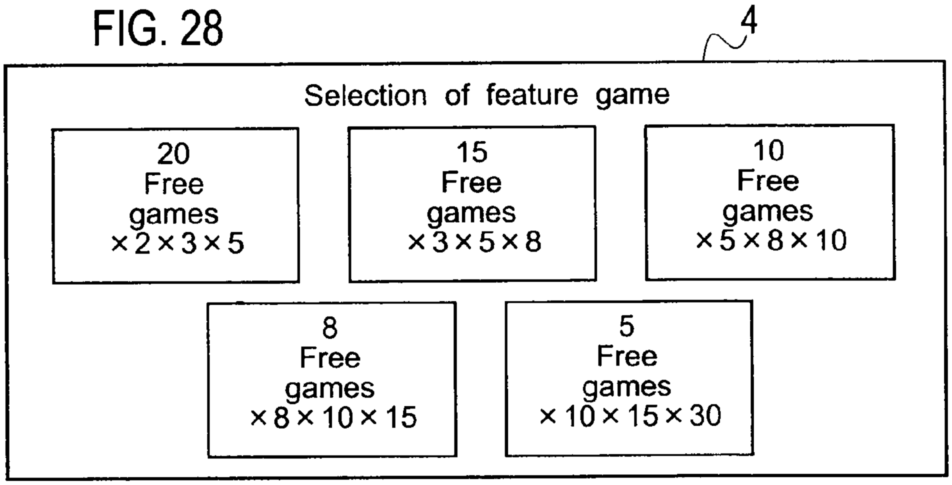
FIG. 28 is an explanatory view illustrating the symbol display region in which a selection image of the feature game is displayed, of the gaming machine according to the embodiment of the present invention.

First, the main CPU 71 receives selection of the number of free games (step S351). In this processing, as shown in FIG. 28, selection screens each showing different numbers of free games are displayed on a lower image display panel 141, and an operation inputted by a player is received. In the example shown in FIG. 28, five selection screens respectively for twenty, fifteen, ten, eight and five games are displayed on the lower image display panel 141, and the player can select any one of the selection screens.

The main CPU 71 determines whether or not an operation input by the player has occurred (step S352).

When determining that the operation input by the player has occurred, the main CPU 71 sets the number P of free games to be executed (step S353).

The main CPU 71 then arbitrarily selects a multiplication factor from three kinds of multiplication factors corresponding to the selected number of free games (step S354). When a winning combination including a WILD symbol is established, coins are paid out in the number obtained by multiplying the amount of the payout shown in FIG. 10 by the selected multiplication factor.

Specifically, the RAM 73 shown in FIG. 9 stores a payout rate setting table showing a relationship between the number of free games and a payout rate. The player can select any relationship between the number of free games and the payout rate by selecting the corresponding selection screens.

For example, when the number of free games is set to twenty, a multiplication factor is arbitrarily selected from three kinds of multiplication factors, namely 2, 3 and 5. When the number of free games is set to fifteen, a multiplication factor is arbitrarily selected from three kinds of multiplication factors, namely 3, 5 and 8. When the number of free games is set to ten, a multiplication factor is arbitrarily selected from three kinds of multiplication factors, namely 5, 8 and 10. When the number of free games is set to eight, a multiplication factor is arbitrarily selected from three kinds of multiplication factors, namely 8, 10 and 15. When the number of free games is set to five, a multiplication factor is arbitrarily selected from three kinds of multiplication factors, namely 10, 15 and 30. In other words, smaller the number of free games is, higher the multiplication factor of the payout is.

The main CPU 71 scrolls the symbols displayed in a symbol display region 4 (step S355), and stops the displayed symbols after a lapse of predetermined time (step S356).

The main CPU 71 subtracts one from the number P of free games (step S357).

The main CPU 71 then determines whether or not there is a WILD symbol in the symbol display region 4, and if there is, fixes the WILD symbol (step S358). For example, as shown in FIG. 24, when a WILD symbol is displayed in the display region denoted by a reference numeral d32, the WILD symbol is fixed. In the next symbol scrolling and displaying processing (the processing of step S355), the symbol is not scrolled in the display region as shown in FIG. 25.

The main CPU 71 then determines the number of coins to be paid out on the basis of combinations of symbols displayed in the symbol display region 4 while referring to the first payout table shown in FIG. 10 and the multiplication factor selected in the processing of step S354 (step S359). For example, when the symbols shown in FIG. 24 are displayed, payout of eight coins is determined since five BELL symbols are lined up.

The main CPU 71 then determines whether or not the number P of free games=0 has been established (step S360). When determining that P=0 has not been established, the main CPU 71 repeats the processing from step S355.

When determining that P=0 has been established, the main CPU 71 resets the WILD symbol fixed in the processing of step S358 (step S361), and completes the first feature game processing.

<Second Feature Game Execution Processing of the Second Embodiment>

Figure 27:
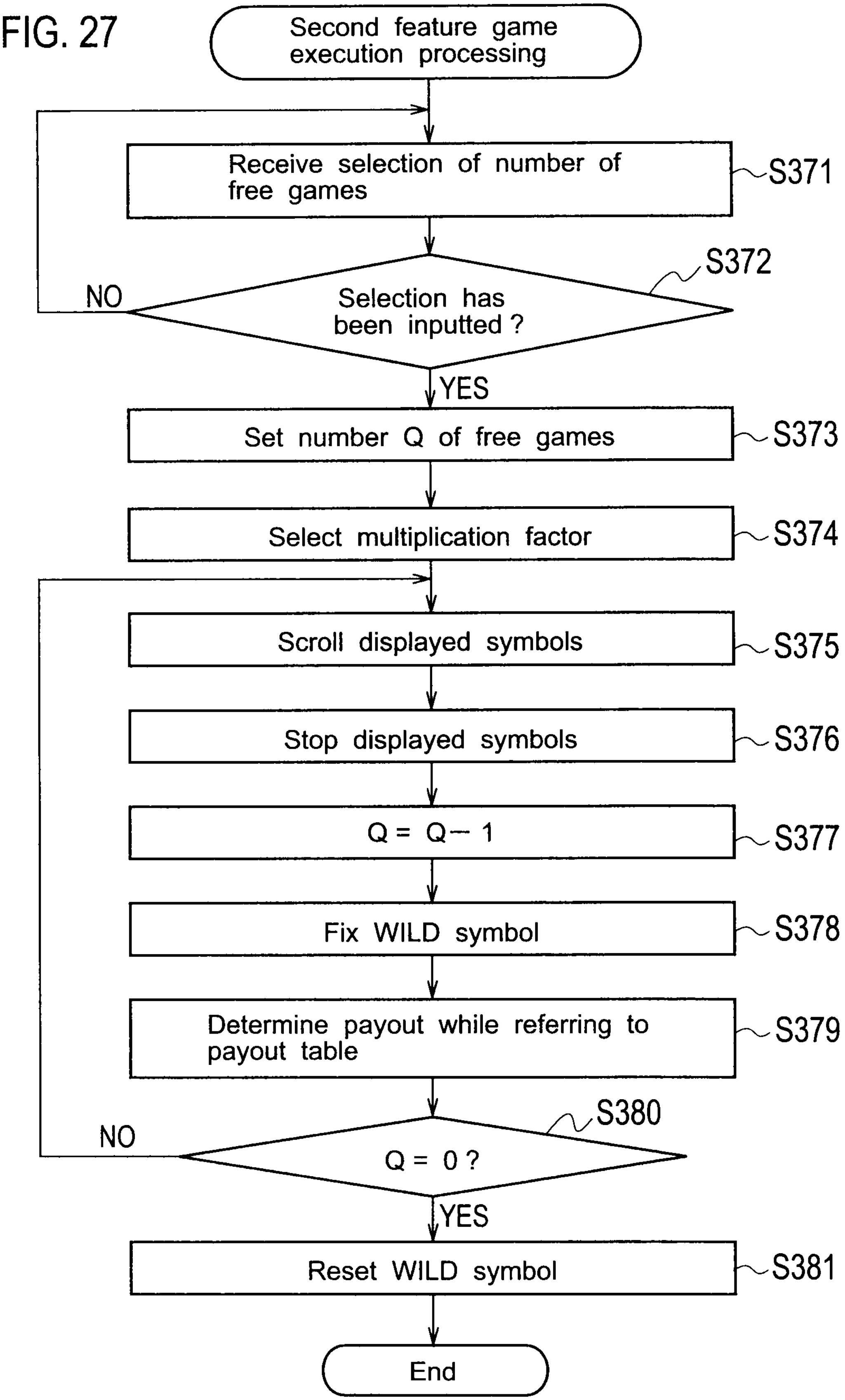
FIG. 27 is a view illustrating a flowchart of a second feature game execution processing of the gaming machine according to the second embodiment of the present invention.

With reference to FIG. 27, the second feature game execution processing according to the second embodiment is described.

First, the main CPU 71 receives selection of the number of free games (step S371). In this processing, as shown in FIG. 28, selection screens each showing different numbers of free games are displayed on the lower image display panel 141, and an operation input by the player is received. In the example shown in FIG. 28, five selection screens respectively for twenty, fifteen, ten, eight and five games are displayed on the lower image display panel 141, and the player can select any one of the selection screens.

The main CPU 71 determines whether or not an operation has been inputted by the player (step S372).

When determining that the operation has been inputted by the player, the main CPU 71 sets the number Q of free games to be executed (step S373).

The main CPU 71 then arbitrarily selects a multiplication factor from three kinds of multiplication factors corresponding to the selected number of free games (step S374). When a winning combination including a WILD symbol is established, coins are paid out in the number obtained by multiplying the amount of the payout shown in FIG. 10 by the selected multiplication factor.

The main CPU 71 scrolls the symbols displayed in the symbol display region 4 (step S375), and stops the displayed symbols after a lapse of predetermined time (step S376).

The main CPU 71 subtracts one from the number Q of free games (step S377).

The main CPU 71 then determines whether or not there is a WILD symbol in the symbol display region 4, and if there is, fixes the WILD symbol (step S378). For example, as shown in FIG. 24, when a WILD symbol is displayed in the display region denoted by the reference numeral d32, the WILD symbol is fixed. In the next symbol scrolling and displaying processing (the processing of step S375), the symbol is not scrolled in the display region as shown in FIG. 25.

The main CPU 71 then determines the number of coins to be paid out on the basis of combinations of symbols displayed in the symbol display region 4 while referring to the first payout table shown in FIG. 10 and the multiplication factor selected in the processing of step S374 (step S379). For example, when the symbols shown in FIG. 24 are displayed, payout of eight coins is determined since five BELL symbols are lined up.

The main CPU 71 then determines whether or not the number Q of free games=0 has been established (step S380). When determining that Q=0 has not been established, the main CPU 71 repeats the processing from step S375.

When determining that Q=0 has been established, the main CPU 71 resets the WILD symbol fixed in the processing of step S378 (step S381), and completes the second feature game processing.

In this way, in the gaming machine according to the second embodiment, when the insurance is started, the first and second feature games are executed. In each of the feature games, since the number of free games to be executed can be arbitrarily selected, the player can select an arbitrary number of free games to suit his/her own preferences.

In each of the feature games, free games are executed multiple times. When a WILD symbol is displayed in each of the free games, the WILD symbol is fixed and carried over to the subsequent free games. Therefore, the player is allowed to have expectations of winning a large amount of payout.

Third Embodiment

Figure 29:
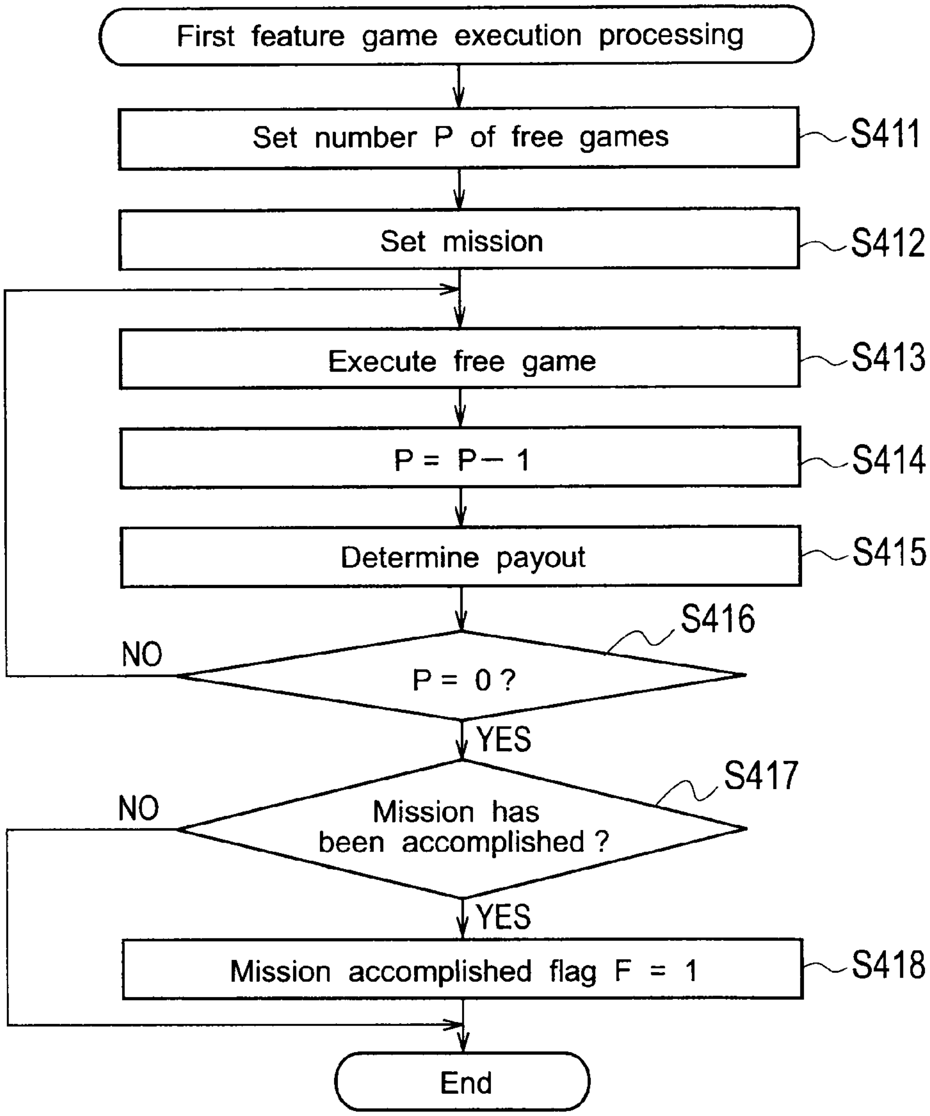
FIG. 29 is a view illustrating a flowchart of a first feature game execution processing of a gaming machine according to a third embodiment of the present invention.

Next, a gaming machine according to a third embodiment of the present invention is described. The gaming machine according to the third embodiment is different from that of the aforementioned first embodiment in the first feature game execution processing shown in FIG. 20 and the second feature game execution processing shown in FIG. 21. Thus, first feature game execution processing according to the third embodiment is described based on a flowchart shown in FIG. 29, and second feature game execution processing according to the third embodiment is described based on a flowchart shown in FIG. 30.

<First Feature Game Execution Processing of the Third Embodiment>

First, the main CPU 71 sets the number P of free games to be executed (step S411).

The main CPU 71 sets a mission related to the first feature game (step S412). For example, the main CPU 71 sets a mission such as "lining up five BELL symbols".

The main CPU 71 executes a free game in which the displayed symbols are scrolled in the symbol display region 4, and the displayed symbols are stopped after a lapse of predetermined time (step S413).

The main CPU 71 subtracts one from the number P of free games (step S414).

As a result of the execution of the free game, the main CPU 71 determines the number of coins to be paid out on the basis of combinations of symbols displayed in the symbol display region 4 while referring to the first payout table shown in FIG. 10 (step S415).

The main CPU 71 then determines whether or not P=0 has been established (step S416). When determining that P=0 has not been established, the main CPU 71 returns to the processing of step S413.

Figure 31:
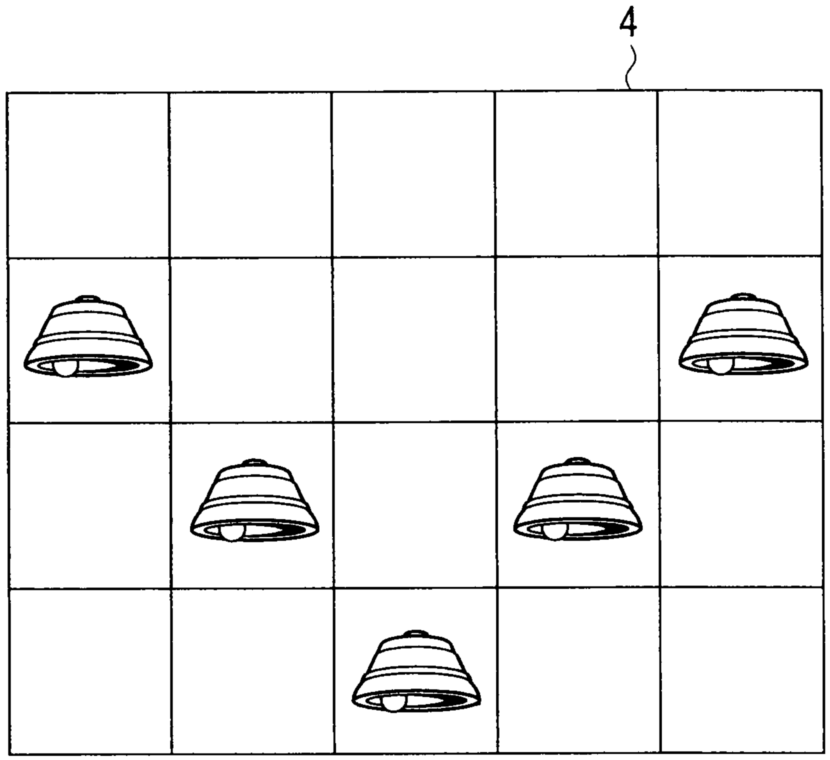
FIG. 31 is an explanatory view illustrating the symbol display region in which five BELL symbols are displayed, of the gaming machine according to the embodiment of the present invention.

When determining that P=0 has been established, the main CPU 71 determines whether or not the mission set in the processing of step S412 has been accomplished (step S417). For example, when five BELL symbols are lined up as shown in FIG. 31 in at least one of the P free games executed, it is determined that the mission has been accomplished.

When the mission has been accomplished, the main CPU 71 sets a mission accomplished flag F to 1 (step S418). On the other hand, when the mission has not been accomplished, F=1 is not established. Thereafter, the first feature game is completed.

<Second Feature Game Execution Processing of the Third Embodiment>

Figure 30:
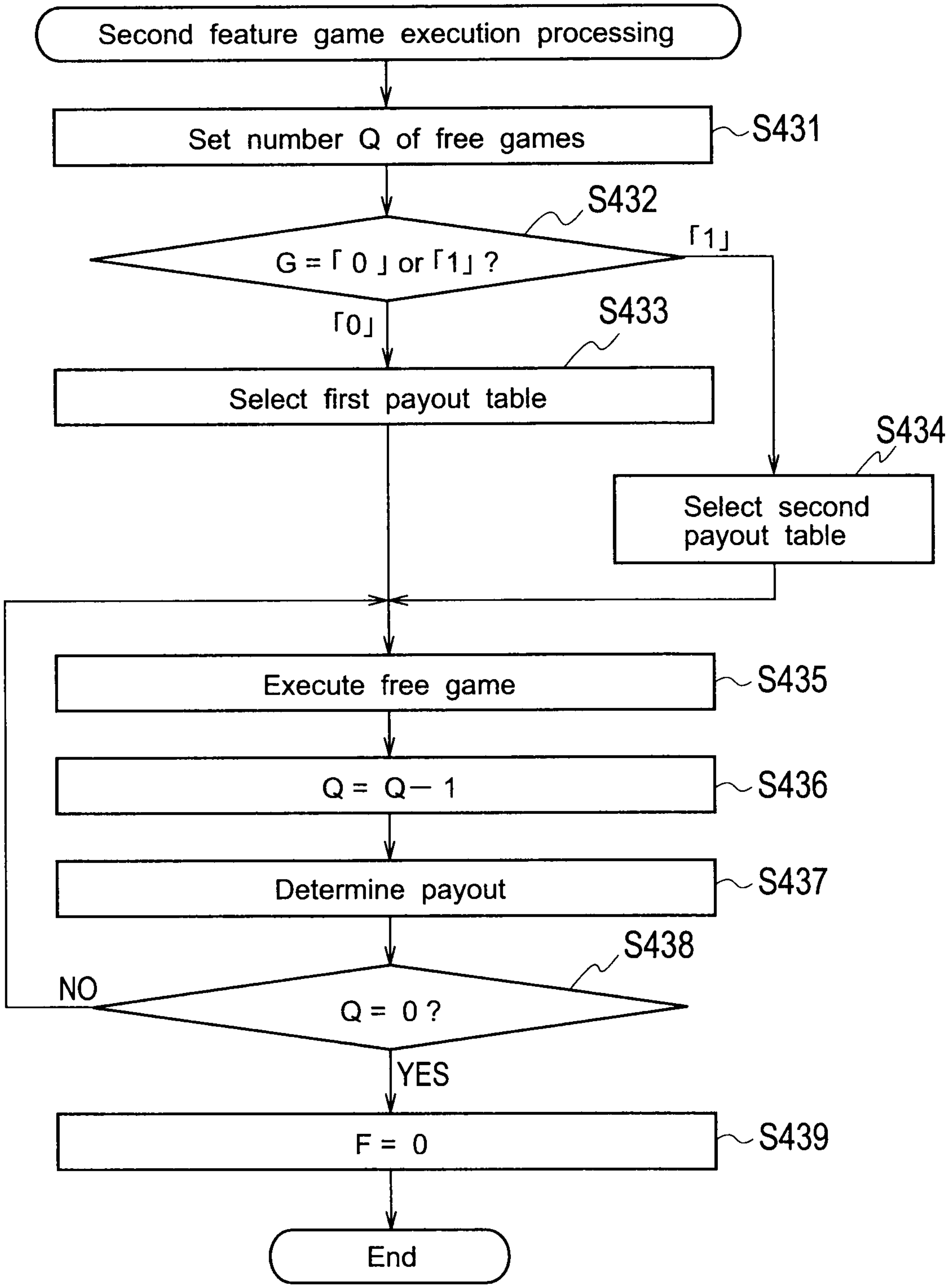
FIG. 30 is a view illustrating a flowchart of a second feature game execution processing of the gaming machine according to the third embodiment of the present invention.

Next, with reference to FIG. 30, the second feature game in the gaming machine according to the third embodiment is described.

First, the main CPU 71 sets the number Q of free games to be executed (step S431).

The main CPU 71 determines whether the mission accomplished flag F is 0 or 1 (step S432). In this processing, F=1 is established when it is determined in the processing of step S417 of FIG. 29 that the mission has been accomplished, and otherwise F=0 is established.

The main CPU 71 selects the first payout table shown in FIG. 10 when F=0 is established (step S433), and selects the second payout table shown in FIG. 11 when F=1 is established (step S434). The second payout table is set so that more coins are paid out when winning is established, compared with the first payout table.

Specifically, the RAM 73 shown in FIG. 9 stores a second feature game condition determination table defining a correspondence relationship between the outcome of the first feature game and conditions of the second feature game. In the second feature game condition determination table, correspondence relationship between the mission accomplished flag F and the payout table are set.

The main CPU 71 executes a free game in which the displayed symbols are scrolled in the symbol display region 4, and the displayed symbols are stopped after a lapse of predetermined time (step S435).

The main CPU 71 subtracts one from the number Q of free games (step S436).

As a result of the execution of the free game, the main CPU 71 determines the number of coins to be paid out on the basis of combinations of symbols displayed in the symbol display region 4 while referring to the aforementioned first payout table or the second payout table (step S437).

The main CPU 71 then determines whether or not Q=0 has been established (step S438). When determining that Q=0 has not been established, the main CPU 71 returns to the processing of step S435.

When determining that Q=0 has been established, the main CPU 71 sets the mission accomplished flag F to 0 (step S439). Thereafter, the second feature game is completed.

In this way, the gaming machine according to the third embodiment allows the player to have expectations of winning a large amount of payout, since the first and second feature games are executed when the insurance is started.

Further, when the mission set in the first feature game has been accomplished, the payout table set to allow relatively more coins to be paid out is selected in the second feature game. Thus, the player is allowed to have interest in accomplishing the mission in the first feature game.

Fourth Embodiment

Figure 32:
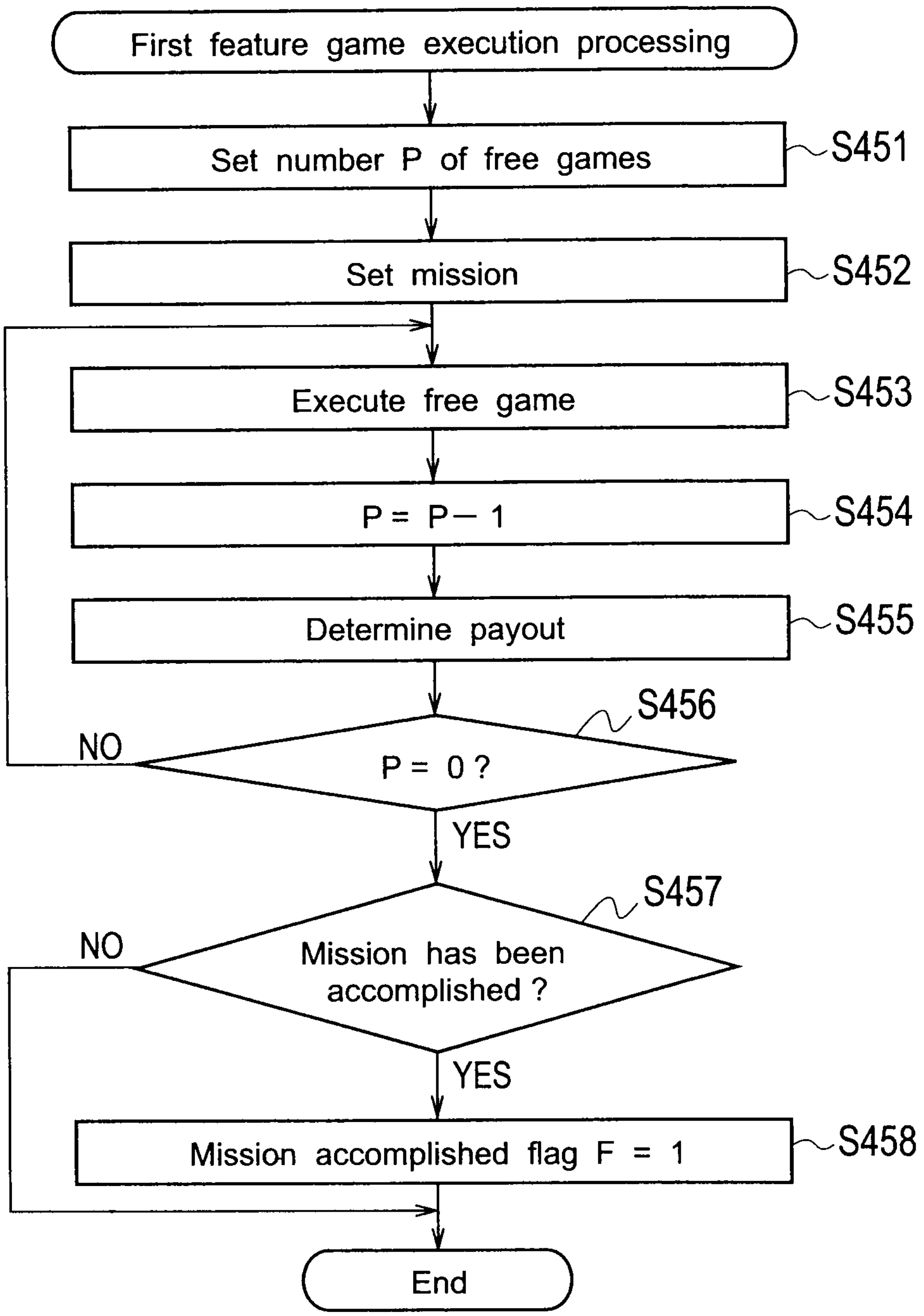
FIG. 32 is a view illustrating a flowchart of a first feature game execution processing of a gaming machine according to a fourth embodiment of the present invention.

Next, a gaming machine according to a fourth embodiment of the present invention is described. The gaming machine according to the fourth embodiment is different from that of the aforementioned first embodiment in the first feature game execution processing shown in FIG. 20 and the second feature game execution processing shown in FIG. 21. Thus, first feature game execution processing according to the fourth embodiment is described based on a flowchart shown in FIG. 32, and second feature game execution processing according to the fourth embodiment is described based on a flowchart shown in FIG. 33.

<First Feature Game Execution Processing of the Fourth Embodiment>

First, the main CPU 71 sets the number P of free games to be executed (step S451).

The main CPU 71 sets a mission related to the first feature game (step S452). For example, the main CPU 71 sets a mission such as "lining up five BELL symbols".

The main CPU 71 executes a free game in which the displayed symbols are scrolled in the symbol display region 4, and the displayed symbols are stopped after a lapse of predetermined time (step S453).

The main CPU 71 subtracts one from the number P of free games (step S454).

As a result of the execution of the free game, the main CPU 71 determines the number of coins to be paid out on the basis of combinations of symbols displayed in the symbol display region 4 while referring to the first payout table shown in FIG. 10 (step S455).

The main CPU 71 then determines whether or not P=0 has been established (step S456). When determining that P=0 has not been established, the main CPU 71 returns to the processing of step S453.

When determining that P=0 has been established, the main CPU 71 determines whether or not the mission set in the processing of step S452 has been accomplished (step S457). For example, when five BELL symbols are lined up as shown in FIG. 31 in at least one of the P free games executed, it is determined that the mission has been accomplished.

When the mission has been accomplished, the main CPU 71 sets a mission accomplished flag F to 1 (step S458). On the other hand, when the mission has not been accomplished, F=1 is not established. Thereafter, the first feature game is completed.

<Second Feature Game Execution Processing of the Fourth Embodiment>

Figure 33:
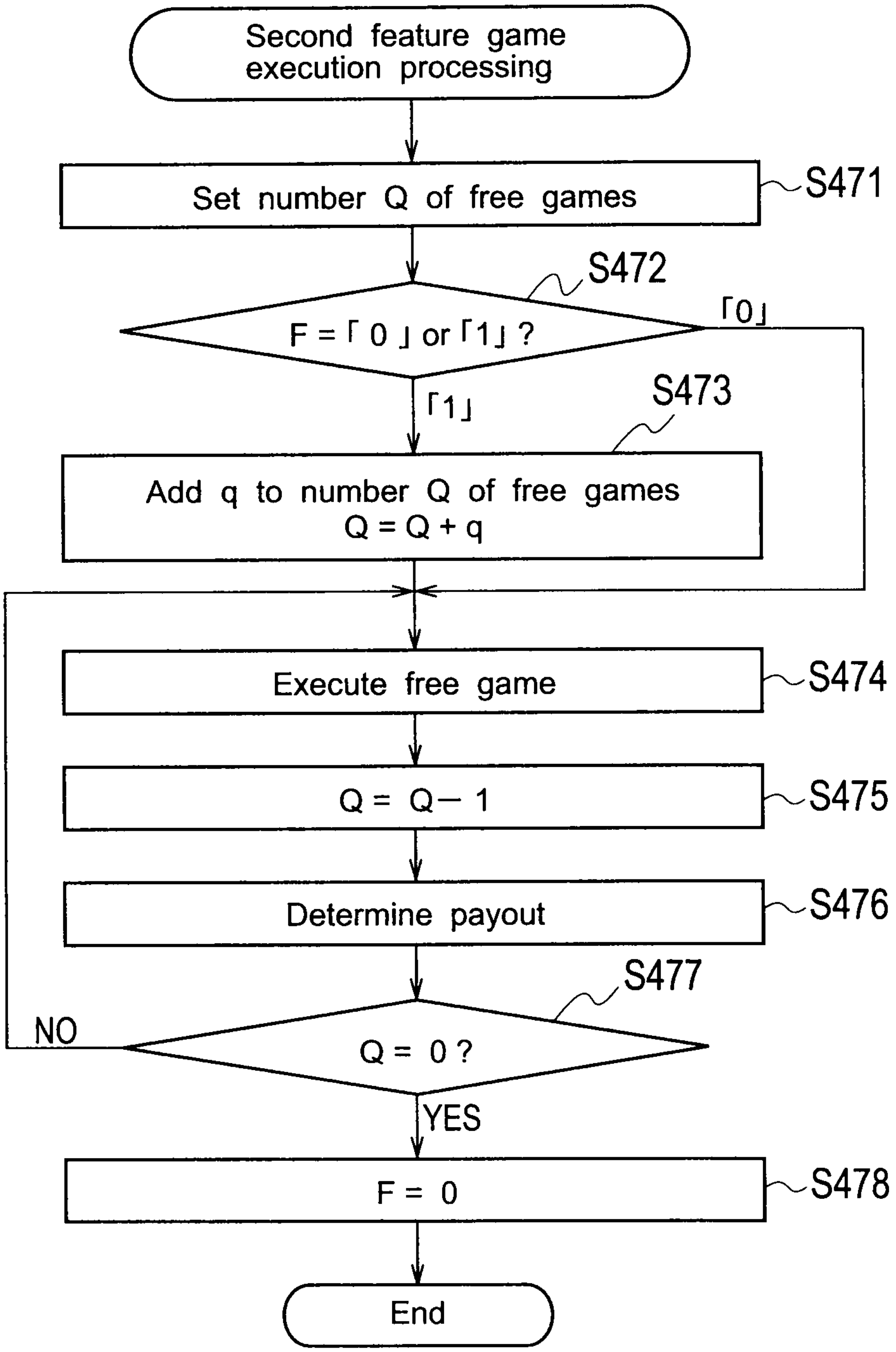
FIG. 33 is a view illustrating a flowchart of a second feature game execution processing of the gaming machine according to the fourth embodiment of the present invention.

Next, with reference to FIG. 33, the second feature game in the gaming machine according to the fourth embodiment is described.

First, the main CPU 71 sets the number Q of free games to be executed (step S471).

The main CPU 71 determines whether the mission accomplished flag F is 0 or 1 (step S472). In this processing, F=1 is established when it is determined in the processing of step S457 of FIG. 32 that the mission has been accomplished, and otherwise F=0 is established.

The main CPU 71 adds q to the number Q of free games when F=1 is established (step S473). On the other hand, the main CPU 71 does not add q when F=0 is established. Therefore, the number of free games to be executed in the second feature game is set larger when F=1 is established than when F=0 is established.

Specifically, the RAM 73 shown in FIG. 9 stores a second feature game condition determination table defining a correspondence relationship between the outcome of the first feature game and conditions of the second feature game. In the second feature game condition determination table, correspondence relationships between the mission accomplished flag F and the number q of free games to be added are set.

The main CPU 71 executes a free game in which the displayed symbols are scrolled in the symbol display region 4, and the displayed symbols are stopped after a lapse of predetermined time (step S474).

The main CPU 71 subtracts one from the number Q of free games (step S475).

As a result of the execution of the free game, the main CPU 71 determines the number of coins to be paid out on the basis of combinations of symbols displayed in the symbol display region 4 while referring to the first payout table shown in FIG. 10 (step S476).

The main CPU 71 then determines whether or not Q=0 has been established (step S477). When determining that Q=0 has not been established, the main CPU 71 returns to the processing of step S474.

When determining that Q=0 has been established, the main CPU 71 sets the mission accomplished flag F to 0 (step S478). Thereafter, the second feature game is completed.

In this way, the gaming machine according to the fourth embodiment allows the player to have expectations of winning a large amount of payout since the first and second feature games are executed when the insurance is started.

Further, when the mission set in the first feature game has been accomplished, the number of free games in the second feature game is increased. Thus, the player is allowed to have interest in accomplishing the mission in the first feature game.

Fifth Embodiment

Figure 34:
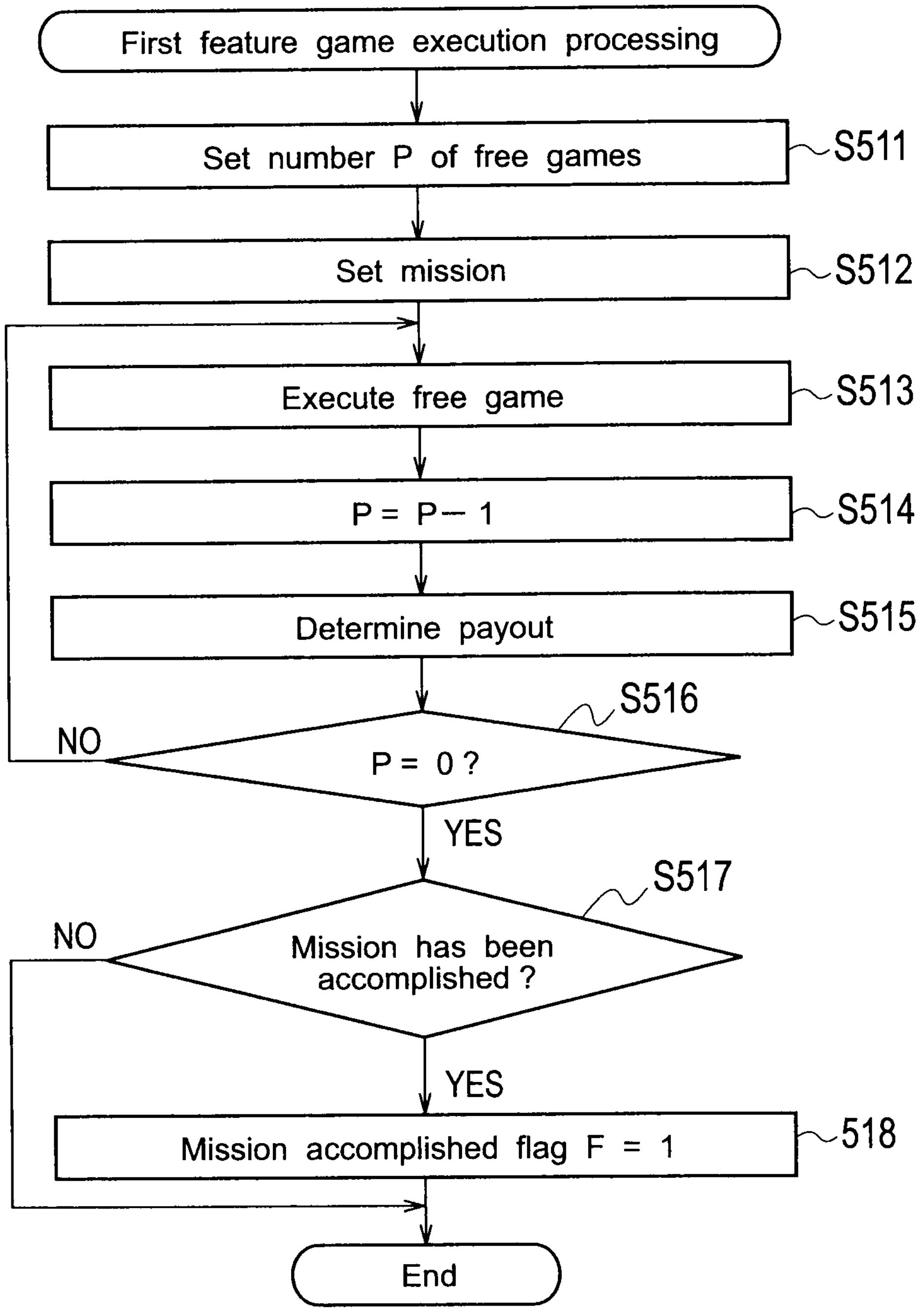
FIG. 34 is a view illustrating a flowchart of a first feature game execution processing of a gaming machine according to a fifth embodiment of the present invention.

Next, a gaming machine according to a fifth embodiment of the present invention is described. The gaming machine according to the fifth embodiment is different from that of the aforementioned first embodiment in the first feature game execution processing shown in FIG. 20 and the second feature game execution processing shown in FIG. 21. Hereinafter, first feature game execution processing according to the fifth embodiment is described based on a flowchart shown in FIG. 34, and second feature game execution processing according to the fifth embodiment is described based on a flowchart shown in FIG. 35.

<First Feature Game Execution Processing of the Fifth Embodiment>

First, the main CPU 71 sets the number P of free games to be executed (step S511).

The main CPU 71 sets a mission related to the first feature game (step S512). For example, the main CPU 71 sets a mission such as "lining up five BELL symbols".

The main CPU 71 executes a free game in which the displayed symbols are scrolled in the symbol display region 4, and the displayed symbols are stopped after a lapse of predetermined time (step S513).

The main CPU 71 subtracts one from the number P of free games (step S514).

As a result of the execution of the free game, the main CPU 71 determines the number of coins to be paid out on the basis of combinations of symbols displayed in the symbol display region 4 while referring to the first payout table shown in FIG. 10 (step S515).

The main CPU 71 then determines whether or not P=0 has been established (step S516). When determining that P=0 has not been established, the main CPU 71 returns to the processing of step S513.

When determining that P=0 has been established, the main CPU 71 determines whether or not the mission set in the processing of step S512 has been accomplished (step S517). For example, when five BELL symbols are lined up as shown in FIG. 31 in at least one of the P free games executed, it is determined that the mission has been accomplished.

When the mission has been accomplished, the main CPU 71 sets a mission accomplished flag F to 1 (step S518). On the other hand, when the mission has not been accomplished, F=1 is not established. Thereafter, the first feature game is completed.

<Second Feature Game Execution Processing of the Fifth Embodiment>

Figure 35:
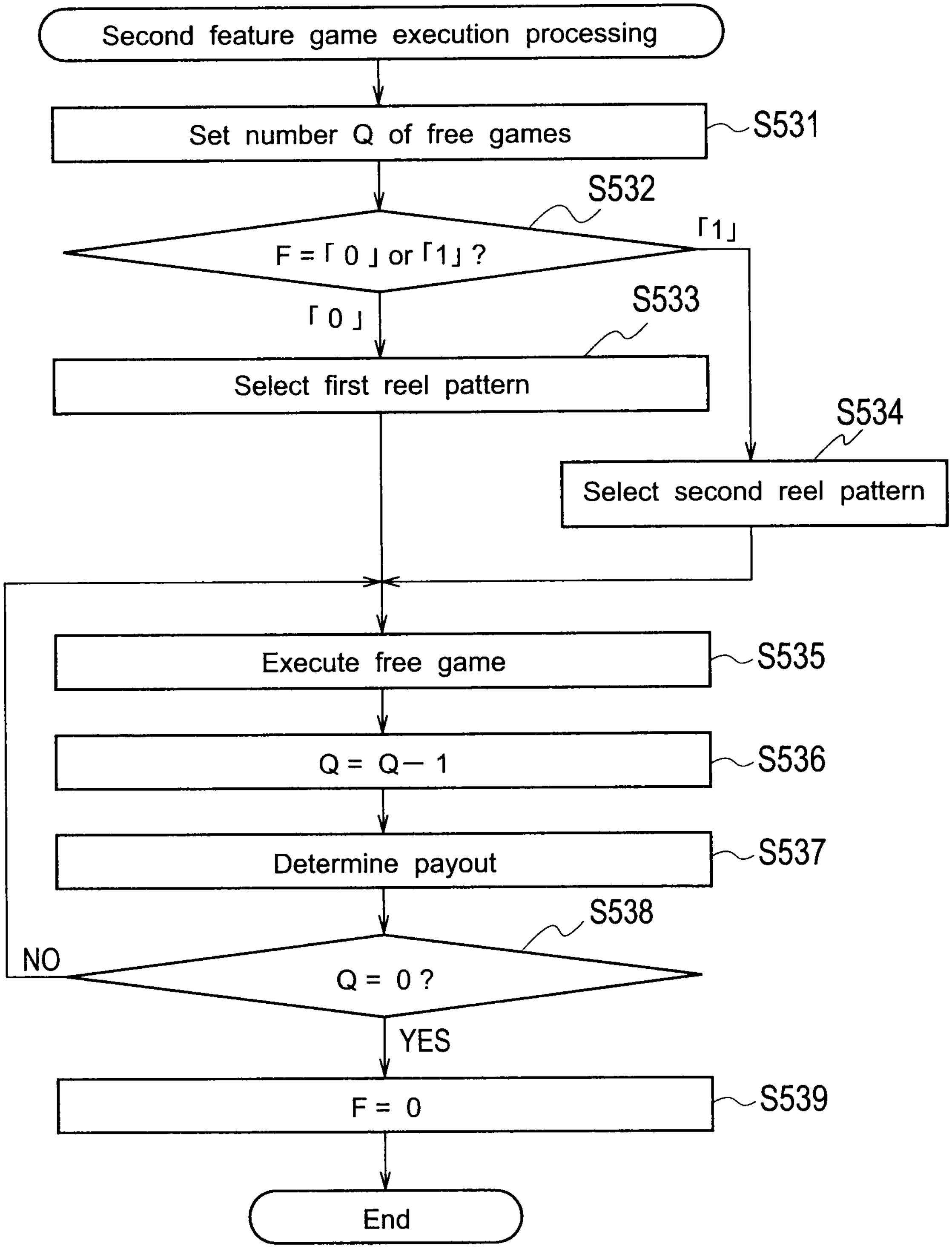
FIG. 35 is a view illustrating a flowchart of a second feature game execution processing of the gaming machine according to the fifth embodiment of the present invention.

Next, with reference to FIG. 35, the second feature game in the gaming machine according to the fifth embodiment is described.

First, the main CPU 71 sets the number Q of free games to be executed (step S531).

The main CPU 71 determines whether the mission accomplished flag F is 0 or 1 (step S532). In this processing, F=1 is established when it is determined in the processing of step S517 shown in FIG. 34 that the mission has been accomplished, and otherwise F=0 is established.

The main CPU 71 selects the first reel pattern shown in FIG. 5 when F=0 is established (step S533), and selects the second reel pattern shown in FIG. 6 when F=1 is established (step S534). The second reel pattern shown in FIG. 6 is set such that the second reel pattern includes more symbols related to winning than the first reel pattern shown in FIG. 5.

Specifically, the RAM 73 shown in FIG. 9 stores a second feature game condition determination table defining a correspondence relationship between the outcome of the first feature game and conditions of the second feature game. In the second feature game condition determination table, correspondence relationships between the mission accomplished flag F and the reel pattern are set.

The main CPU 71 executes a free game in which the displayed symbols are scrolled in the symbol display region 4, and the displayed symbols are stopped after a lapse of predetermined time (step S535).

The main CPU 71 subtracts one from the number Q of free games (step S536).

As a result of the execution of the free game, the main CPU 71 determines the number of coins to be paid out on the basis of combinations of symbols displayed in the symbol display region 4 while referring to the first payout table shown in FIG. 10 (step S537).

The main CPU 71 then determines whether or not Q=0 has been established (step S538). When determining that Q=0 has not been established, the main CPU 71 returns to the processing of step S535.

When determining that Q=0 has been established, the main CPU 71 sets the mission accomplished flag F to 0 (step S539). Thereafter, the second feature game is completed.

In this way, the gaming machine according to the fifth embodiment allows the player to have expectations of winning a large amount of payout since the first and second feature games are executed when the insurance is started.

Further, when the mission set in the first feature game has been accomplished, the reel pattern including many symbols related to a large payout is selected in the second feature game. Thus, the player is allowed to have interest in accomplishing the mission in the first feature game.

Sixth Embodiment

Figure 36:
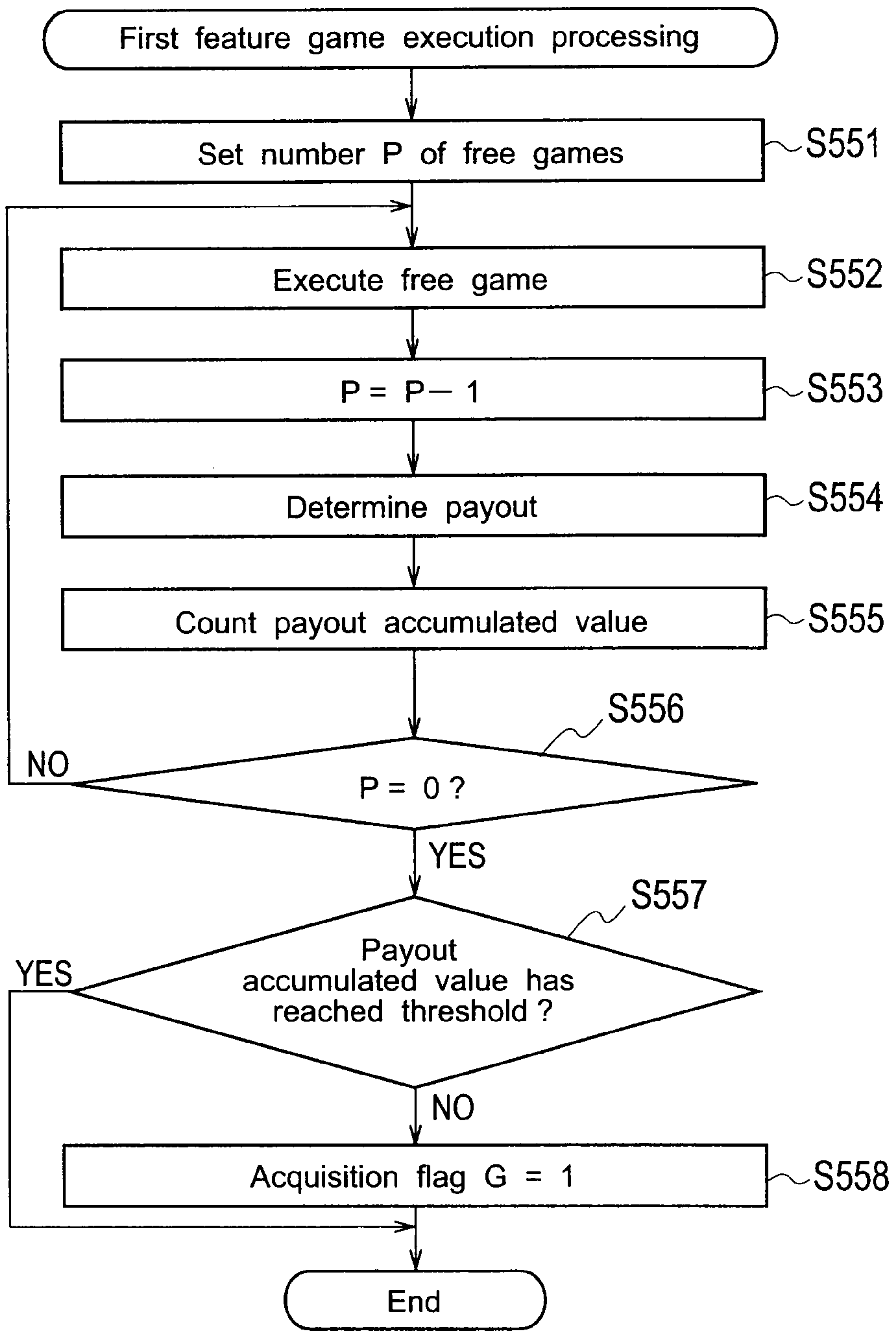
FIG. 36 is a view illustrating a flowchart of a first feature game execution processing of a gaming machine according to a sixth embodiment of the present invention.

Next, a gaming machine according to a sixth embodiment of the present invention is described. The gaming machine according to the sixth embodiment is different from that of the aforementioned first embodiment in the first feature game execution processing shown in FIG. 20 and the second feature game execution processing shown in FIG. 21. Hereinafter, first feature game execution processing according to the sixth embodiment is described based on a flowchart shown in FIG. 36, and second feature game execution processing according to the sixth embodiment is described based on a flowchart shown in FIG. 37.

<First Feature Game Execution Processing of the Sixth Embodiment>

First, the main CPU 71 sets the number P of free games to be executed (step S551).

The main CPU 71 executes a free game in which the displayed symbols are scrolled in the symbol display region 4, and the displayed symbols are stopped after a lapse of predetermined time (step S552).

The main CPU 71 subtracts one from the number P of free games (step S553).

As a result of the execution of the free game, the main CPU 71 determines the number of coins to be paid out on the basis of combinations of symbols displayed in the symbol display region 4 while referring to the first payout table shown in FIG. 10 (step S554).

The main CPU 71 counts an accumulated payout value and stores the count value in the RAM 73 (step S555).

The main CPU 71 then determines whether or not P=0 has been established (step S556). When determining that P=0 has not been established, the main CPU 71 returns to the processing of step S552.

When determining that P=0 has been established, the main CPU 71 determines whether or not the payout accumulated value stored in the processing of step S555 has reached a preset threshold (e.g. 500 coins) (step S557).

When the payout accumulated value has not reached the threshold, the main CPU 71 sets an acquisition flag G to 1 (step S558). On the other hand, when the payout accumulated value has reached the threshold, G=1 is not established. Thereafter, the first feature game is completed.

<Second Feature Game Execution Processing of the Sixth Embodiment>

Figure 37:
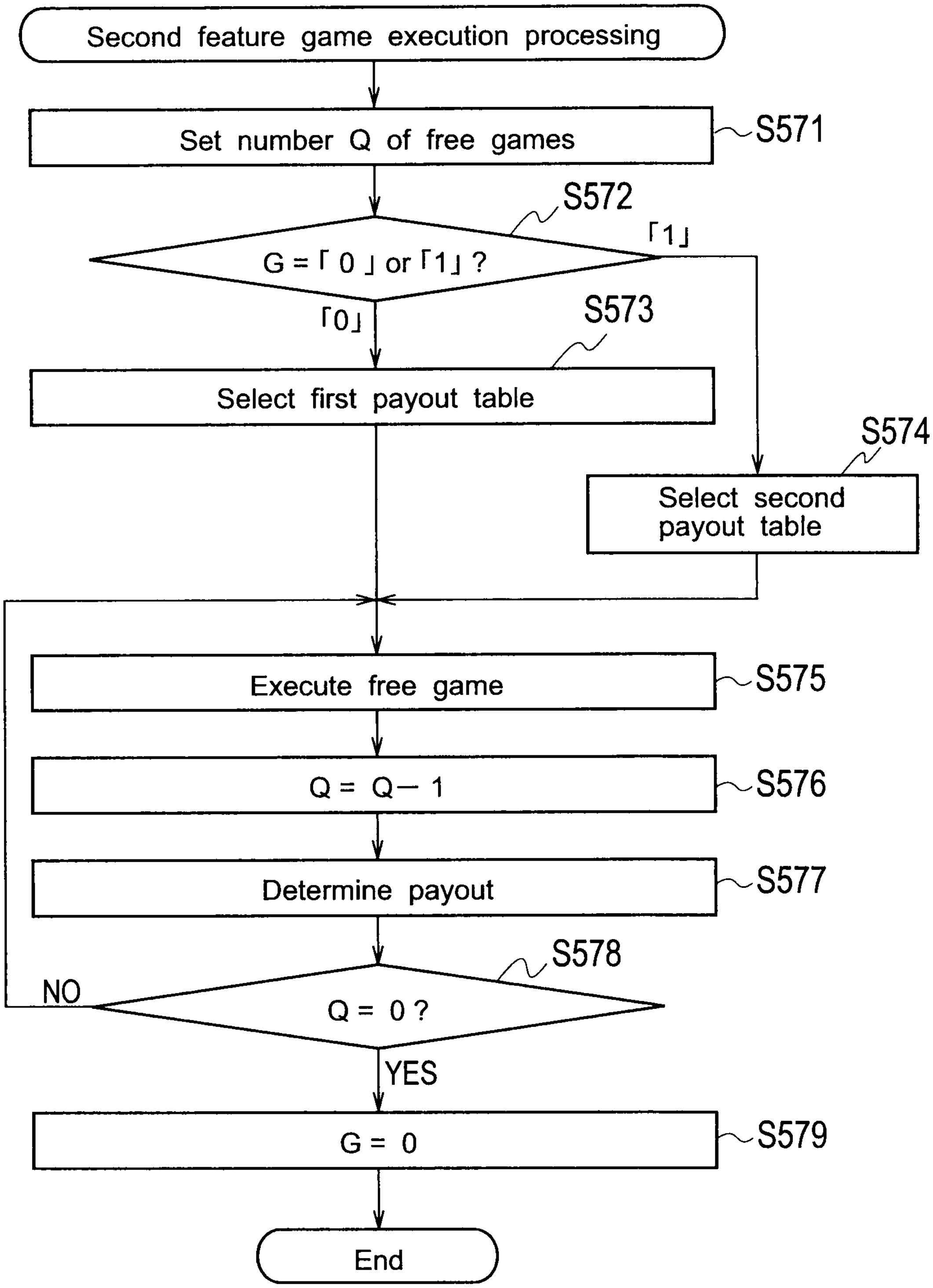
FIG. 37 is a view illustrating a flowchart of a second feature game execution processing of the gaming machine according to the sixth embodiment of the present invention.

Next, with reference to FIG. 37, the second feature game in the gaming machine according to the sixth embodiment is described.

First, the main CPU 71 sets the number Q of free games to be executed (step S571).

The main CPU 71 determines whether the acquisition flag G is 0 or 1 (step S572). In this processing, G=1 is established when it is determined in the processing of step S557 shown in FIG. 36 that the payout accumulated value has not reached the threshold, and G=0 is established when it is determined that the payout accumulated value has reached the threshold.

The main CPU 71 selects the first payout table shown in FIG. 10 when G=0 is established (step S573), and selects the second payout table shown in FIG. 11 when G=1 is established (step S574). The second payout table is set such that relatively more coins are paid out when winning is established, compared with the first payout table.

Specifically, the RAM 73 shown in FIG. 9 stores a second feature game condition determination table defining a correspondence relationship between the outcome of the first feature game and conditions of the second feature game. In the second feature game condition determination table, correspondence relationships between the acquisition flag G and the payout table are set.

The main CPU 71 executes a free game in which the displayed symbols are scrolled in the symbol display region 4, and the displayed symbols are stopped after a lapse of predetermined time (step S575).

The main CPU 71 subtracts one from the number Q of free games (step S576).

As a result of the execution of the free game, the main CPU 71 determines the number of coins to be paid out on the basis of combinations of symbols displayed in the symbol display region 4 while referring to the aforementioned first payout table or second payout table (step S577).

The main CPU 71 then determines whether or not Q=0 has been established (step S578). When determining that Q=0 has not been established, the main CPU 71 returns to the processing of step S575.

When determining that Q=0 has been established, the main CPU 71 sets the acquisition flag G to 0 (step S579). Thereafter, the second feature game is completed.

In this way, the gaming machine according to the sixth embodiment allows the player to have expectations of winning a large amount of payout since the first and second feature games are executed when the insurance is started.

Further, when the number of coins paid out in the first feature game has not reached the threshold, the payout table with higher probabilities of winning coins is selected in the second feature game. Thus, the player who has not been successful in winning many coins in the first feature game is allowed to have expectations of winning many coins in the second feature game.

Seventh Embodiment

Figure 38:
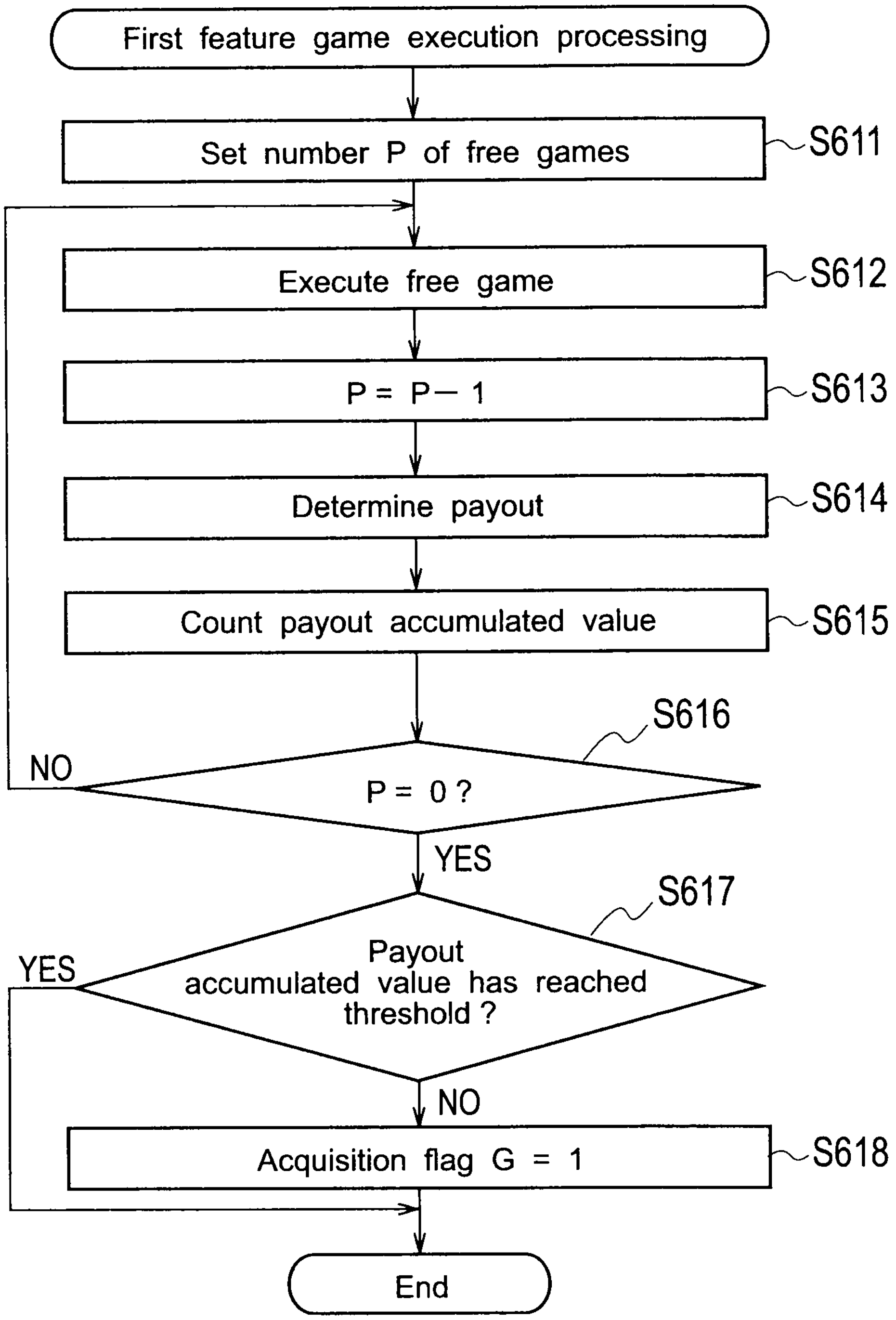
FIG. 38 is a view illustrating a flowchart of a first feature game execution processing of a gaming machine according to a seventh embodiment of the present invention.

Next, a gaming machine according to a seventh embodiment of the present invention is described. The gaming machine according to the seventh embodiment is different from that of the aforementioned first embodiment in the first feature game execution processing shown in FIG. 20 and the second feature game execution processing shown in FIG. 21. Hereinafter, first feature game execution processing according to the seventh embodiment is described based on a flowchart shown in FIG. 38, and second feature game execution processing according to the seventh embodiment is described based on a flowchart shown in FIG. 39.

<First Feature Game Execution Processing of the Seventh Embodiment>

First, the main CPU 71 sets the number P of free games to be executed (step S611).

The main CPU 71 executes a free game in which the displayed symbols are scrolled in the symbol display region 4, and the displayed symbols are stopped after a lapse of predetermined time (step S612).

The main CPU 71 subtracts one from the number P of free games (step S613).

As a result of the execution of the free game, the main CPU 71 determines the number of coins to be paid out on the basis of combinations of symbols displayed in the symbol display region 4 while referring to the first payout table shown in FIG. 10 (step S614).

The main CPU 71 counts the payout accumulated value and stores the count value in the RAM 73 (step S615).

The main CPU 71 then determines whether or not P=0 has been established (step S616). When determining that P=0 has not been established, the main CPU 71 returns to the processing of step S612.

When determining that P=0 has been established, the main CPU 71 determines whether or not the payout accumulated value stored in the processing of step S615 has reached a preset threshold (e.g. 500 coins) (step S617).

When the payout accumulated value has not reached the threshold, the main CPU 71 sets the acquisition flag G to 1 (step S618). On the other hand, when the payout accumulated value has reached the threshold, G=1 is not established. Thereafter, the first feature game is completed.

<Second Feature Game Execution Processing of the Seventh Embodiment>

Figure 39:
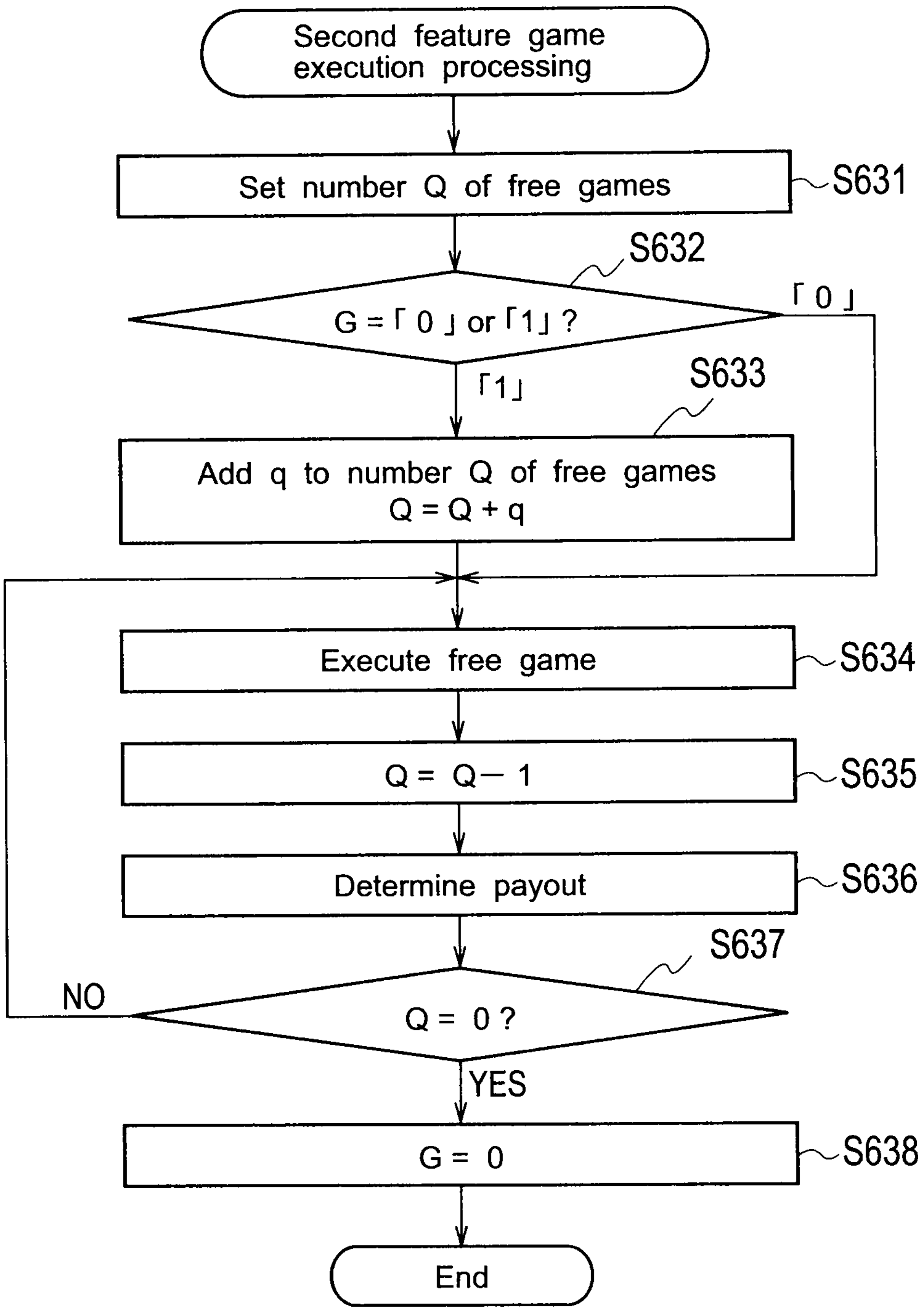
FIG. 39 is a view illustrating a flowchart of a second feature game execution processing of the gaming machine according to the seventh embodiment of the present invention.

Next, with reference to FIG. 39, the second feature game in the gaming machine according to the seventh embodiment is described.

First, the main CPU 71 sets the number Q of free games to be executed (step S631).

The main CPU 71 determines whether the acquisition flag G is 0 or 1 (step S632). In this processing, G=1 is established when it is determined in the processing of step S617 shown in FIG. 38 that the payout accumulated value has not reached the threshold, and otherwise G=0 is established.

The main CPU 71 adds q to the number Q of free games when G=1 is established (step S633). On the other hand, the main CPU 71 does not add q when G=0 is established. Therefore, the number of free games to be executed in the second feature game is set larger when G=1 is established than when G=0 is established.

Specifically, the RAM 73 shown in FIG. 9 stores a second feature game condition determination table defining a correspondence relationship between the outcome of the first feature game and conditions of the second feature game. In the second feature game condition determination table, correspondence relationships between the acquisition flag G and the number q of free games to be added are set.

The main CPU 71 executes a free game in which the displayed symbols are scrolled in the symbol display region 4, and the displayed symbols are stopped after a lapse of predetermined time (step S634).

The main CPU 71 subtracts one from the number Q of free games (step S635).

As a result of the execution of the free game, the main CPU 71 determines the number of coins to be paid out on the basis of combinations of symbols displayed in the symbol display region 4 while referring to the first payout table shown in FIG. 10 (step S636).

The main CPU 71 then determines whether or not Q=0 has been established (step S637). When determining that Q=0 has not been established, the main CPU 71 returns to the processing of step S634.

When determining that Q=0 has been established, the main CPU 71 sets the acquisition flag G to 0 (step S638). Thereafter, the second feature game is completed.

In this way, the gaming machine according to the seventh embodiment allows the player to have expectations of winning a large amount of payout since the first and second feature games are executed when the insurance is started.

Further, when the number of coins paid out in the first feature game has not reached the threshold, the number of free games in the second feature game is increased. Thus, the player who has not been successful in winning many coins in the first feature game is allowed to have expectations of winning many coins in the second feature game.

Eighth Embodiment

Figure 40:
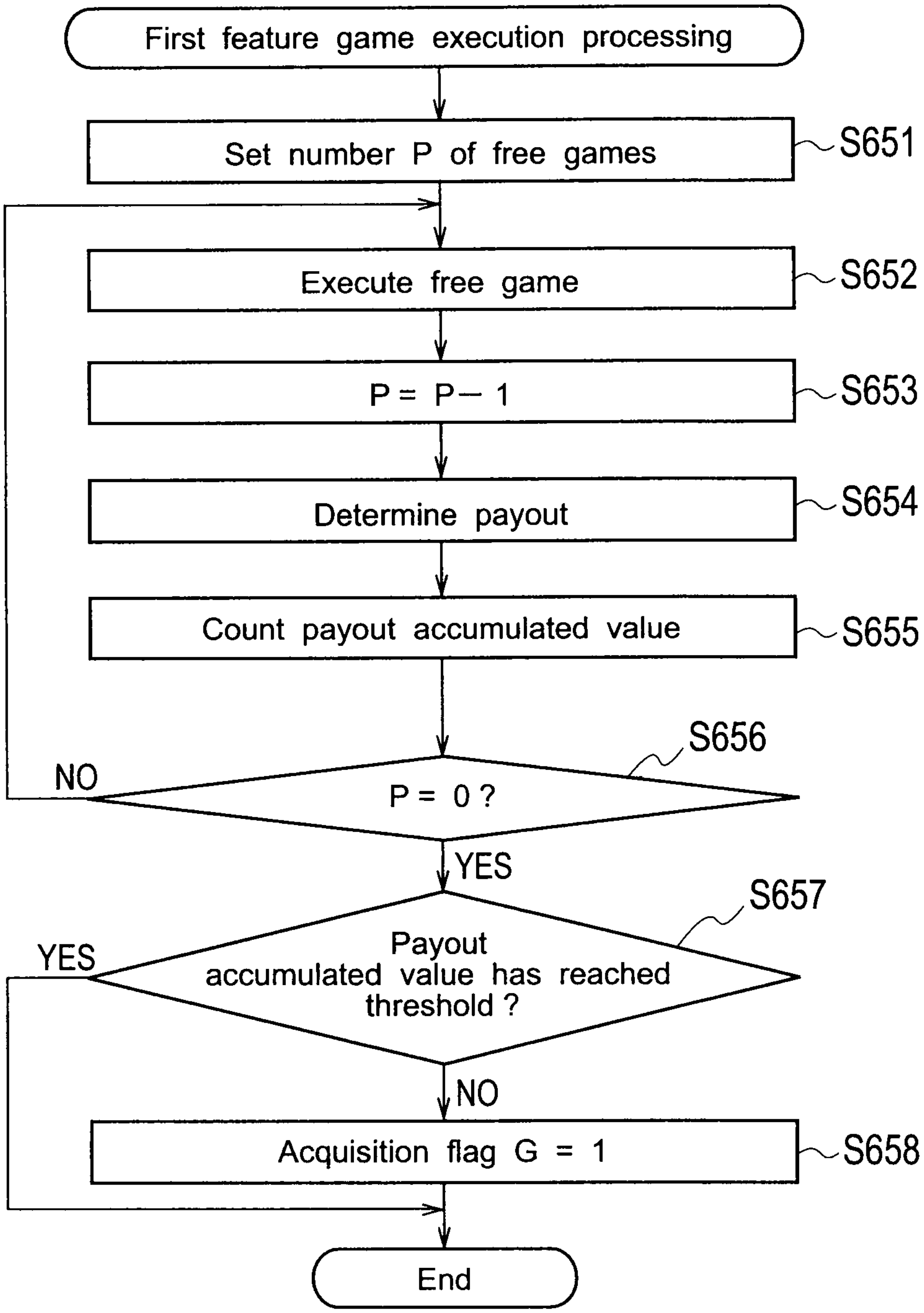
FIG. 40 is a view illustrating a flowchart of a first feature game execution processing of a gaming machine according to a eighth embodiment of the present invention.

Next, a gaming machine according to an eighth embodiment of the present invention is described. The gaming machine according to the eighth embodiment is different from that of the aforementioned first embodiment in the first feature game execution processing shown in FIG. 20 and the second feature game execution processing shown in FIG. 21. Hereinafter, first feature game execution processing according to the eighth embodiment is described based on a flowchart shown in FIG. 40, and second feature game execution processing according to the eighth embodiment is described based on a flowchart shown in FIG. 41.

<First Feature Game Execution Processing of the Eighth Embodiment>

First, the main CPU 71 sets the number P of free games to be executed (step S651).

The main CPU 71 executes a free game in which the displayed symbols are scrolled in the symbol display region 4, and the displayed symbols are stopped after a lapse of predetermined time (step S652).

The main CPU 71 subtracts one from the number P of free games (step S653).

As a result of the execution of the free game, the main CPU 71 determines the number of coins to be paid out on the basis of combinations of symbols displayed in the symbol display region 4 while referring to the first payout table shown in FIG. 10 (step S654).

The main CPU 71 counts the payout accumulated value and stores the count value in the RAM 73 (step S655).

The main CPU 71 then determines whether or not P=0 has been established (step S656). When determining that P=0 has not been established, the main CPU 71 returns to the processing of step S652.

When determining that P=0 has been established, the main CPU 71 determines whether or not the payout accumulated value stored in the processing of step S655 has reached a preset threshold (e.g. 500 coins) (step S657).

When the payout accumulated value has not reached the threshold, the main CPU 71 sets the acquisition flag G to 1 (step S658). On the other hand, when the payout accumulated value has reached the threshold, G=1 is not established. Thereafter, the first feature game is completed.

<Second Feature Game Execution Processing of the Eighth Embodiment>

Figure 41:
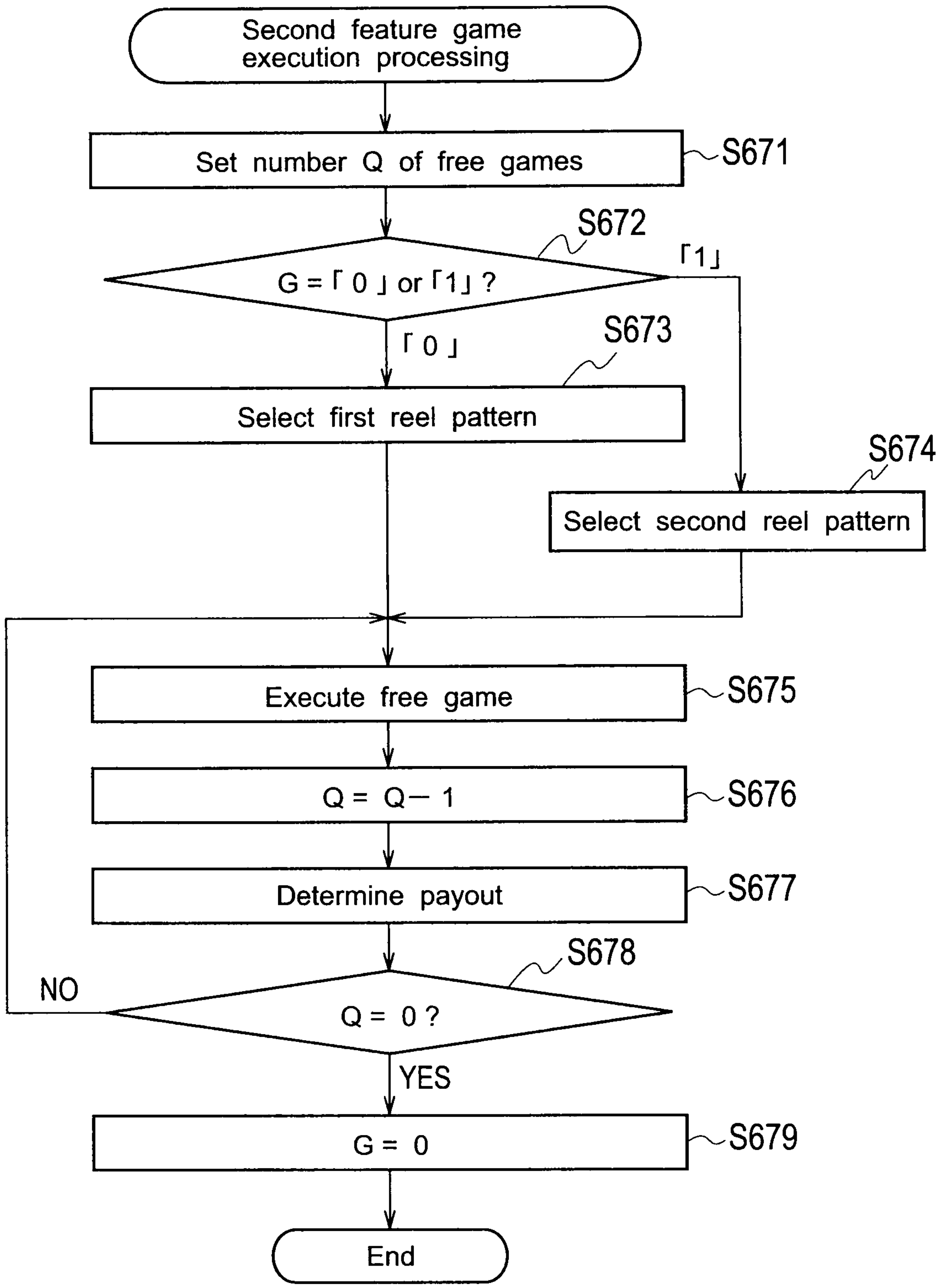
FIG. 41 is a view illustrating a flowchart of a second feature game execution processing of the gaming machine according to the eighth embodiment of the present invention.

Next, with reference to FIG. 41, the second feature game in the gaming machine according to the eighth embodiment is described.

First, the main CPU 71 sets the number Q of free games to be executed (step S671).

The main CPU 71 determines whether the acquisition flag G is 0 or 1 (step S672). In this processing, G=1 is established when it is determined in the processing of step S657 shown in FIG. 40 that the payout accumulated value has not reached the threshold, and otherwise G=0 is established.

The main CPU 71 selects the first reel pattern shown in FIG. 5 when G=0 is established (step S673), and selects the second reel pattern shown in FIG. 6 when G=1 is established (step S674). The second reel pattern shown in FIG. 6 is set such that the second reel pattern includes more symbols related to winning than the first reel pattern shown in FIG. 5.

Specifically, the RAM 73 shown in FIG. 9 stores a second feature game condition determination table defining a correspondence relationship between the outcome of the first feature game and conditions of the second feature game. In the second feature game condition determination table, correspondence relationships between the acquisition flag G and the reel pattern are set.

The main CPU 71 executes a free game in which the displayed symbols are scrolled in the symbol display region 4, and the displayed symbols are stopped after a lapse of predetermined time (step S675).

The main CPU 71 subtracts one from the number Q of free games (step S676).

As a result of the execution of the free game, the main CPU 71 determines the number of coins to be paid out on the basis of combinations of symbols displayed in the symbol display region 4 while referring to the first payout table shown in FIG. 10 (step S677).

The main CPU 71 then determines whether or not Q=0 has been established (step S678). When determining that Q=0 has not been established, the main CPU 71 returns to the processing of step S675.

When determining that Q=0 has been established, the main CPU 71 sets the acquisition flag G to 0 (step S679). Thereafter, the second feature game is completed.

In this way, the gaming machine according to the eighth embodiment allows the player to have expectations of winning a large amount of payout since the first and second feature games are executed when the insurance is started.

Further, when the number of coins paid out in the first feature game has not reached the threshold, the reel pattern including many symbols related to a large payout is selected in the second feature game. Thus, the player who has not been successful in winning many coins in the first feature game is allowed to have expectations of winning many coins in the second feature game.

Ninth Embodiment

Next, a gaming machine according to a ninth embodiment of the present invention is described. The gaming machine according to the ninth embodiment is different from that of the aforementioned first embodiment in the coin-insertion/start-check processing shown in FIG. 13, the first feature game execution processing shown in FIG. 20, the second feature game execution processing shown in FIG. 21, and the free game processing shown in FIG. 22. Hereinafter, coin-insertion/start-check processing according to the ninth embodiment is described based on a flowchart shown in FIG. 42, first feature game execution processing according to the ninth embodiment is described based on a flowchart shown in FIG. 43, second feature game execution processing according to the ninth embodiment is described based on a flowchart shown in FIG. 44, and free game processing according to the ninth embodiment is described based on a flowchart shown in FIG. 45.

In the ninth embodiment, the fourth reel pattern shown in FIG. 8 is used. As described above, the fourth reel pattern includes more WILD symbols than the third reel pattern shown in FIG. 7.

<Coin-Insertion/Start-Check Processing of the Ninth Embodiment>

Figure 42:
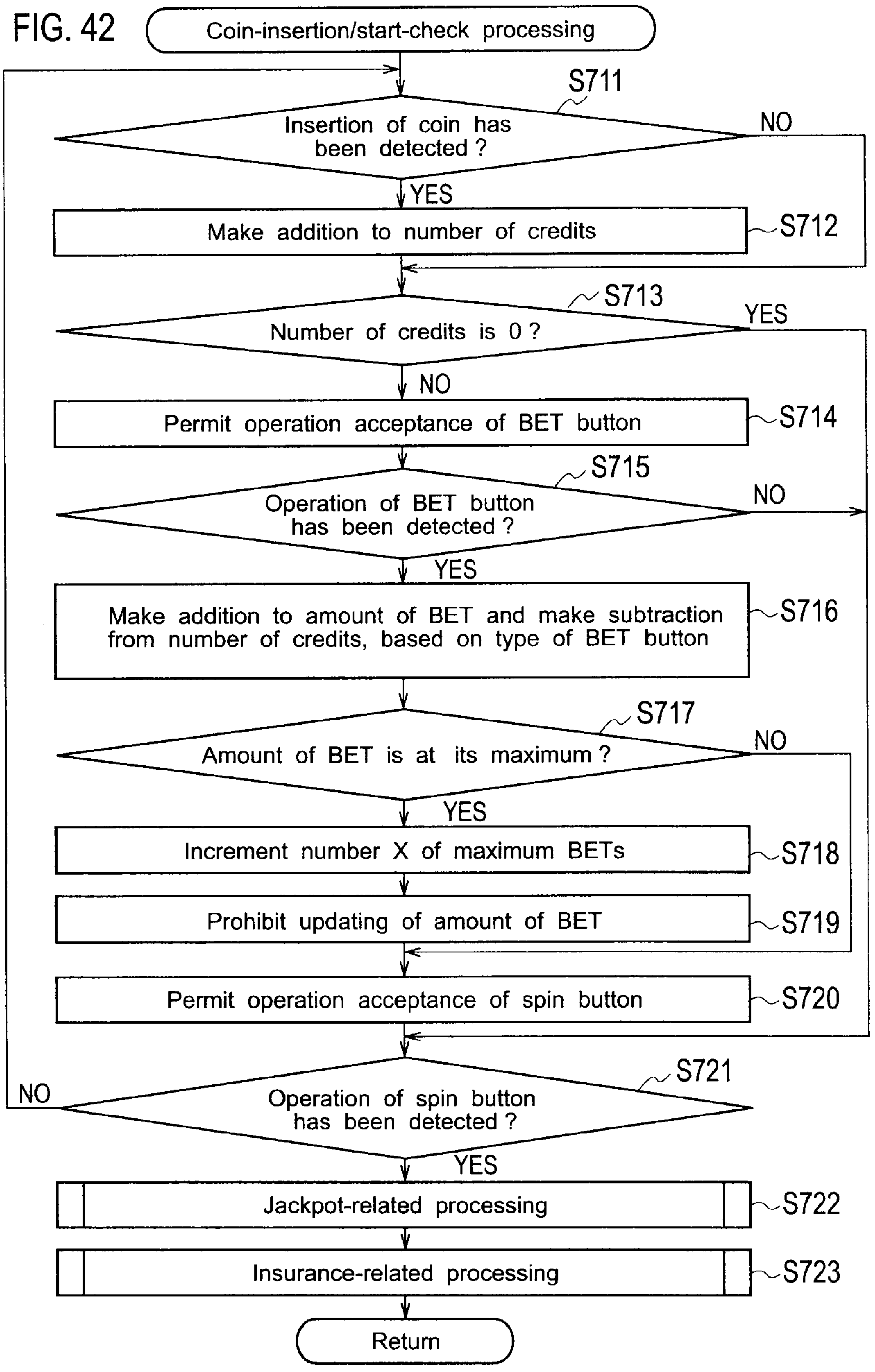
FIG. 42 is a view illustrating a flowchart of a coin-insertion/start-check processing of a gaming machine according to a ninth embodiment of the present invention.

With reference to the flowchart shown in FIG. 42, the coin-insertion/start-check processing for the gaming machine according to the ninth embodiment is described.

First, the main CPU 71 determines whether or not insertion of a coin has been detected by the coin counter 92C (step S711). When determining that the insertion of a coin has been detected by the coin counter 92C, the main CPU 71 makes an addition to the value stored in the number-of-credits storage area (step S712). It is to be noted that, in addition to the insertion of a coin, the main CPU 71 may determine whether or not insertion of a bill has been detected by the bill validator 115, and when determining that the insertion of a bill has been detected, the main CPU 71 may add a value according to the bill to the value stored in the number-of-credits storage area.

After step S712 or when determining in step S711 that the insertion of a coin has not been detected, the main CPU 71 determines whether or not the value stored in the number-of-credits storage area is zero (step S713). When the main CPU 71 determines that the value stored in the number-of-credits storage area is not zero, the main CPU 71 permits operation acceptance of the BET buttons (step S714).

Next, the main CPU 71 determines whether or not operation of any of the BET buttons has been detected (step S715). When the main CPU 71 determines that the BET switch has detected press of the BET button by the player, the main CPU 71 makes an addition to a value stored in an amount-of-BET storage area provided in the RAM 73 and makes a subtraction from the value stored in the number-of-credits storage area, based on the type of the BET button (step S716).

The main CPU 71 then determines whether or not the value stored in the amount-of-BET storage area is at its maximum (step S717). When the main CPU 71 determines that the value stored in the amount-of-BET storage area is at its maximum, the main CPU 71 increments a count value X of a counter for counting the coefficient of maximum BETs to be set to the RAM 73. Specifically, the count value X is set to X+1 (step S718). Further, the main CPU 71 prohibits updating of the value stored in the amount-of-BET storage area (step S719). After step S719 or when determining in step S717 that the value stored in the amount-of-BET storage area is not at its maximum, the main CPU 71 permits operation acceptance of the spin button (step S720).

After step S720 or when determining in step S715 that the operation of any of the BET buttons has not been detected, or when determining in step S713 that the value stored in the number-of-credits storage area is zero, the main CPU 71 determines whether or not operation of the spin button has been detected (step S721). When the main CPU 71 determines that the operation of the spin button has not been detected, the processing is shifted to step S711.

When determining that the operation of the spin button has been detected, the main CPU 71 conducts the jackpot-related processing described with reference to FIG. 14 (step S722). In the processing, the amount to be accumulated to the amount of jackpot is calculated, and the amount is transmitted to the external control device 200.

Next, the main CPU 71 conducts the insurance-related processing described with reference to FIG. 15 (step S723). In the processing, counting of the number of games is conducted which triggers a payout by the insurance. After the processing, the coin-insertion/start-check processing is completed.

<First Feature Game Execution Processing of the Ninth Embodiment>

Figure 43:
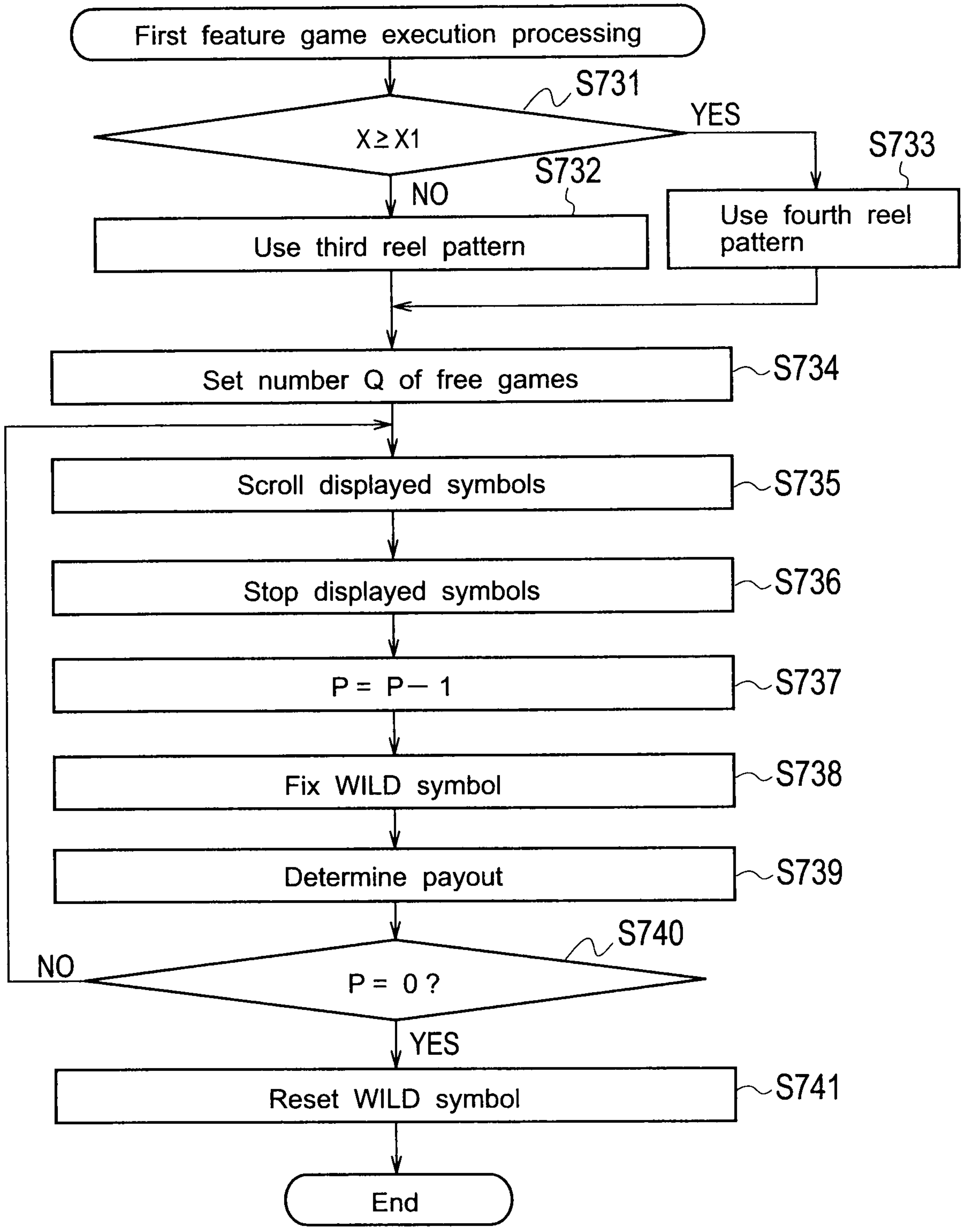
FIG. 43 is a view illustrating a flowchart of a first feature game execution processing of the gaming machine according to the ninth embodiment of the present invention.

Next, with reference to FIG. 43, the first feature game execution processing shown in step S174 of FIG. 19 is described.

First, the main CPU 71 determines whether or not the count value X indicating the number of maximum. BETs which is counted in the processing of step S718 of FIG. 42 is not less than a preset predetermined value X1 (step S731). When X≧X1 is established, the symbol arrays set in the fourth reel pattern shown in FIG. 8 are used (step S733). On the other hand, when X<X1 is established, the symbol arrays set in the third reel pattern shown in FIG. 7 are used (step S732). Specifically, when the number X of maximum BETs is not less than the predetermined value X1, the reel pattern including more WILD symbols can be used.

The main CPU 71 sets the number P of free games to be executed (step S734).

The main CPU 71 scrolls the symbols displayed in the symbol display region 4 with the five columns (step S735), and stops the displayed symbols after a lapse of predetermined time (step S736).

The main CPU 71 subtracts one from the number P of free games (step S737).

The main CPU 71 then determines whether or not there is a WILD symbol in any of the twenty display regions, and if there is, fixes the WILD symbol (step S738). For example, as shown in FIG. 24, when a WILD symbol is displayed in the display region denoted by the reference numeral d32, the WILD symbol is fixed. Accordingly, in the next symbol scrolling and displaying processing (the processing of step S735), the symbol is not scrolled in the display region as shown in FIG. 25.

The main CPU 71 then determines the number of coins to be paid out on the basis of combinations of symbols displayed in the symbol display region 4 while referring to the first payout table shown in FIG. 10 (step S739). For example, when the symbols shown in FIG. 24 are displayed, payout of eight coins is determined since five BELL symbols are lined up.

The main CPU 71 then determines whether or not the number P of free games=0 has been established (step S740). When determining that P=0 has not been established, the main CPU 71 repeats the processing from step S735.

When determining that P=0 has been established, the main CPU 71 resets the WILD symbol fixed in the processing of step S738 (step S741), and completes the first feature game processing.

<Second Feature Game Execution Processing of the Ninth Embodiment>

Figure 44:
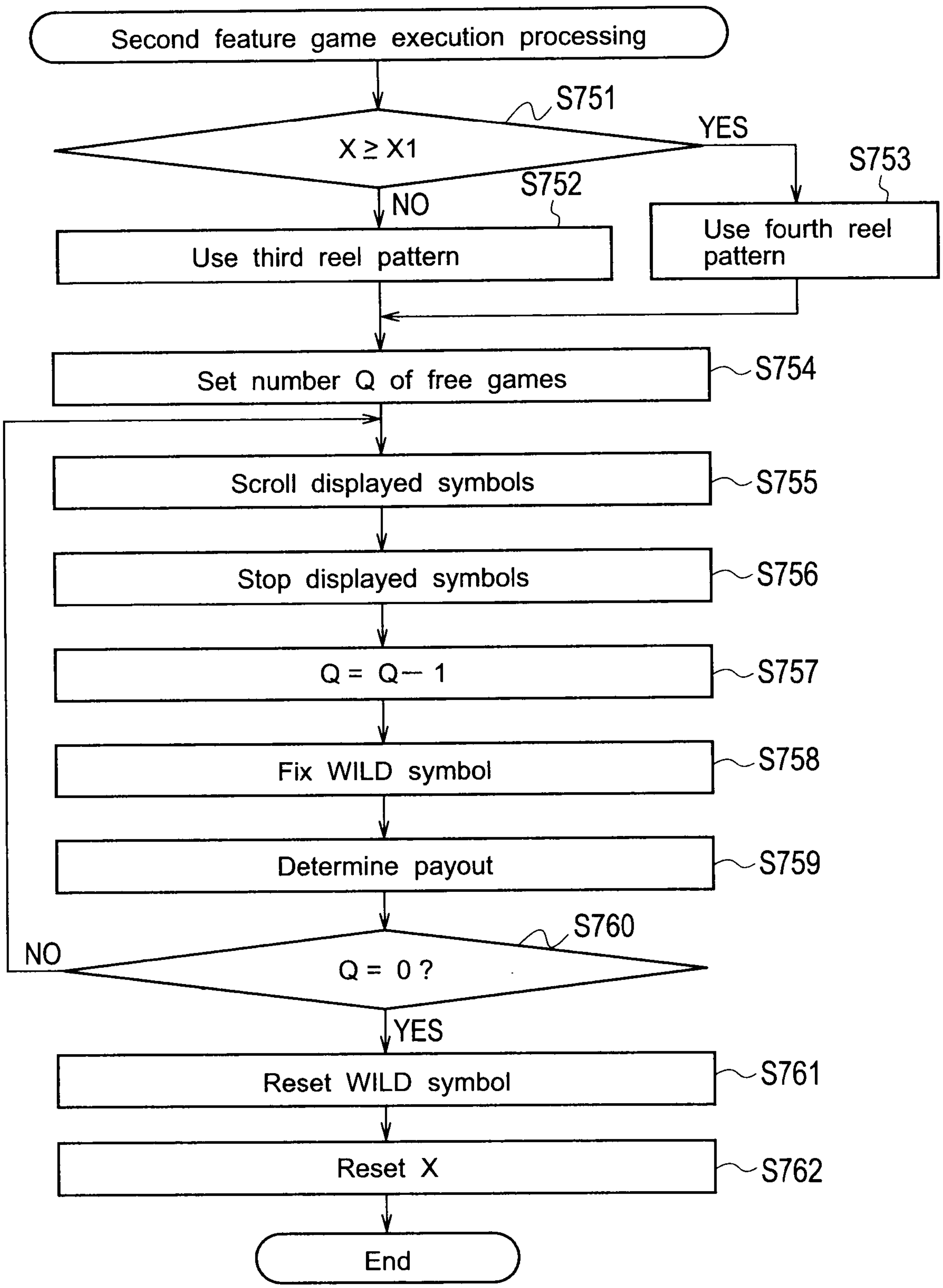
FIG. 44 is a view illustrating a flowchart of a second feature game execution processing of the gaming machine according to the ninth embodiment of the present invention.

Next, with reference to FIG. 44, the second feature game execution processing shown in step S175 of FIG. 19 is described.

First, the main CPU 71 determines whether or not the count value X indicating the number of maximum BETs which is counted in the processing of step S718 of FIG. 42 is not less than the preset predetermined value X1 (step S751). When X≧X1 is established, the symbol arrays set in the fourth reel pattern shown in FIG. 8 are used (step S753). On the other hand, when X<X1 is established, the symbol arrays set in the third reel pattern shown in FIG. 7 are used (step S752). Specifically, when the number X of maximum BETs is not less than the predetermined value X1, the reel pattern including more WILD symbols can be used.

The main CPU 71 sets the number Q of free games to be executed (step S754).

The main CPU 71 scrolls the symbols displayed in the symbol display region 4 with five columns (step S755), and stops the displayed symbols after a lapse of predetermined time (step S756).

The main CPU 71 subtracts one from the number Q of free games (step S757).

The main CPU 71 then determines whether or not there is a WILD symbol in any of the twenty display regions, and if there is, fixes the WILD symbol (step S758). As described above, when the WILD symbol is displayed in the display region denoted by the reference numeral d32, the WILD symbol is fixed as shown in FIG. 24. In the next symbol scrolling and displaying processing (the processing of step S755), the symbol is not scrolled in the display region as shown in FIG. 25.

The main CPU 71 then determines the number of coins to be paid out on the basis of combinations of symbols displayed in the twenty display regions while referring to the first payout table shown in FIG. 10 (step S759). For example, when the symbols shown in FIG. 24 are displayed, payout of eight coins is determined since five BELL symbols are lined up.

The main CPU 71 then determines whether or not the number Q of free games=0 has been established (step S760). When the main CPU 71 determines that Q=0 has not been established, the main CPU 71 repeats the processing from step S755.

When determining that Q=0 has been established, the main CPU 71 resets the WILD symbol fixed in the processing of step S758 (step S761), resets the count value X indicating the number of executions of the maximum BETs (step S762), and completes the second feature game processing.

<Free Game Processing of the Ninth Embodiment>

Figure 45:
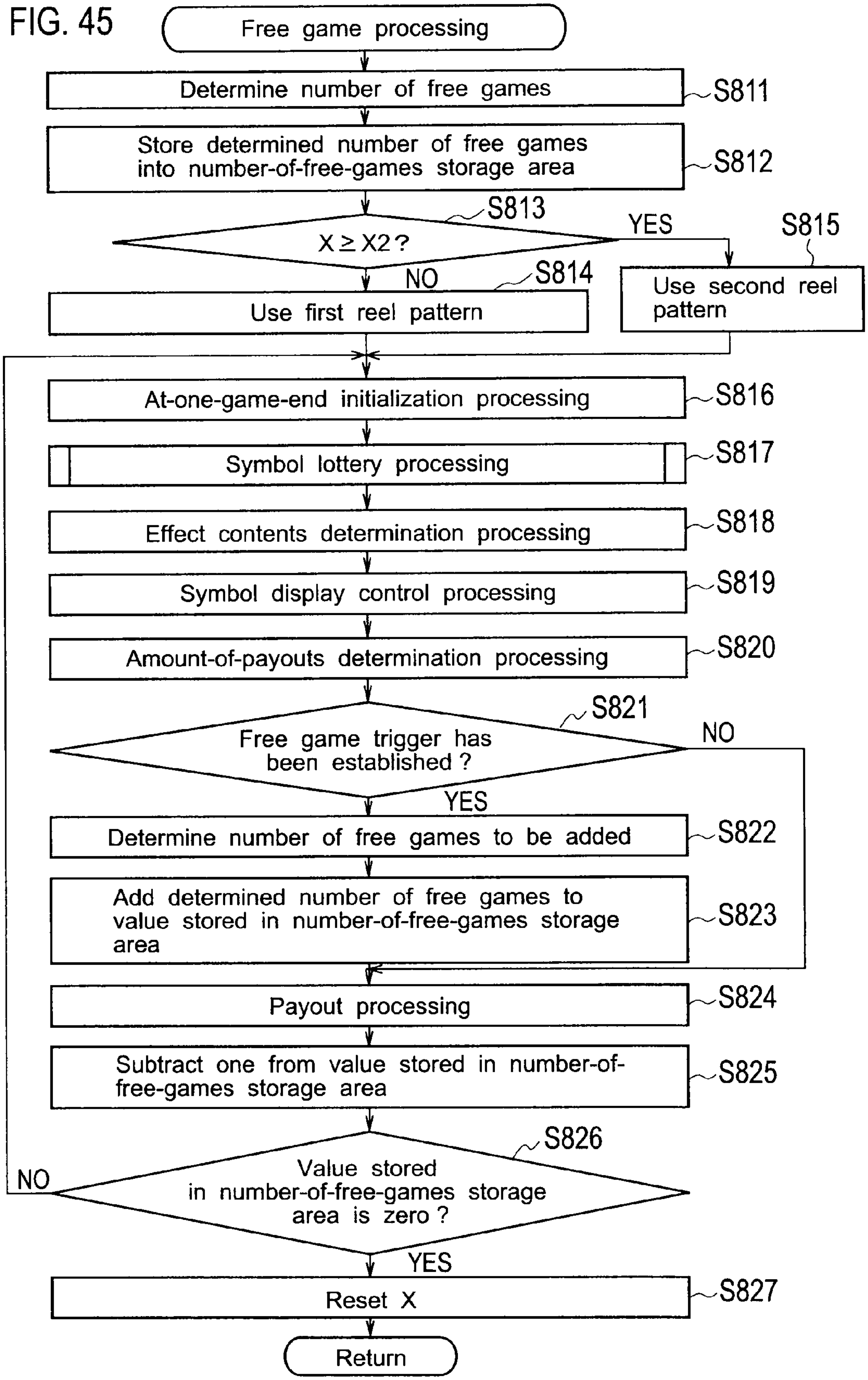
FIG. 45 is a view illustrating a flowchart of a free game processing of the gaming machine according to the ninth embodiment of the present invention.

Next, with reference to FIG. 45, the free game processing according to the ninth embodiment is described.

FIG. 45 is a view illustrating a flowchart of the free game processing for the gaming machine according to the ninth embodiment of the present invention.

The main CPU 71 first determines the number of free games (step S811). The main CPU 71 extracts a random number value for number-of-free-games determination, and determines any one of the various numbers of free games such as “50”, “70” and “100” by lottery.

Next, the main CPU 71 stores the determined number of free games into a number-of-free-games storage area provided in the RAM 73 (step S812).

The main CPU 71 determines whether or not the count value X indicating the number of maximum BETs which is counted in the processing of step S718 of FIG. 42 is not less than a preset predetermined value X2 (step S813). When X≧X2 is established, the symbol arrays set in the fourth reel pattern shown in FIG. 8 are used (step S815). On the other hand, when X<X2 is established, the symbol arrays set in the third reel pattern shown in FIG. 7 are used (step S814). Specifically, when the number X of maximum BETs is not less than the predetermined value X2, the reel pattern including more WILD symbols can be used.

The main CPU 71 then conducts at-one-game-end initialization processing in the same way as the processing of step S12 described with reference to FIG. 12 (step S816). The main CPU 71 then conducts the symbol lottery processing described with reference to FIG. 16 (step S817). Then, the main CPU 71 conducts the effect contents determination processing in the same way as the processing of step S16 described with reference to FIG. 12 (step S818). Next, the main CPU 71 conducts the symbol display control processing described with reference to FIG. 17 (step S819). The main CPU 71 then conducts the amount-of-payout determination processing described with reference to FIG. 18 (step S820).

Next, the main CPU 71 determines whether or not the free game trigger has been established (step S821). When the main CPU 71 determines that the free game trigger has been established, the main CPU 71 determines the number of free games to be added (step S822). In the same way as the aforementioned processing of step S811, the main CPU 71 determines the number of free games. The main CPU 71 then adds the determined number of free games to the value stored in the number-of-free-games storage area (step S823).

After the processing of step S823 or when determining in step S821 that the free game trigger has not been established, the main CPU 71 conducts the payout processing (step S824). In the payout processing, the main CPU 71 adds the value stored into the amount-of-payout storage area in the aforementioned amount-of-payout determination processing of step S820 to a value stored in an amount-of-payout storage area for free game. The amount-of-payout storage area for free game is an area for storing a total of the amounts of the payouts determined during the free games.

Upon completion of the free game processing, the main CPU 71 adds the value stored in the amount-of-payout storage area for free game to the value stored in the number-of-credits storage area provided in the RAM 73, in the payout processing of step S24 described with reference to FIG. 12. That is, the total of the amounts of the payouts determined during the free games is collectively paid out. Here, it is to be noted that coins may be discharged from the coin payout exit 15A, or a ticket with a barcode may be issued.

Next, the main CPU 71 subtracts one from the value stored in the number-of-free-games storage area (step S825). Next, the main CPU 71 determines whether or not the value stored in the number-of-free-games storage area is zero (step S826). When the main CPU 71 determines that the value stored in the number-of-free-games storage area is not zero, the main CPU 71 shifts the processing to step S816. On the other hand, when the main CPU 71 determines that the value stored in the number-of-free-games storage area is zero, the main CPU 71 resets the count value X indicating the number of games on which maximum BETs (step S827) have been made, and completes the free game processing. Upon the completion of the free game processing, the processing is shifted to the processing of step S21 described with reference to FIG. 12.

In this way, the gaming machine according to the ninth embodiment allows the player to have expectations of winning a large amount of payout since the first and second feature games are executed when the insurance is started.

Further, when the number X of games on which maximum BETs have been made has reached a value not less than a preset predetermined value X1 before start of the insurance, the second reel pattern which allows the player to have expectations for a large amount of payout is used. Thus, the player can be motivated to make a maximum BET.

Tenth Embodiment

Next, a tenth embodiment of the present invention is described. The tenth embodiment is different from the aforementioned first embodiment in the insurance-related processing shown in FIG. 15, the insurance-check processing shown in FIG. 19, and the free game processing shown in FIG. 22.

<Insurance-Related Processing of the Tenth Embodiment>

Figure 46:
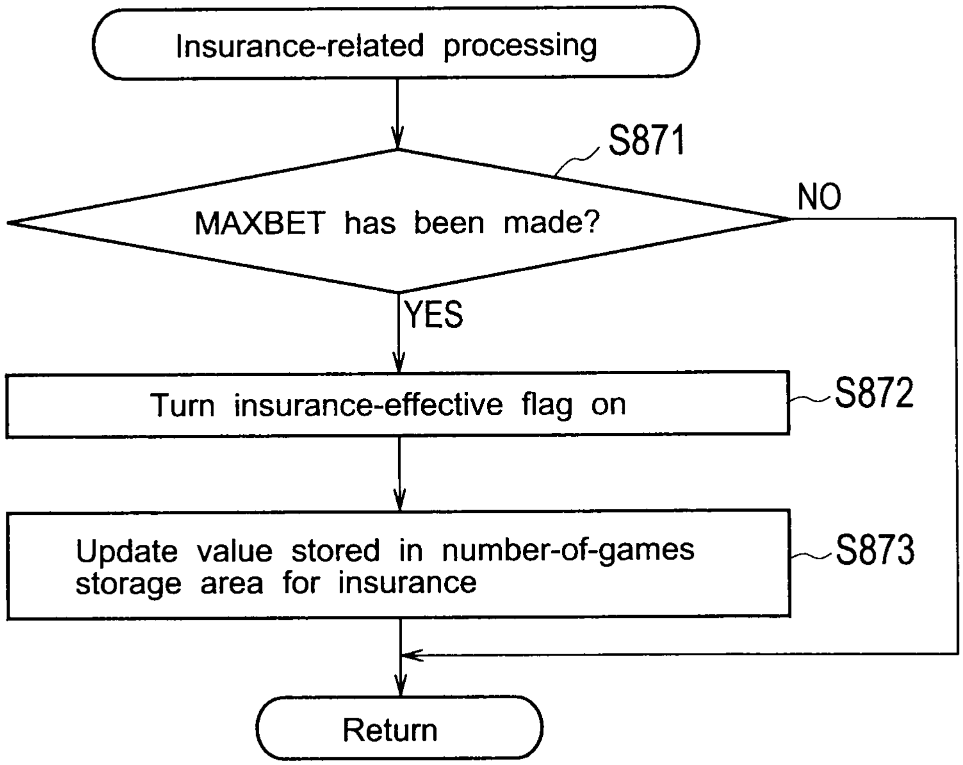
FIG. 46 is a view illustrating a flowchart of an insurance-related processing of a gaming machine according to a tenth embodiment of the present invention.

FIG. 46 is a view illustrating a flowchart of the insurance-related processing according to the tenth embodiment.

First, the main CPU 71 determines whether or not a MAXBET has been made (step S871). When the main CPU 71 determines that the MAXBET has been made, the main CPU 71 turns an insurance-effective flag on (step S872).

When the insurance-effective flag is turned off, the main CPU 71 completes the insurance-related processing. On the other hand, when the insurance-effective flag is turned on, the main CPU 71 updates a value stored in a number-of-games storage area for insurance provided in the RAM 73 (step S873). The number-of-games storage area for insurance is an area for storing the number of games up to the time of the payout by the insurance. In the processing of step S873, the main CPU 71 adds one to the value stored in the number-of-games storage area for insurance. After the processing, the insurance-related processing is completed. Specifically, when a MAXBET has been made, the insurance-effective flag is turned on, and the number of executions of normal games is counted.

<Insurance-Check Processing of the Tenth Embodiment>

Figure 47:
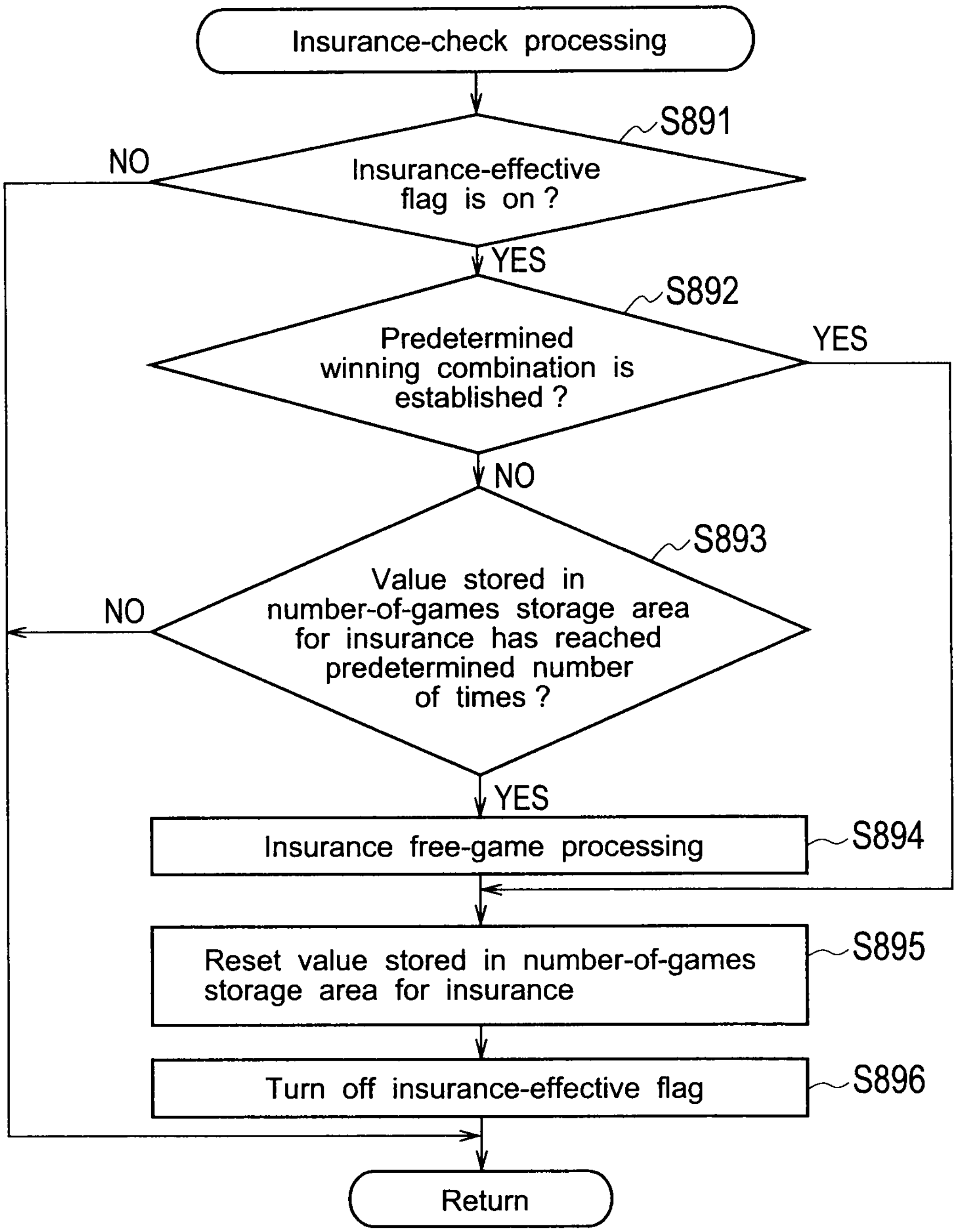
FIG. 47 is a view illustrating a flowchart of an insurance-check processing of the gaming machine according to the tenth embodiment of the present invention.

Next, the insurance-check processing according to the tenth embodiment is described. FIG. 47 is a view illustrating a flowchart of the insurance-check processing according to the tenth embodiment.

First, the main CPU 71 determines whether or not the insurance-effective flag is turned on (step S891). When the main CPU 71 determines that the insurance-effective flag is not turned on, the main CPU 71 completes the insurance-check processing.

When the main CPU 71 determines that the insurance-effective flag is turned on, the main CPU 71 determines whether or not a predetermined winning combination has been established (step S892). In the present embodiment, "free game trigger", "jackpot" and "mystery bonus" are subjects of the predetermined winning combination.

When the main CPU 71 determines that the predetermined winning combination has not been established, the main CPU 71 determines whether or not the value stored in the number-of-games storage area for insurance has reached a predetermined number of times (e.g. 650) (step S893). When the main CPU 71 determines that the value stored in the number-of-games storage area for insurance has not reached the predetermined number of times, the main CPU 71 completes the insurance-check processing.

When the main CPU 71 determines that the value stored in the number-of-games storage area for insurance has reached the predetermined number of times, the main CPU 71 conducts insurance free-game processing (step S894).

After step S894 or when determining in step S892 that the predetermined winning combination has been established, the main CPU 71 resets the value stored in the number-of-games storage area for insurance (step S895). Next, the main CPU 71 turns the insurance-effective flag off (step S896). After processing, the insurance-check processing is completed.

<Free Game Processing of the Tenth Embodiment>

Figure 48:
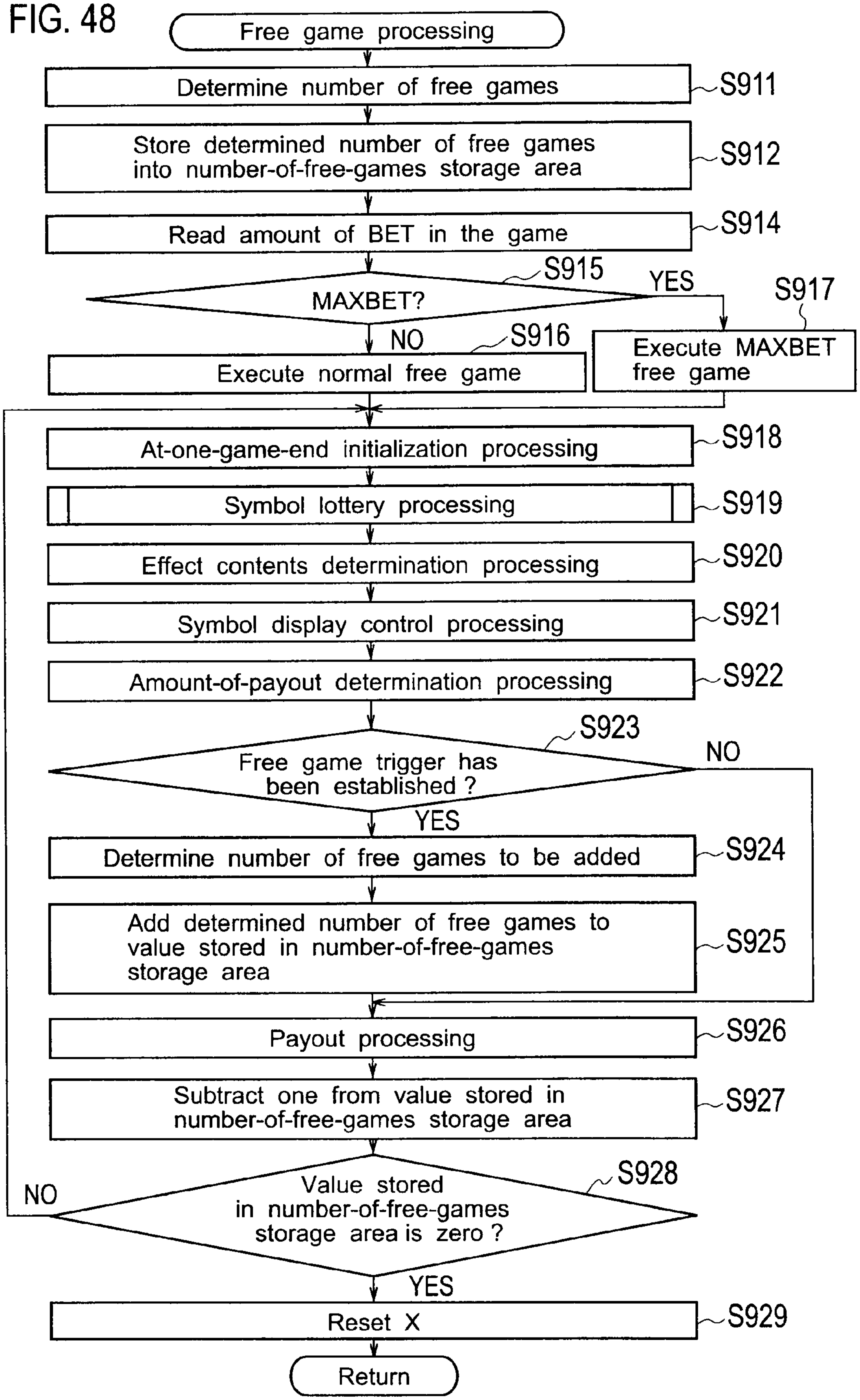
FIG. 48 is a view illustrating a flowchart of a free game processing of the gaming machine according to the tenth embodiment of the present invention.

Next, with reference to FIG. 48, the free game processing according to the tenth embodiment is described.

The main CPU 71 first determines the number of free games (step S911). The number of free games is determined by the game player operating the touch panel 114 as a selection switch and selecting any of the aforementioned selection screens shown in FIG. 28.

Next, the main CPU 71 stores the determined number of free games into a number-of-free-games storage area provided in the RAM 73 (step S912).

The main CPU 71 reads the amount of a BET on the game in which the free game trigger has been established (step S914). The main CPU 71 determines whether or not the amount of the BET on the game in which the free game trigger has been established is the MAXBET (step S915). When the main CPU 71 determines that the amount of the BET is not the MAXBET, the main CPU 71 executes a normal free game (step S916). In the normal free game, the main CPU 71 executes free games as feature games in the number set in step S371. On the other hand, when determining in step S916 that the amount of the BET is the MAXBET, the main CPU 71 executes a MAXBET bonus in which a special free game with more free games is added to a normal number of free games (step S917).

In other words, as shown in FIG. 50, as the benefit of entering into the feature game during MAXBET, for example, free games are added to the number of normal free games through random lottery processing.

The main CPU 71 then conducts at-one-game-end initialization processing in the same way as the processing of step S12 described with reference to FIG. 12 (step S918). The main CPU 71 then conducts the symbol lottery processing described with reference to FIG. 16 (step S919). Then, the main CPU 71 conducts the effect contents determination processing in the same way as the processing of step S16 described with reference to FIG. 12 (step S920). Next, the main CPU 71 conducts the symbol display control processing described with reference to FIG. 17 (step S921). The main CPU 71 then conducts the amount-of-payout determination processing described with reference to FIG. 18 (step S922).

Next, the main CPU 71 determines whether or not the free game trigger has been established (step S923). When the main CPU 71 determines that the free game trigger has been established, the main CPU 71 determines the number of free games to be added (step S924). In the same way as the aforementioned processing of step S911, the main CPU 71 determines the number of free games. The main CPU 71 then adds the determined number of free games to the value stored in the number-of-free-games storage area (step S925).

After the processing of step S925 or when determining in step S923 that the free game trigger has not been established, the main CPU 71 conducts the payout processing (step S926). In the payout processing, the main CPU 71 adds the value stored into the amount-of-payout storage area in the aforementioned amount-of-payout determination processing of step S922 to a value stored in an amount-of-payout storage area for free game. The amount-of-payout storage area for free game is an area for storing a total of the amounts of the payouts determined during the free games.

Upon the completion of the free game processing, the main CPU 71 adds the value stored in the amount-of-payout storage area for free game to the value stored in the number-of-credits storage area provided in the RAM 73, in the payout processing of step S24 described with reference to FIG. 12. That is, the total of the amounts of the payouts determined during the free games is collectively paid out. Here, it is to be noted that coins may be discharged from the coin payout exit 15A, or a ticket with a barcode may be issued.

Next, the main CPU 71 subtracts one from the value stored in the number-of-free-games storage area (step S927). Next, the main CPU 71 determines whether or not the value stored in the number-of-free-games storage area is zero (step S928). When the main CPU 71 determines that the value stored in the number-of-free-games storage area is not zero, the main CPU 71 shifts the processing to step S918. On the other hand, when the main CPU 71 determines that the value stored in the number-of-free-games storage area is zero, the main CPU 71 resets the count value X indicating the number of games on which maximum BETs have been made (step S929), and completes the free game processing.

<Insurance Processing of the Tenth Embodiment>

Figure 49:
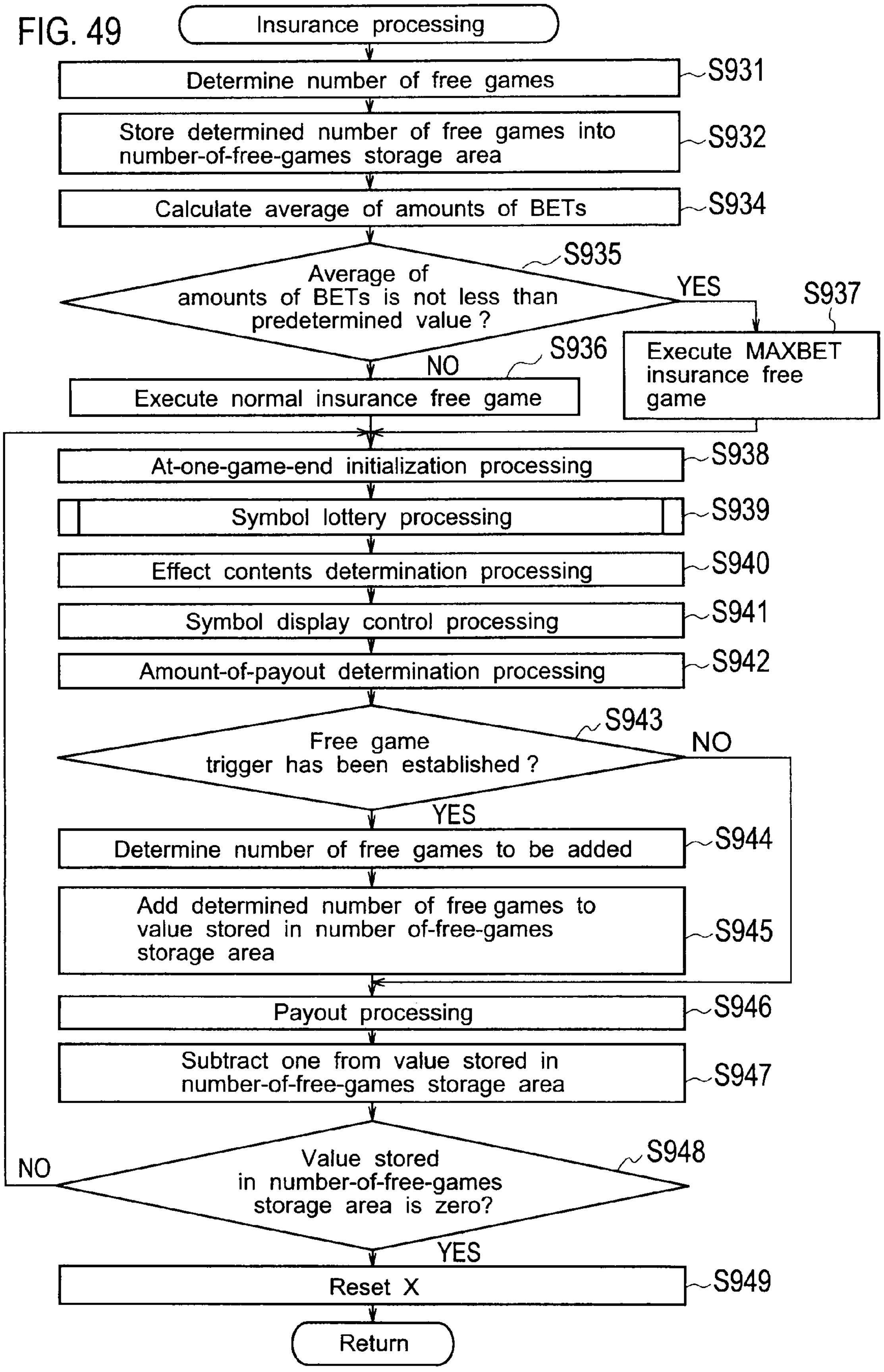
FIG. 49 is a view illustrating a flowchart of an insurance processing of the gaming machine according to the tenth embodiment of the present invention.

Next, with reference to a flowchart shown in FIG. 49, insurance processing according to the tenth embodiment is described.

Along with execution of a unit game, a count value of a counter is cumulatively incremented. Based on the count value data and an insurance start condition table, whether or not to start insurance is determined (see FIG. 47). When it is determined that the insurance is to be started, the first feature game is executed. Further, based on an outcome of the executed first feature game and the second feature game condition determination table, the conditions of the second feature game are determined. Thereafter, the second feature game is executed.

Further, when the insurance is started, the main CPU 71 first determines the number of free games (step S931). In the number-of-free-games determination processing, when the selection screens as shown in FIG. 28 is displayed, the game player operates the touch panel 114 to select two places as the selection switches, and thereby sets two numbers of free games.

The two numbers of free games are applied to the first and second feature games.

Next, the main CPU 71 stores the determined numbers of free games into a number-of-free-games storage area provided in the RAM 73 (step S932).

The main CPU 71 calculates an average of the amounts of the BETs during normal games up to the time of establishment of the insurance (step S934).

The main CPU 71 determines whether or not the average of the amounts of the BETs has reached a predetermined value (e.g. 20) (step S935). When the main CPU 71 determines that the average of the amounts of the BETs has not reached the predetermined value, the main CPU 71 executes a normal insurance free-game. In the normal insurance free-game, a free game is executed using the reel pattern shown in FIG. 6 (step S936). On the other hand, when determining that the average of the amounts of the BETs has reached the predetermined value, the main CPU 71 executes a MAXBET insurance free-game.

In the calculation processing of step S934, the following calculation is performed, for example. It is assumed that Max Bet of the gaming machine is set to Bet Par Line 20 and the number of games to be played up to the start of rescue is set to 750 games. When a certain game player plays 749 games with Bet Par Line 20 and plays 1 game with Bet Par Line 10, an average multiplier is 19.987, namely 19.99 when rounded to two decimal places. The value 19.99 here is the average of the amounts of the BETs. When the predetermined value in the determination processing of step S935 is set to 20, which is the value of Max Bet in the gaming machine, a normal free game is executed without receiving the benefit of Max Bet Bonus since the average of the amounts of the BETs is not equal to or greater than 20.

Further, as another mode, it is assumed that the number of games up to the start of rescue is set to 400 games and the game player plays all 400 games with Bet Par Line 20. An average, which is an average multiplier, here is equal to or greater than the predetermined value 20, which leads to YES. Thus, the player can receive the benefit of Max Bet Bonus which is a special free game.

In the MAXBET insurance free-game, the number of "WILD" symbols is increased in at least one of the reels in the reel pattern shown in FIG. 7, and a free game is executed using the reel pattern with the number of "WILD" symbols increased (step S937). For example, the number of "WILD" symbols can be increased in the second, third and fourth reels or can be increased in all of the first to fifth reels. The MAXBET free game is not limited to the ones described above. The present invention may be implemented in the following other modes for differentiation between the normal free game and the MAXBET free game, which is the special game, as disclosed in other embodiments. Specifically, the other modes include: a first other mode in which the number of free games in the MAXBET free game is set greater; and a second other mode in which the MAXBET free game is multiple sets of normal free games. In the case of the first other mode, the number of free games to be added to the normal number of free games may be determined by random lottery, or the fixed number of free games may be added. Alternatively, a number-of-additional-free-games determination game, in which the game player gets involved, may be executed, and the number of games to be added may be determined based on an outcome of the game.

The main CPU 71 then conducts at-one-game-end initialization processing in the same way as the processing of step S12 described with reference to FIG. 12 (step S938). The main CPU 71 then conducts the symbol lottery processing described with reference to FIG. 16 (step S939). Then, the main CPU 71 conducts the effect contents determination processing in the same way as the processing of step S16 described with reference to FIG. 12 (step S940). Next, the main CPU 71 conducts the symbol display control processing described with reference to FIG. 17 (step S941). The main CPU 71 then conducts the amount-of-payout determination processing described with reference to FIG. 18 (step S942).

Next, the main CPU 71 determines whether or not the free game trigger has been established (step S943). When the main CPU 71 determines that the free game trigger has been established, the main CPU 71 determines the number of free games to be added (step S944). In the same way as the aforementioned processing of step S931, the main CPU 71 determines the number of free games. The main CPU 71 then adds the determined number of free games to the value stored in the number-of-free-games storage area (step S945).

After the processing of step S945 or when determining in step S943 that the free game trigger has not been established, the main CPU 71 conducts the payout processing (step S946). In the payout processing, the main CPU 71 adds the value stored into the amount-of-payout storage area in the aforementioned amount-of-payout determination processing of step S942 to a value stored in an amount-of-payout storage area for free game. The amount-of-payout storage area for free game is an area for storing a total of the amounts of the payouts determined during the free games.

Upon the completion of the free game processing, the main CPU 71 adds the value stored in the amount-of-payout storage area for free game to the value stored in the number-of-credits storage area provided in the RAM 73, in the payout processing of step S24 described with reference to FIG. 12. That is, the total of the amounts of the payouts determined during the free games is collectively paid out. Here, it is to be noted that coins may be discharged from the coin payout exit 15A, or a ticket with a barcode may be issued.

Next, the main CPU 71 subtracts one from the value stored in the number-of-free-games storage area (step S947). Next, the main CPU 71 determines whether or not the value stored in the number-of-free-games storage area is zero (step S948). When the main CPU 71 determines that the value stored in the number-of-free-games storage area is not zero, the main CPU 71 shifts the processing to step S947. On the other hand, when the main CPU 71 determines that the value stored in the number-of-free-games storage area is zero, the main CPU 71 resets the count value X indicating the number of games on which maximum BETs have been made (step S949), and completes the insurance free-game processing.

Thus, in the gaming machine according to the tenth embodiment, when "FEATURE" symbol is displayed and a free game trigger has been established, an average of the amounts of the BETs is calculated. When the calculated average is a predetermined value, a MAXBET free game is executed. On the other hand, when the calculated average is not the predetermined value, a normal free game is executed. Further, when the insurance has been established, an average of the amounts of the BETs is calculated. When the calculated average is a predetermined value, a MAXBET insurance free-game is executed. On the other hand, when the calculated average is not the predetermined value, a normal insurance free-game is executed.

Therefore, the larger the amount of a BET in one normal game, the higher the probability of winning a large amount of payout in the free game executed when the free game trigger is established and in the insurance free-game executed when the insurance is established. Thus, the player is allowed to have interest in making a MAXBET.

In the gaming machine and the method for controlling the gaming machine according to the present invention, when it is determined that the insurance is to be started, the first and second feature games are executed. Thus, a gaming machine with new entertainment properties can be provided.

While the gaming machine and the method for controlling the gaming machine according to the present invention has been described based on the illustrated embodiments, the present invention is not limited thereto, and the configuration of each part may be replaced with any other configuration having the same function.

What is claimed is:

1. A gaming machine comprising:

an input device configured to receive a bet for each of unit games;

a display adapted to display an outcome of a unit game;

a counter configured to cumulatively increment a count value along with execution of the unit games and count the count value;

a memory configured to store a count value counted by the counter; and a controller configured to (a1) execute a unit game, the counter value being incremented by execution of the unit game, (a2) determine whether to start the insurance on a basis of the count value stored in the memory, (b1) execute a first feature game including a plurality of free games after determining an outcome of the unit game when determining to start the insurance, and (b2) execute a second feature game including a plurality of free games after completing the plurality of free games in the first feature game, wherein, in (b1) and (b2), the controller is further configured to cause a specific symbol to appear at a predetermined probability in each of the free games, when the specific symbol appears in a certain free (lame, hold the appeared specific symbol and scroll a plurality of symbols except for the appeared specific symbol, in a free (lame that is subsequent to the certain free game, and reset the appeared specific symbol when each of the first feature game and the second feature game is completed.

2. A gaming machine comprising:

an input device configured to receive a bet for each of unit games;

a display adapted to display an outcome of a unit game;

a counter configured to cumulatively increment a count value along with execution of the unit games and count the count value;

a memory configured to store a count value counted by the counter; and a controller configured to (a1) execute a unit game, the counter value being incremented by execution of the unit game, (a2) determine whether to start the insurance on a basis of the count value stored in the memory, (b1) execute a first feature game including a plurality of free games after determining an outcome of the unit game when determining to start the insurance, and (b2) execute a second feature game including a plurality of free games after completing the plurality of free games in the first feature game, wherein the memory is further configured to store a payout rate setting table defining a relationship between a payout rate and a number of free games executed in each of the first feature game and the second feature game, and the controller is configured to receive an input of selection of numbers of free games in the first feature game and the second feature game when determining to start the insurance, execute the selected numbers of free games in the first feature game and the second feature game, and determine a payout on a basis of a payout rate corresponding to each of the selected numbers of free games when winning is established.

3. A gaming machine comprising:

an input device configured to receive a bet for each of unit games;

a display adapted to display an outcome of a unit game;

a counter configured to cumulatively increment a count value along with execution of the unit games and count the count value;

a memory configured to store a count value counted by the counter; and a controller configured to (a1) execute a unit game, the counter value being incremented by execution of the unit game, (a2) determine whether to start the insurance on a basis of the count value stored in the memory, (b) execute the first feature game including a plurality of free games after determining an outcome of the unit game when determining to start the insurance, (c) determine a condition of the second feature game on a basis of an outcome of the executed first feature game, and (d) execute the second feature game including a plurality of free games under the condition determined in (c).

4. The gaming machine according to claim 3, wherein a mission is set in the first feature game, the condition includes a first condition corresponding to a case that the mission is accomplished in the first feature game, and a second corresponding to a case that the mission is not accomplished in the first feature game, and a payout rate in the second feature game under the first condition is higher than that under the second condition.

5. The gaming machine according to claim 3, wherein a mission is set in the first feature game, the condition includes a first condition corresponding to a case that the mission is accomplished in the first feature game, and a second corresponding to a case that the mission is not accomplished in the first feature game, and a number of the free games to be executed in the second feature game under the first condition is larger than that under the second condition.

6. The gaming machine according to claim 3, wherein a mission is set in the first feature game, the condition includes a first condition corresponding to a case that the mission is accomplished in the first feature game, and a second corresponding to a case that the mission is not accomplished in the first feature game, and a probability of a winning symbol appearing in the second feature game under the first condition is higher than that under the second condition.

7. The gaming machine according to claim 3, a payout rate in the second feature game is higher when a payout won in the first feature game is less than a predetermined value than when the payout won is not less than the predetermined value.

8. The gaming machine according to claim 3, wherein a number of the free games to be executed in the second feature game is larger when a payout won in the first feature game is less than a predetermined value than when the payout won is not less than the predetermined value.

9. The gaming machine according to claim 3, wherein a probability of a winning symbol appearing in the second feature game is higher when a payout won in the first feature game is less than a predetermined value than when the payout won is not less than the predetermined value.

* * * * *